(12) United States Patent
Son et al.

(10) Patent No.: US 10,727,684 B2
(45) Date of Patent: Jul. 28, 2020

(54) WIRELESS POWER TRANSMITTER

(71) Applicant: WITS Co. Ltd., Yongin-si, Gyeonggi-do (KR)

(72) Inventors: Jung Ho Son, Suwon-si (KR); Keun Soo Ha, Suwon-si (KR); Yun Ki Hong, Suwon-si (KR); Seung Won Park, Suwon-si (KR); Eun Young Shin, Suwon-si (KR); Dae Sik Kim, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 415 days.

(21) Appl. No.: 15/698,237

(22) Filed: Sep. 7, 2017

(65) Prior Publication Data

US 2018/0102669 A1 Apr. 12, 2018

(30) Foreign Application Priority Data

Oct. 10, 2016 (KR) .................. 10-2016-0130787
Nov. 17, 2016 (KR) .................. 10-2016-0153564

(51) Int. Cl.
*H02J 7/00* (2006.01)
*H02J 7/02* (2016.01)
(Continued)

(52) U.S. Cl.
CPC .............. *H02J 7/025* (2013.01); *H02J 50/12* (2016.02); *H02J 50/80* (2016.02); *H04B 5/0031* (2013.01); *H04B 5/0037* (2013.01); *H02J 7/0047* (2013.01)

(58) Field of Classification Search
CPC .. H02J 7/025; H02J 50/80; H02J 50/12; H02J 7/0047; H04B 5/0031; H04B 5/0037
See application file for complete search history.

(56) References Cited

U.S. PATENT DOCUMENTS

2010/0217352 A1* 8/2010 Forsell .................... H02J 5/005
607/61
2011/0187318 A1* 8/2011 Hui ........................ H02J 50/12
320/108
(Continued)

FOREIGN PATENT DOCUMENTS

JP 2014-132828 A 7/2014
JP 2014-140290 A 7/2014
(Continued)

OTHER PUBLICATIONS

Korean Office Action dated Nov. 16, 2017, in corresponding Korean Application No. 10-2016-0153564 (9 pages in English, 7 pages in Korean).

*Primary Examiner* — Arun C Williams
(74) *Attorney, Agent, or Firm* — Harness, Dickey & Pierce, P.L.C.

(57) ABSTRACT

A wireless power transmitter includes a converter, a resonator, and a controller. The converter includes switching elements forming a bridge circuit, and is configured to output an alternating current (AC) voltage in response to control signals. The resonator includes a resonant capacitor and a resonant coil, and is configured to receive the AC voltage to wirelessly transmit power. The controller is configured to perform a first mode operation in which a duty of the control signals is fixed, a frequency of one of the control signals is varied and the control signals are output, and a second mode operation in which a frequency of the control signals is fixed, a duty of one of the control signals is reduced and the control signals are output.

22 Claims, 46 Drawing Sheets

(51) Int. Cl.
*H02J 50/12* (2016.01)
*H02J 50/80* (2016.01)
*H04B 5/00* (2006.01)

(56) References Cited

U.S. PATENT DOCUMENTS

| | | | |
|---|---|---|---|
| 2011/0199045 A1* | 8/2011 | Hui | H02J 7/025 |
| | | | 320/108 |
| 2013/0260676 A1* | 10/2013 | Singh | H04B 5/0037 |
| | | | 455/41.1 |
| 2014/0167523 A1 | 6/2014 | Tamaki et al. | |
| 2016/0111888 A1 | 4/2016 | Cho et al. | |
| 2016/0214488 A1* | 7/2016 | Okamoto | H02J 5/005 |
| 2017/0229914 A1 | 8/2017 | Oh et al. | |

FOREIGN PATENT DOCUMENTS

| | | |
|---|---|---|
| KR | 10-1158224 B1 | 6/2012 |
| KR | 10-2016-0046195 A | 4/2016 |
| KR | 10-1637411 B1 | 7/2016 |
| WO | WO 2004/073166 A2 | 8/2004 |
| WO | WO 2009-089253 A1 | 7/2009 |
| WO | WO 2013/090565 A1 | 6/2013 |

\* cited by examiner

WIRELESS POWER TRANSMITTER

CROSS-REFERENCE TO RELATED APPLICATIONS

This application claims the benefit under 35 U.S.C. § 119(a) of Korean Patent Application No. 10-2016-0130787 filed on Oct. 10, 2016 and Korean Patent Application No. 10-2016-0153564 filed on Nov. 17, 2016, in the Korean Intellectual Property Office, the entire disclosures of which are incorporated herein by reference for all purposes.

BACKGROUND

1. Field

The following description relates to a device to transmit power wirelessly.

2. Description of Related Art

Recently, many mobile devices able to be charged in a wireless manner have been introduced. Accordingly, many wireless power transmitters to wirelessly transmit power to mobile devices have been introduced and the demand for expanding a charging area to charge the mobile devices is increasing. In the case of such wireless power transmission devices, in addition to research into reducing material costs of the wireless power transmission devices, research into improving user convenience and improving wireless power transmission efficiency, while satisfying various requirements, is also being continuously carried out.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter is provided configured to transmit power wirelessly.

In accordance with an embodiment, there may be provided a wireless power transmitter, including: a converter including switching elements forming a bridge circuit, and configured to output an alternating current (AC) voltage in response to control signals; a resonator including a resonant capacitor and a resonant coil, and configured to receive the AC voltage to wirelessly transmit power; and a controller configured to perform a first mode operation in which a duty of the control signals may be fixed, a frequency of one of the control signals may be varied and the control signals may be output, and a second mode operation in which a frequency of the control signals may be fixed, a duty of one of the control signals may be reduced and the control signals may be output.

The controller further performs a third mode operation in which a frequency of the control signals may be fixed, a duty of one of the control signals may be increased and the control signals may be output.

The controller may be further configured to turn on and off each of the switching elements in response to a corresponding signal among the control signals, determine an amplitude of the AC voltage according to an operating duty of one of the switching elements, and determine a frequency of the AC voltage according to an operating frequency of one of the switching elements.

The controller may be further configured to set a detecting duty while determining whether or not a wireless power receiver may be present, and select and perform one of the first mode operation and the second mode operation based on a difference between a magnitude of power that the wireless power receiver receives in response to the operating frequency being a detecting frequency, a frequency of a signal used to determine whether the wireless power receiver may be present and the operating duty may be the detecting duty, and a magnitude of power required by the wireless power receiver.

The controller sets a detecting duty while determining whether or not a wireless power receiver may be present, during the first mode operation, the controller outputs the control signals so that the operating duty may be fixed as the detecting duty, and the operating frequency may be varied in a range from a first reference frequency to a second reference frequency, and during the second mode operation, the controller outputs the control signals so that the operating frequency may be fixed as the second reference frequency, and the operating duty may be varied in a range from a first reference duty to the detecting duty.

The controller further performs a third mode operation in which the operating duty may be fixed as the first reference duty, the operating frequency may be varied in a range from the second reference frequency to a maximum frequency, and the control signals may be output.

The bridge circuit may be a full bridge circuit including a first leg and a second leg, and the controller further performs a third mode operation in which the operating frequency may be fixed as the second reference frequency, a duty of the first leg may be fixed as the detecting duty, and a duty of the second leg may be varied.

The bridge circuit may be a full bridge circuit including a first leg and a second leg, and the controller further performs a third mode operation in which a duty of the first leg may be fixed as the detecting duty, a duty of the second leg may be fixed as 100, and the operating frequency may be varied in a range from the second reference frequency to a maximum frequency.

In accordance with an embodiment, there may be provided a wireless power transmitter, including: a converter including switching elements forming a bridge circuit, and configured to output an AC voltage in response to control signals; a resonator including a resonant capacitor and a resonant coil, and configured to receive the AC voltage to wirelessly transmit power; and a controller configured to perform a first mode operation in which a duty of the control signals may be fixed, a frequency of one of the control signals may be varied in a range from a first reference frequency to a second reference frequency and the control signals may be output, a second mode operation in which a frequency of the control signals may be fixed, a duty of one of the control signals may be varied in a range from a first reference duty to a second reference duty and the control signals may be output, and a third mode operation in which a duty of the control signals may be fixed, a frequency of one of the control signals may be varied in a range below the first reference frequency and the control signals may be output.

Each of the switching elements may be turned on and off in response to a corresponding signal among the control signals, an amplitude of the AC voltage may be determined according to an operating duty of one of the switching elements, and a frequency of the AC voltage may be determined according to an operating frequency of one of the switching elements.

During the first mode operation, the controller outputs the control signals having a frequency in a range from the first reference frequency to the second reference frequency while having a first reference duty, during the second mode operation, the controller outputs the control signals having the first reference frequency, and varying a duty of one of the control signals in a range from a first duty to a second duty, and during the third mode operation, the controller outputs the control signals having a frequency in a range below the first reference frequency while having the second duty.

The controller further performs a fourth mode operation in which a frequency of the control signals may be fixed, a duty of one of the control signals may be varied in a range above the second reference duty and the control signals may be output.

In accordance with an embodiment, there may be provided a wireless power transmitter, including: a converter including switching elements forming a bridge circuit, and configured to output an AC voltage in response to control signals; a resonator including a resonant capacitor and a resonant coil, and configured to receive the AC voltage to wirelessly transmit power; and a controller configured to perform a first mode operation in which a duty of the control signals may be fixed, a frequency of one of the control signals may be determined based on error information received from a wireless power receiver, and the control signals may be output, and a second mode operation in which a frequency of the control signals may be fixed, a duty of one of the control signals may be determined based on the error information, and the control signals may be output in response to the determined frequency being outside of a reference range in the first mode operation.

The controller may be further configured to set a detecting duty while determining whether or not the wireless power receiver may be present, perform the first mode operation by setting a duty of one of the control signals as the detecting duty, determine a frequency of one of the control signals based on the error information, and output the control signals according to the detecting duty and the determined frequency.

In response to the determined frequency of the first mode operation being above a second reference frequency, the controller may be further configured to perform the second mode operation by setting a frequency of one of the control signals as the second reference frequency, determine a duty of one of the control signals based on the error information, and output the control signals according to the second reference frequency and the determined duty.

In response to the duty in the second mode operation being below a first reference duty that may be lower than the detecting duty, the controller may be further configured to perform a third mode operation by setting a duty of one of the control signals as the first reference duty, determine a frequency of one of the control signals based on the error information, and output the control signals according to the first reference duty and the determined frequency.

The bridge circuit may be a full bridge circuit including a first leg and a second leg, and in response to the determined duty in the second mode operation being below a first reference duty that may be lower than the detecting duty, the controller may be further configured to perform a third mode operation by setting a duty of one of the control signals of the control signals, control switching elements of the first leg, as a first reference duty, determine a duty of the one of the control signals of the control signals, control switching elements of the second leg, based on the error information, and output the control signals according to the second reference frequency, the first reference duty, and the determined duty.

In response to the determined frequency having been determined in the first mode operation being below a first reference frequency, the controller may be further configured to perform the second mode operation by setting a frequency of one of the control signals as a first reference frequency, determine a duty of one of the control signals based on the error information, and output the control signals according to the first reference frequency and the determined duty.

In response to the determined duty in the second mode operation being above the second reference duty that may be higher than the detecting duty, the controller may be further configured to perform a third mode operation by setting a duty of one of the control signals as a second reference duty, determine a frequency of one of the control signals based on the error information, and output the control signals according to the second reference duty and the determined frequency.

Each of the switching elements may be turned on and off in response to a corresponding signal among the control signals, an amplitude of the AC voltage may be determined according to an operating duty of one of the switching elements, and a frequency of the AC voltage may be determined according to an operating frequency of one of the switching elements.

In accordance with an embodiment, there may be provided a method of a wireless power transmitter, including: forming a bridge circuit using switching elements forming a bridge circuit to output an alternating current (AC) voltage, in response to control signals, to wirelessly transmit power; performing a first mode operation including fixing a duty of the control signals, varying a frequency of one of the control signals, and outputting the control signals; and performing a second mode operation including fixing a frequency of the control signals, reducing a duty of one of the control signals, and outputting the control signals.

The method may also include: performing a third mode operation including fixing a frequency of the control signals, increasing a duty of one of the control signals, and outputting the control signals.

The method may also include: turning on and off each of the switching elements in response to a corresponding signal among the control signals; determining an amplitude of the AC voltage according to an operating duty of one of the switching elements; and determining a frequency of the AC voltage according to an operating frequency of one of the switching elements.

The method may also include: setting a detecting duty while determining whether or not a wireless power receiver may be present; and selecting and performing one of the first mode operation and the second mode operation based on a difference between a magnitude of power received in response to the operating frequency being a detecting frequency, a frequency of a signal used to determine whether the wireless power receiver may be present and the operating duty may be the detecting duty, and a magnitude of power required by the wireless power receiver.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
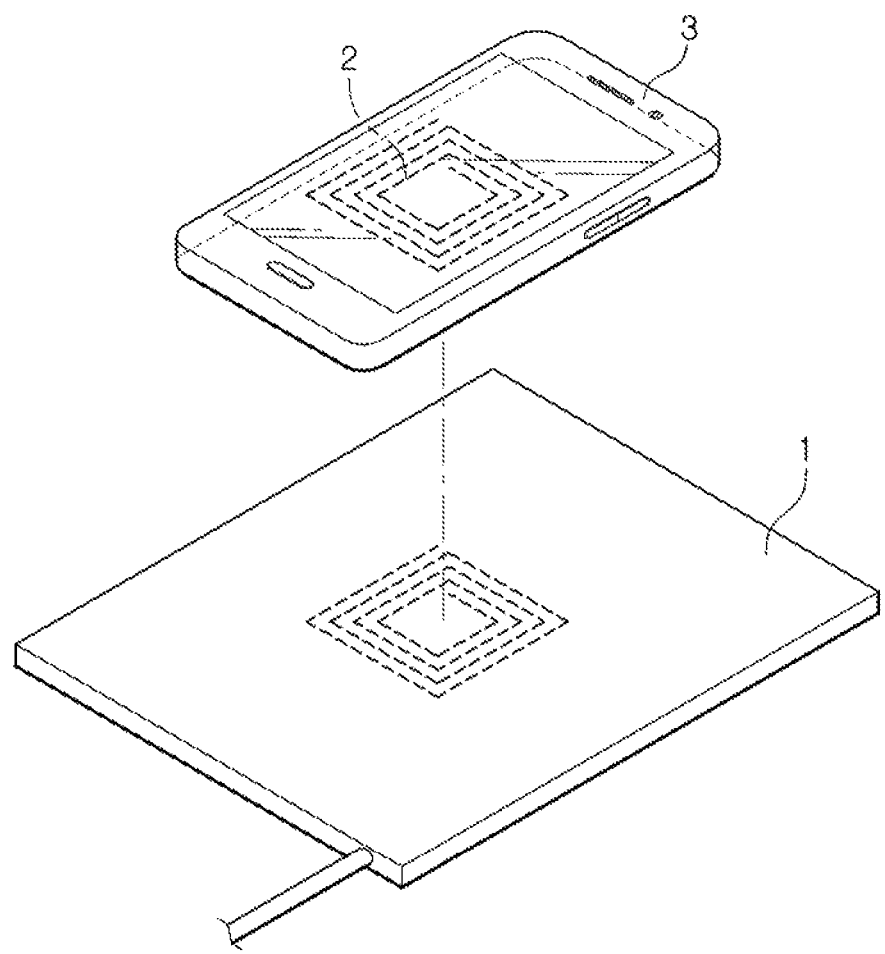
FIG. 1 is a diagram schematically illustrating an application of a wireless power transmitter, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram schematically illustrating an application of a wireless power transmitter 1, according to an embodiment.

Referring to FIG. 1, the wireless power transmitter 1 and a wireless power receiver 2 are magnetically coupled to each other to wirelessly transmit and receive power. As an example, the wireless power transmitter 1 and the wireless power receiver 2 are coupled to each other by either one or both of magnetic resonance and magnetic induction.

The wireless power receiver 2 provides the received power to an electronic device 3. The electronic device 3 performs an operation, such as charging an internal battery using the power provided by the wireless power receiver 2. The wireless power receiver 2 is present in the electronic device 3 as one component, or is a separate device connected to the electronic device 3.

Referring to FIG. 1, the wireless power receiver 2 is disposed in a position adjacent to the wireless power transmitter 1, but a relative distance from the wireless power transmitter 1 and/or an alignment between the wireless power transmitter 1 and the wireless power receiver 2 may change. The wireless power transmitter 1 is operated in boost mode to stably transmit the power to the wireless power receiver 2, in a situation in which the wireless power receiver 2 does not sufficiently receive a necessary amount of power due to the distance from the wireless power transmitter 1 being increased or an alignment between the wireless power transmitter 1 and the wireless power receiver 2 being degraded. In another situation, the wireless power transmitter 1 is operated in the boost mode in a situation in which a large amount of power is required due to a battery of the electronic device 3 being close to a discharged state, and/or in other similar situations. Alternatively, the wireless power transmitter 1 is operated in a reduction mode to prevent unnecessary power consumption and prevent overheating of the wireless power receiver 2 and/or the electronic device 3, in a situation in which the wireless power receiver 2 does receive a necessary amount of power or more than the necessary amount of power due to a relatively short between the wireless power receiver 2 and the wireless power transmitter 1 or the alignment between the wireless power transmitter 1 and the wireless power receiver 2 improving, or in a situation in which a small amount of power is required due to a battery of the electronic device 3 being close to a fully charged state, and/or in other required cases.

Figure 2:
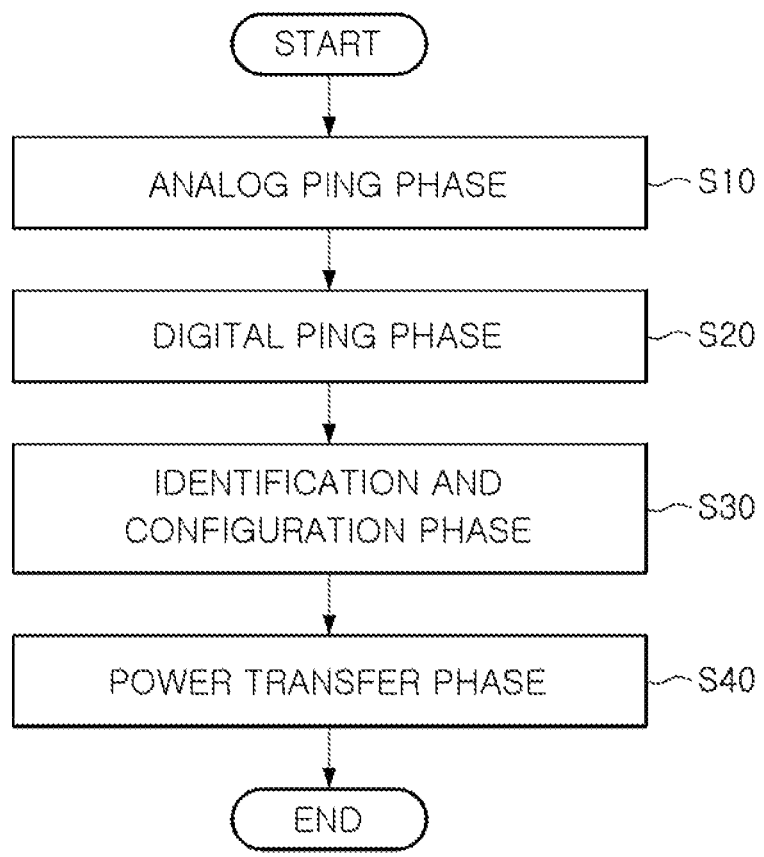
FIG. 2 is a diagram schematically illustrating a wireless power transmission method, according to an embodiment.

FIG. 2 is a flowchart schematically illustrating a method to wirelessly transmit power, according to an embodiment.

The wireless power transmission method of FIG. 2 is performed by the wireless power transmitter 1. Although the flowchart of FIG. 2 is illustrated in a time sequential order, the order of some operations may be modified or some operations may be omitted, and some phases may also be periodically repeated. As an example, the wireless power transmitter 1 periodically enters an analog ping phase (S10) and a digital ping phase (S20).

Referring to FIGS. 1 and 2, the wireless power transmission method begins by the wireless power transmitter 1 entering the analog ping phase (S10).

In the analog ping phase, the wireless power transmitter 1 transmits an analog ping signal. In response to an impedance level of the analog ping signal changing, the wireless power transmitter 1 determines that an external object is positioned around the wireless power transmitter 1. For example, the wireless power transmitter 1 transmits the analog ping signal through a transmission coil or other coils, and determines that the external object is positioned around the wireless power transmitter 1 by determining a change of impedance of the coil that transmits the analog ping signal or a change of a level of the analog ping signal. The analog ping signal is transmitted according to a set period.

In response to determining that a predetermined external object is adjacent to the wireless power transmitter 1 in the analog ping phase, the wireless power transmitter 1 enters the digital ping phase (S20). Alternatively, the wireless power transmitter 1 enters the digital ping phase according to a set period. The wireless power transmitter 1 transmits a digital ping signal in the digital ping phase to determine whether or not the external object, which is adjacent to the wireless power transmitter 1, is the wireless power receiver. For example, after transmitting the digital ping signal, the wireless power transmitter 1 determines whether the external object adjacent thereto is the wireless power receiver based on whether a response signal is received from the wireless power receiver 2.

The wireless power transmitter 1 enters an identification and configuration phase (S30) in response to receiving the response signal of the wireless power receiver for the digital ping signal. In response to the external object being the wireless power receiver, the wireless power receiver transmits the response signal for the received digital ping signal. The response signal of the wireless power receiver includes any one or any combination of any two or more of information regarding signal strength, information about a type of wireless power receiver, such as a mobile device or laptop, information about input voltage strength, information about an amount of power needed by the wireless power receiver, and an error value indicating a difference between the power needed by the wireless power receiver and the amount of power received at the wireless power receiver. Therefore, the wireless power transmitter 1 confirms a target and a power demand using the response signal of the wireless power receiver for the digital ping signal.

Thereafter, the wireless power transmitter 1 enters a power transfer phase (S40), in which the wireless power transmitter 1 wirelessly provides the power to the wireless power receiver using the information confirmed in the identification and configuration phase (S30).

In the power transfer phase (S40), the wireless power transmitter 1 is operated in a normal mode, a boost mode, or a reduction mode.

The normal mode is, for example, an operation mode in which a duty cycle, or "duty" for short, of a control signal to control a switching element of the wireless power transmitter 1 is fixed to any value, and an operating frequency of the wireless power transmitter 1 is varied within a preset reference range. The value to which the duty cycle is fixed is a duty cycle of a control signal generated to transmit the above-mentioned analog ping and/or digital ping signals, and other signals to determine whether the wireless power receiver is present. The reference range of the operating frequency is a frequency range usable by a defined standard, and may also be a range determined by considering a degree of heating of the wireless power receiver or a range of a spatial region to be charged using the wireless power transmitter within the usable frequency range, and a range determined by considering power transfer characteristics between the wireless power transmitter 1 and the wireless power receiver 2.

The boost mode is, for example, an operation mode of the wireless power transmitter 1 in which the wireless power receiver 2 is operated to receive a larger amount of power in comparison to the normal mode. The wireless power transmitter 1 adjusts the duty cycle or adjusts the operating frequency to be lower than the reference range to enable the wireless power receiver 2 to receive a larger amount of power.

The reduction mode is, for example, an operation mode of the wireless power transmitter 1 in which the wireless power receiver 2 is operated to receive a smaller amount of power compared to the normal mode. The wireless power transmitter 1 adjusts the duty cycle or adjusts the operating frequency to be greater than the reference range to enable the wireless power receiver 2 to receive a smaller amount of power.

Although FIG. 2 illustrates an example in which the wireless power transmitter 1 uses the analog ping signal and the digital ping signal to determine whether the wireless power receiver 2 is present, the wireless power transmitter 1 also determines whether the wireless power receiver 2 is present by using a signal other than the ping signals.

In addition, although FIG. 2 illustrates an example in which the wireless power transmitter 1 performs the analog ping phase and the digital ping phase to determine whether or not the wireless power receiver 2 is present, the wireless power transmitter 1 may also determine whether the wireless power receiver 2 is present in a different manner. For example, the wireless power transmitter 1 also determines whether the wireless power receiver 2 is present by using a separate local area communications circuit, such as Bluetooth, and also determines whether the external object is adjacent to the wireless power transmitter 1 and whether the adjacent object is the wireless power receiver through one phase or three or more phases.

Figure 3:
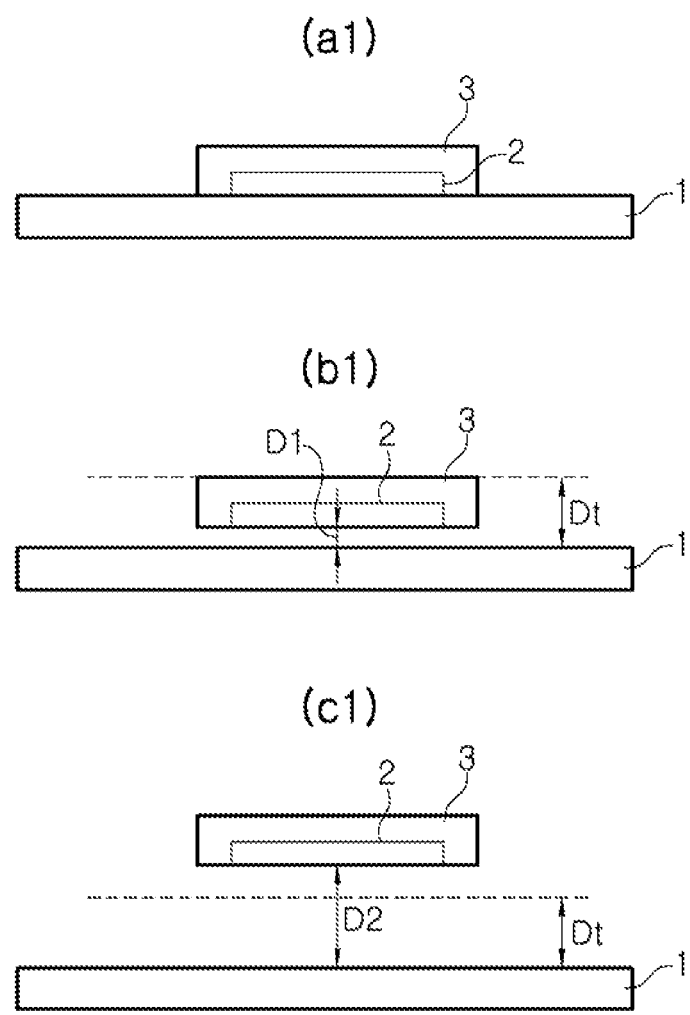
FIG. 3 is a diagram illustrating the wireless power transmitter changing power being transmitted to a wireless power receiver, based on a distance between the wireless power transmitter and the wireless power receiver.

FIG. 3 is a diagram illustrating the wireless power transmitter 1 changing power being transmitted to the wireless power receiver 2 based on a distance between the wireless power transmitter 1 and the wireless power receiver 2, and illustrates the electronic device 3 including the wireless power receiver 2 and the wireless power transmitter 1.

FIG. 3 illustrates situations (a1) through (c1). Situation (a1) illustrates an example in which the wireless power receiver 2 is mounted on the wireless power transmitter 1, situation (b1) illustrates an example in which the wireless power receiver 2 is spaced apart from the wireless power transmitter 1 by a spacing threshold distance Dt or less, and situation (c1) illustrates an example in which the wireless power receiver 2 is spaced apart from the wireless power transmitter 1 by the spacing threshold distance Dt or more.

In situation (c1), compared to situation (a1) or situation (b1), in order for the wireless power receiver 2 to receive a required amount of power, the wireless power transmitter 1 needs to transmit a larger amount of power. Conversely, in the example of situation (a1), compared to situation (b1) or situation (c1), even when the wireless power transmitter 1 transmits a smaller amount of power, the wireless power receiver 2 receives the required amount of power.

In the example illustrated in FIG. 3, the spacing threshold distance Dt is an effective charging distance at the time of transmission at maximum power in a normal mode.

When a distance between the wireless power transmitter and the wireless power receiver is equal to the spacing threshold distance or less, the wireless power transmitter 1 is operated in the normal mode. That is, in situation (a1) and/or situation (b1), the wireless power transmitter 1 operates in the normal mode in which the duty cycle is fixed and the operating frequencies of the switches are changed to adjust an output.

Further, when the distance between the wireless power transmitter 1 and the wireless power receiver 2 is equal to the spacing threshold distance or more, the wireless power transmitter 1 is operated in the boost mode to form a stronger output. That is, in situation (c1), the wireless power transmitter 1 adjusts the duty cycle, or additionally adjusts the operating frequency.

Alternatively, the wireless power transmitter 1 is operated in the normal mode in situation (b1), and is also operated in the reduction mode in situation (a1).

Figure 4:
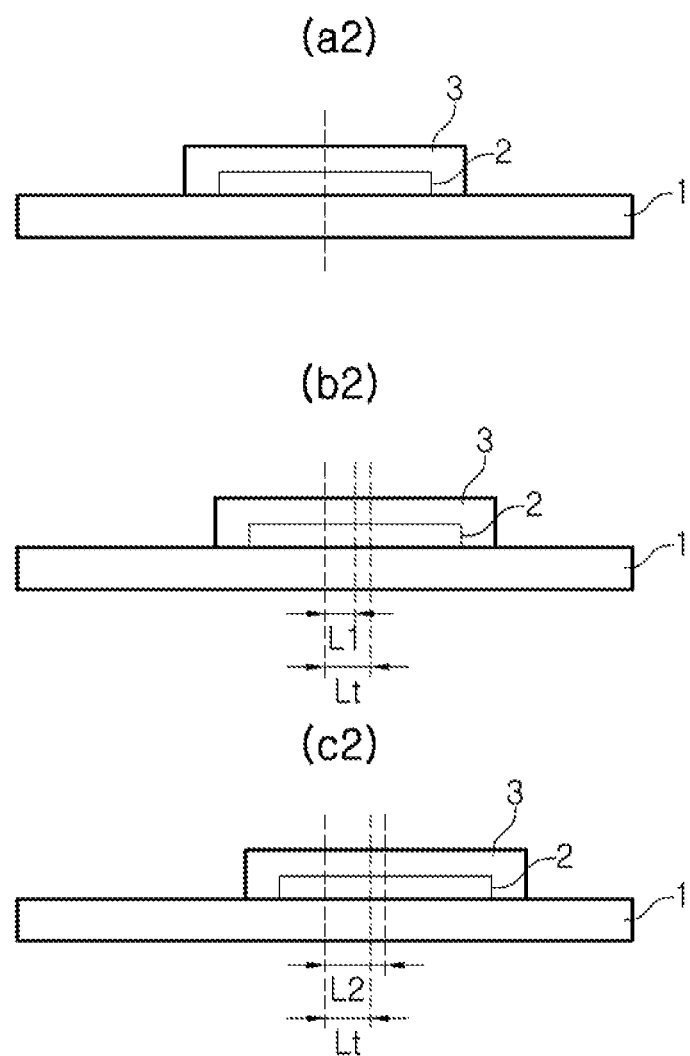
FIG. 4 is a diagram illustrating the wireless power transmitter changing power transmitted to the wireless power receiver based on a degree of alignment between the wireless power transmitter and the wireless power receiver.

FIG. 4 is a diagram illustrating the wireless power transmitter 1 changing power transmitted to the wireless power receiver 2 based on a degree of alignment between the wireless power transmitter 1 and the wireless power receiver 2, and illustrates the electronic device 3 including the wireless power receiver 2 and the wireless power transmitter 1.

FIG. 4 illustrates situation (a2) through situation (c2), wherein situation (a2) is an example in which the center of the wireless power receiver 2 and the center of the wireless power transmitter 1 coincide with each other, situation (b2) is an example in which a distance L1 by which the center of the wireless power receiver 2 and the center of wireless power transmitter 1 are spaced apart is less than or equal to a spacing threshold distance Lt, and situation (c2) illustrates an example in which a distance L2 by which the center of the wireless power receiver 2 and the center of wireless power transmitter 1 are spaced apart is greater than or equal to the spacing threshold distance Lt.

In situation (c2) compared to situation (a2) or situation (b2), in order for the wireless power receiver 2 to receive a required amount of power, the wireless power transmitter 1 needs to transmit a larger amount of power. Conversely, in situation (a2) compared to situation (b2) or situation (c2), even though the wireless power transmitter 1 transmits a smaller amount of power, the wireless power receiver 2 receives the required amount of power.

In the illustrated example, the spacing threshold distance Lt is an effective charging distance at the time of transmission at maximum power in the normal mode.

Similarly to the situations described in FIG. 3, in situation (a2) and/or situation (b2), the wireless power transmitter 1 is operated in the normal mode. In situation (c2), the wireless power transmitter 1 is operated in the boost mode. Alternatively, in situation (a2), the wireless power transmitter 1 may also be operated in the reduction mode.

Figure 5:
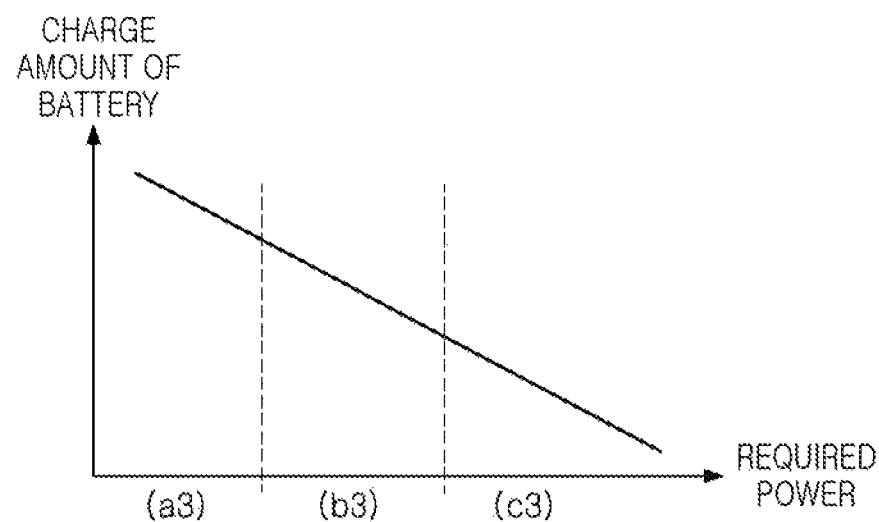
FIG. 5 is a diagram illustrating the wireless power transmitter changing power transmitted to the wireless power receiver based on an amount of charge of a battery of the wireless power receiver.

FIG. 5 is a diagram illustrating the wireless power transmitter 1 changing power based on an amount of charge of a battery of the wireless power receiver 2.

In an example in which the amount of charge of the battery approaches a full charge (situation (a3)), the wireless power receiver requires a smaller amount of power, and in an example in which the amount of charge of the battery approaches a discharge (situation (c3)), the wireless power receiver requires a larger amount of power.

The wireless power transmitter 1 determines the operation mode in response to the signal received from the wireless power receiver 2. In this example, the wireless power transmitter is operated in the normal mode in situation (b3). In addition, the wireless power transmitter is operated in the boost mode in situation (c3). In addition, the wireless power transmitter is operated in the reduction mode in situation (a3).

Figure 6:
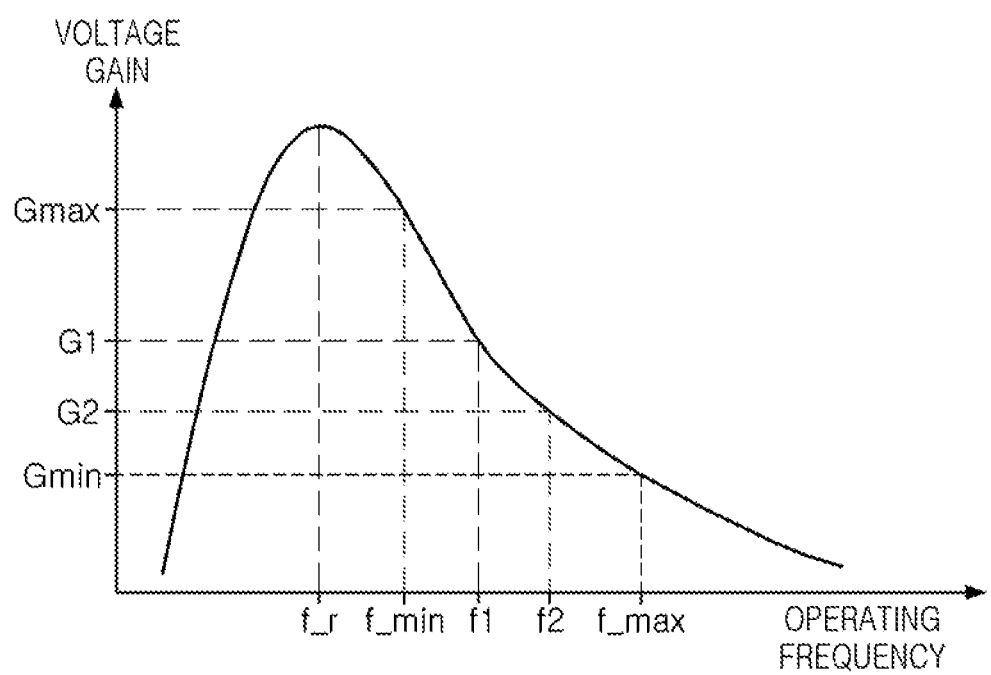
FIG. 6 is a diagram illustrating a relationship between a voltage gain and an operating frequency between a transmission coil of the wireless power transmitter and a reception coil of the wireless power receiver.

FIG. 6 is a diagram illustrating a relationship between a voltage gain and an operating frequency between a transmission coil of the wireless power transmitter and a reception coil of the wireless power receiver. In FIG. 6, the X axis represents the operating frequency and the Y axis represents the voltage gain.

Referring to FIG. 6, in the normal mode, the wireless power transmitter fixes the duty cycle of the switches and adjusts the operating frequency between a first reference frequency f1 and a second reference frequency f2. The duty cycle in the normal mode is a duty cycle of the signal used by the wireless power transmitter to determine whether or not the wireless power receiver is present. In the normal mode, when the wireless power receiver 2 is at a predetermined distant from the wireless power transmitter 1 that would require a larger amount of power to charge the wireless power receiver 2, the wireless power transmitter increases an amount of power to the wireless power receiver 2 by decreasing the frequency. Alternatively, in the normal mode, when the wireless power receiver 2 is at a close distance to the wireless power transmitter 1 that would require a smaller amount of power, the wireless power transmitter 1 decreases an amount of power to the wireless power receiver 2 by increasing the frequency.

Also, when the amount of power required by the wireless power receiver 2 is higher than the maximum value of the power that the wireless power receiver 2 is received in the normal mode, the wireless power transmitter 1 changes the operation mode to the boost mode so that the wireless power receiver 2 receives an amount of power equal to or more than an amount of power that is received in the normal mode. In this case, the operating frequency of the wireless power transmitter is fixed to the first reference frequency f1, and the duty cycle is adjusted. Further, when the amount of power received by the wireless power receiver is not sufficiently large, even when the duty cycle is increased to a limit value of a defined range, the wireless power transmitter 1 further decreases the operating frequency after fixing the duty cycle to the limit value. A detailed operation in the boost mode will be described below.

In addition, when the amount of power required by the wireless power receiver 2 is lower than the minimum value of the power that is received in the normal mode, the wireless power transmitter 1 changes the operation mode to the reduction mode. In this case, the operating frequency of the wireless power transmitter 1 is fixed to the second reference frequency f2, and the duty cycle is adjusted. Alternatively, the wireless power transmitter may operate as a full bridge and then operate as a half bridge. A detailed operation in the reduction mode will be described below.

The first reference frequency f1 and the second reference frequency f2 may be equal to the minimum frequency f_min and the maximum frequency f_max, respectively. The minimum frequency f_min and the maximum frequency f_max is a lower limit value and an upper limit value, respectively, of a usable frequency range defined by standards or other protocols. Alternatively, the first reference frequency f1 and the second reference frequency f2 may also be determined by considering a degree of heating of the wireless power receiver 2 or a range of a spatial region to be charged using the wireless power transmitter 1 in the range of the minimum frequency f_min to the maximum frequency f_max. By determining the first reference frequency f1 and the second reference frequency f2 as described above, the wireless power transmitter 1 is more stably operated within a defined range, and prevents damage or over-heating of an element in the wireless power receiver 2.

Alternatively, the first reference frequency f1 and the second reference frequency f2 are determined by considering power transfer characteristics between the wireless power transmitter 1 and the wireless power receiver 2, respectively, in the range of the minimum frequency f_min to the maximum frequency f_max, respectively.

In a case in which the operating frequency is within a predetermined range as illustrated in FIG. 6, because a variation of the gain according to a variation of the frequency is not excessively high, or is not excessively low, it is easy to control the wireless power transmitter 1 so that the wireless power receiver 2 receives an appropriate amount of power. However, because the variation of the gain according to the variation of the operating frequency may be excessively large when the operating frequency falls to a predetermined threshold value f2 or less, and the variation of the gain according to the variation of the operating frequency may be excessively small when the operating frequency reaches a predetermined threshold value f1 or more, it is difficult to control the wireless power transmitter 1 so that the wireless power receiver 2 receives an appropriate amount of power.

In consideration of the above-mentioned aspects, when the wireless power transmitter 1 is operated in the normal mode, the first reference frequency f1 and the second reference frequency f2 are determined so that the variation of the gain, according to the variation of the operating frequency, is within a reference range. That is, referring to the graph illustrated in FIG. 6, the first reference frequency f1 is determined as a frequency at which the variation of the gain, according to the variation of the frequency in the range of the minimum frequency f_min to the maximum frequency f_max, is a predetermined maximum value. Further, the second reference frequency f2 is determined as a frequency at which the variation of the gain, according to the variation of the frequency in the range of the minimum frequency f_min to the maximum frequency f_max, is a predetermined minimum value.

By determining the first reference frequency f1 and the second reference frequency f2 as described above, the wireless power transmitter 1 prevents damage or over-heating of an element in the wireless power receiver 2, and precisely controls power transmissions to the wireless power receiver.

The first reference frequency f1 and the second reference frequency f2 are determined and preset in advance, or may be input externally. Alternatively, the first reference frequency f1 and the second reference frequency f2 may also be set or changed in the wireless power transmitter 1 after the wireless power transmitter 1 is operated. In order to set or change the first reference frequency f1 and the second reference frequency f2, the wireless power transmitter 1 executes a process to calculate both reference frequencies f1 and f2 using an additional hardware configuration for this purpose.

In addition, as illustrated in FIG. 6, the voltage gain may have the maximum value at a resonance frequency f_r. The resonance frequency f_r is a resonance frequency of a resonator of the wireless power transmitter to be described below. In an example, the minimum frequency f_min is about 110% of the resonance frequency f_r, and the maximum frequency f_max is about 150% of the resonance frequency f_r.

Figure 7:
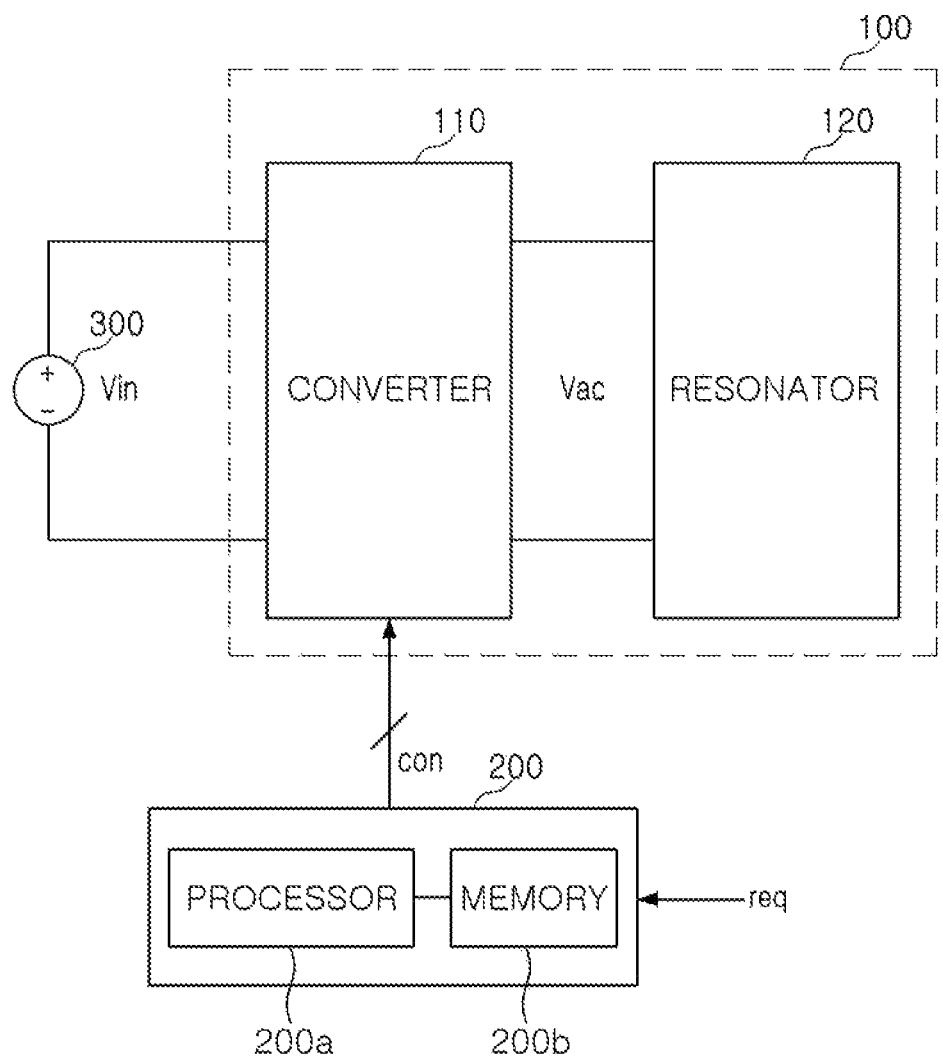
FIGS. 7 through 15 are diagrams schematically illustrating a configuration of a wireless power transmitter, according to embodiments.

FIG. 7 is a block diagram schematically illustrating a configuration of the wireless power transmitter 1 including a circuit 100 and a controller 200, according to an embodiment. The circuit 100 includes a converter 110 and a resonator 120. In FIG. 7, reference numeral 300 denotes an input power source.

The circuit 100 receives an input voltage Vin from the input power source 300, and wirelessly transmits the power in response to at least one control signal con. An amount and frequency of the power wirelessly transmitted may vary by the control signal con.

The converter 110 converts the input voltage Vin into an alternating current (AC) voltage Vac in response to the control signal con, and outputs the converted AC voltage. An amplitude and frequency of the AC voltage Vac are determined according to the control signal con. For example, the amplitude of the AC voltage Vac is determined according to a duty cycle of the control signal con. In one example, in response to an occurrence of a plurality of control signals con, the duty cycle of some or all of the control signals con determines the amplitude of the AC voltage Vac. In addition, the frequency of the AC voltage Vac is determined according to a frequency of the control signal con. In one example, in response to an occurrence of a plurality of control signals con, the frequency of some or all of the control signals con determines the frequency of the AC voltage Vac.

The frequency of the AC voltage Vac is greater than the resonance frequency f_r (FIG. 6) of the resonator 120. For example, the frequency of the AC voltage Vac is also determined to be between about 110% to about 150% of the resonance frequency f_r (FIG. 6) of the resonator 120.

The converter 110 may be implemented in various forms. For example, the converter 110 is a boost converter and an inverter, or only the inverter. The converter 110 may also include a boost inverter that performs both the function of the boost converter and the function of the inverter.

The resonator 120 is provided with the AC voltage Vac, and transmits a signal to determine whether the wireless power receiver 1 is present such as the analog ping signal or the digital ping signal, or wirelessly transmits the power. The resonator 120 wirelessly transmits the signal and/or the power by changing a surrounding magnetic field according to the AC voltage Vac. The resonator 120 includes a resonance capacitor and a resonance coil, and the resonance frequency f_r (FIG. 6) of the resonator 120 is determined by capacitance of the resonance capacitor and inductance of the resonance coil.

The controller 200 outputs at least one control signal con in response to a request signal req. The controller 200 adjusts a duty cycle and/or a frequency of the control signal con in response to the request signal req. The request signal req is input from the wireless power receiver 2, and is indicative of an amount of power required by the wireless power receiver 2. For example, the request signal req is a signal requesting an amount of power wirelessly transmitted by the wireless power transmitter 1 to increase, or is a signal requesting the amount of power to decrease. Alternatively, the request signal req is a signal representing a difference between the amount of power required by the wireless power receiver and an amount of power actually received by the wireless power receiver. The controller 200 determines whether to increase or decrease the amount of transmitted power based on the request signal req, and adjusts an operating duty cycle and an operating frequency of the control signal con accordingly.

For example, the controller 200 adjusts the operating frequency in the normal mode, and adjusts the operating duty cycle, or adjusts both the operating duty cycle and the operating frequency in the boost mode or the reduction mode. For example, in the normal mode, the controller 200 decreases the frequency in response to a distance between the wireless power receiver 2 and the wireless power transmitter 1 increasing, and increases the frequency in response to the distance decreasing. In addition, in the boost mode or the reduction mode, the controller 200 increases the duty cycle in response to the distance between the wireless power receiver 2 and the wireless power transmitter 1 increasing, and decreases the duty cycle in response to the distance decreasing.

As an example, when the operating frequency corresponds to a lowest reference frequency and a normal mode operation is performed, if the request signal req requests the amount of power to increase, the controller 200 executes a control so that the operation mode is switched from the normal mode to the boost mode.

As another example, when the operating duty cycle corresponds to a lowest reference duty cycle and a boost mode operation is performed, if the request signal req requests the amount of power to decrease, the controller 200 executes a control so that the operation mode is switched from the boost mode to the normal mode.

A detailed operation of the controller 200 and controllers 201-208, according to embodiments, will be described below with reference to FIGS. 16 through 46.

As shown in FIG. 7, controller 200 includes at least one processor 200a. According to an embodiment, the controller 200 further includes a memory 200b. The processor 200a includes, a central processing unit (CPU), a graphics processing unit (GPU), a microprocessor, an application specific integrated circuit (ASIC), and/or field programmable gate arrays (FPGAs), and may have a plurality of cores. The memory 200b is a volatile memory (e.g., a random access memory (RAM)), a non-volatile memory (e.g., a read only memory (ROM) or a flash memory), or a combination thereof. A program including instructions configured to perform a wireless power transmission method according is stored in the memory.

The controller 200 includes a gate driver. Alternatively, the wireless power transmitter 1 separately or externally thereto includes the gate driver to drive switches included in the converter 110 according to the control signal con provided by the controller 200.

The input power source 300 outputs the input voltage Vin. For example, the input power source 300 is an adapter that converts an alternating current (AC) voltage input from the outside into a direct current (DC) voltage and outputs the converted DC voltage. A level of the input voltage Vin output from the input power source 300 is one of various voltage levels which are standardized in a wireless power transmission and reception system. For example, the input voltage is one of 5V, 9V, and 12V.

Figure 8:
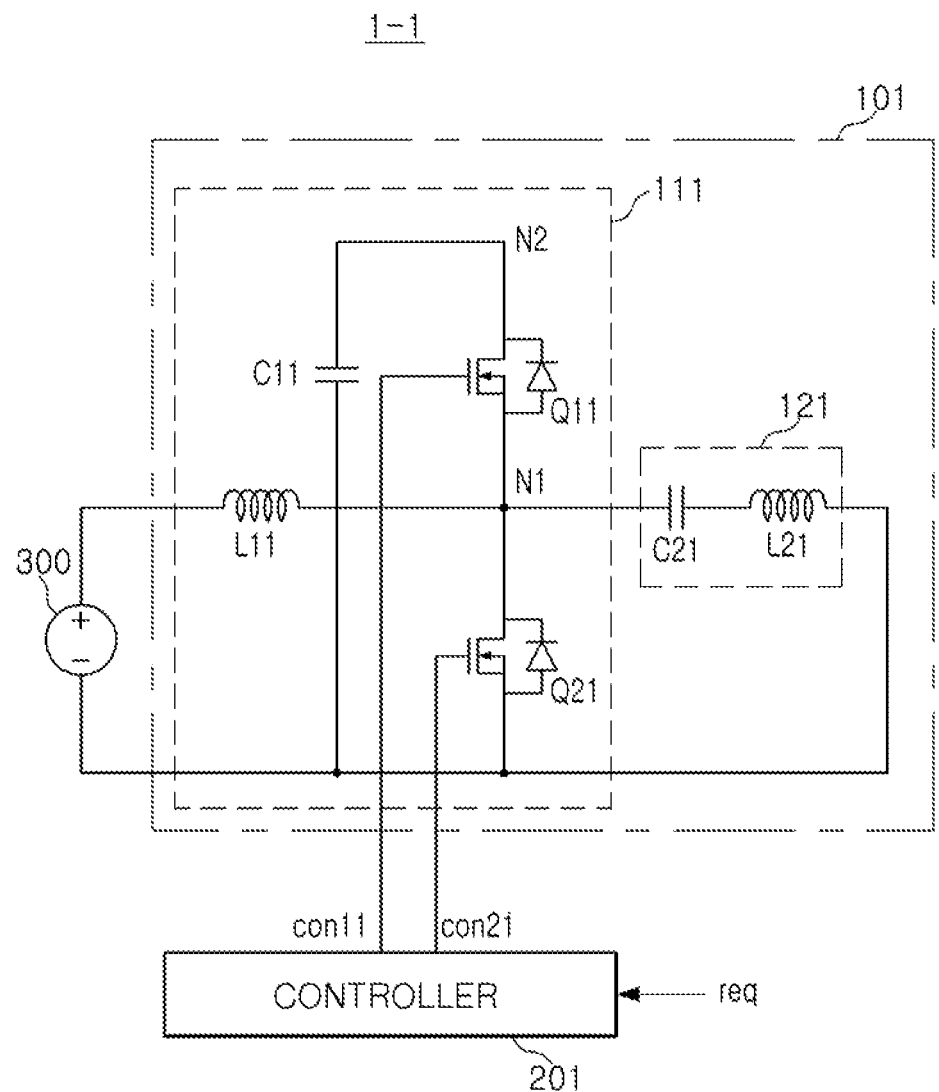

FIG. 8 is a diagram schematically illustrating a configuration of a wireless power transmitter 1-1 including a circuit 101 and a controller 201, according to an embodiment. The circuit 101 includes a converter 111 and a resonator 121. The converter 111 includes switching elements Q11 and Q21, a first coil L11, and a first capacitor C11. The resonator 121 includes a second capacitor C21 and a second coil L21.

Functions of the circuit 101, the converter 111, the resonator 121, the controller 201, and the input power source 300 may be substantially the same as those of the circuit unit 100, the converter 110, the resonator 120, the controller 200, and the input power source 300, respectively, described in FIG. 7.

An amplitude of the AC voltage output from the converter 111 is determined according to magnitude of a voltage of a second node N2, that is, a boost voltage. The magnitude of the boost voltage Vboost is determined by Equation 1.

$$Vboost = Vin/(1-D) \qquad [\text{Equation 1}]$$

In Equation 1, Vin is a magnitude of a voltage of power input from the input power source 300, and D is an ON-duty cycle of a second control signal con21.

The duty cycle in the boost mode is greater than the duty cycle in the normal mode. Therefore, a boost voltage in the boost mode is greater than a boost voltage in the normal mode, and consequently, an amount of power transmitted by the wireless power transmitter 1-1 in the boost mode is greater than an amount of power transmitted by the wireless power transmitter 1-1 in the normal mode.

In addition, a voltage of a first node N1 is the AC voltage output from the converter 111, and the AC voltage Vinv(t) output from the converter 111 is determined by Equation 2.

$$V\text{inv}(t)=2(V\text{in}/(1-D))\sin(wt/\pi) \quad \text{[Equation 2]}$$

In Equation 2, w denotes a frequency of a first control signal con11 and the second control signal con21.

The first coil L11 is connected between a terminal to which the input voltage is applied and the first node N1. The first switching element Q11 is connected between the first node N1 and the second node N2. The second switching element Q21 is connected between the first node N1 and a ground terminal. The first capacitor C11 is connected between the second node N2 and the ground terminal. The AC voltage generated by the converter 111 is output to the first node N1. The voltage of the second node N2 is a boost voltage obtained by boosting the input voltage by the converter 111. The first switching element Q11 is turned on and off in response to the first control signal con11, and the second switching element Q21 is turned on and off in response to the second control signal con21. In addition, the first switching element Q11 and the second switching element Q21 are turned on and off, complementarily to each other.

In other words, the converter 111 includes a bridge circuit, and the bridge circuit includes the first switch Q11 and the second switch Q21 connected in series with each other and configured to alternately operate. One terminal of the inductor L11 is connected to one terminal of the input power source 300, and the other terminal of the inductor L11 is connected to a connection terminal (node N1), between the first and second switches. One terminal of the output capacitor C11 is connected to one terminal of a half-bridge circuit, and the other terminal of the output capacitor C11 is connected to the other terminal of the input power source 300 and the other terminal of the half-bridge circuit.

In an embodiment, the converter 111 simultaneously performs a function as the boost converter that boosts the input voltage to the boost voltage according to the duty cycle of the control signals con11 and con21, and a function as the inverter converting the DC voltage into the AC voltage. Specifically, the switching elements Q11 and Q12, the first capacitor C11, and the first coil L11 are operated as the boost converter. In addition, the switching elements Q11 and Q12 may also operate as the inverter. In other words, the converter 111 includes a boost inverter having a form in which the boost converter and the inverter are coupled to each other and commonly use the switching elements Q11 and Q12.

More specifically, charges are accumulated in the first capacitor C11 through the switching operation of the switching elements Q11 and Q21 configuring the half-bridge circuit, such that a voltage across the first capacitor C11 becomes the boost voltage. The boos voltage is obtained by boosting the input voltage provided by the input power source 300, and the magnitude of the boost voltage is determined by the duty cycle of the control signals con11 and con21. In addition, the AC voltage generated by using the boost voltage accumulated in the output capacitor C11 is applied across the resonator 121, through the switching operation of the switching elements Q11 and Q21 configuring the half-bridge circuit. The amplitude of the AC voltage is determined by the magnitude of the boost voltage. The frequency of the AC voltage is determined by the frequency of the control signals con11 and con21.

In an embodiment, the switching operation of the switching elements Q11 and Q21 is controlled differently according to the modes of the wireless power transmitter 1-1.

The second capacitor C21 and the second coil L21 are connected in series between the first node N1 and the ground terminal. The second capacitor C21 is the resonance capacitor, the second coil L21 is the resonance coil, and an LC resonance is provided by the second capacitor C21 and the second coil L21. Therefore, the resonance frequency f_r (FIG. 6) of the resonator 121 is determined by a capacitance of the second capacitor C21 and an inductance of the second coil L21. That is, the capacitance of the second capacitor C21 and the inductance of the second coil L21 are determined according to a general environment in which the wireless power transmitter 1-1 is used, for example, a wireless power transmission standard. A frequency range of the control signals con11 and con21 is determined based on the resonance frequency determined according to the determined capacitance and inductance of the second capacitor C21 and the second coil L21, respectively.

The controller 201 outputs the control signals con11 and con21 in response to the request signal req. The controller 201 adjusts a duty cycle and/or a frequency of the control signals con11 and con21 in response to the request signal req.

Figure 9:
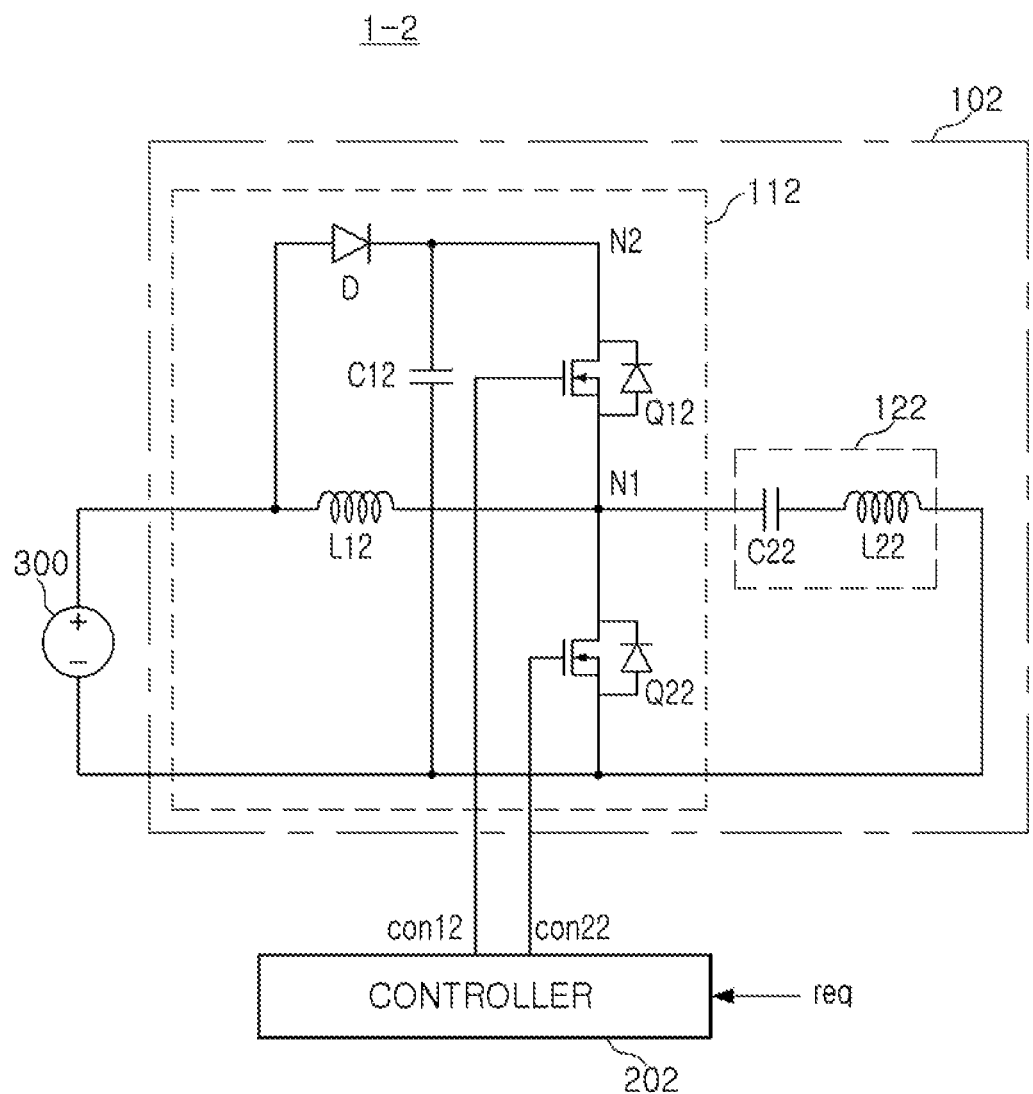

FIG. 9 is a diagram schematically illustrating a configuration of a wireless power transmitter 1-2 including a circuit 102 and a controller 202, according to an embodiment. The circuit 102 includes a converter 112 and a resonator 122. The converter 112 includes switching elements Q12 and Q22, a first coil L12, a first capacitor C12, and a diode D. The resonator 122 includes a second capacitor C22 and a second coil L22.

Functions of the circuit 102, the converter 112, the resonator 122, the controller 202, and the input power source 300 may be substantially the same as those of each of the circuit 100, the converter 110, the resonator 120, the controller 200, and the input power source 300, respectively, described in FIG. 7. In addition, a configuration and an operation of the resonator 122 may be the same as those of the resonator 121 described in FIG. 8.

The first coil L12 is connected between a terminal to which the input voltage is applied and the first node N1. The first switching element Q12 is connected between the first node N1 and the second node N2. The second switching element Q22 is connected between the first node N1 and a ground terminal. The first capacitor C12 is connected between the second node N2 and the ground terminal. The diode D is connected between the second node N2 and the terminal to which the input voltage is applied. The AC voltage generated by the converter 112 is output to the first node N1. The voltage of the second node N2 is a boost voltage obtained by the converter 112 boosting the input voltage. The first switching element Q12 is turned on and off in response to a first control signal con12, and the second switching element Q22 is turned on and off in response to a second control signal con22. In addition, the first switching element Q12 and the second switching element Q22 are turned on and off in compliment of each other.

An operation of the converter 112 can be easily understood with reference to the operation of the converter 111 described in FIG. 8. In addition, as illustrated in FIG. 9, the converter 112 includes half-bridge circuits Q12 and Q22 that perform both the functions of the boost converter and the inverter. That is, the converter 112 includes the boost converter and the inverter, and the boost converter and the inverter share the switching elements Q12 and Q22.

Because the converter 112 includes the diode D to prevent a reverse current flowing through the terminal to which the input voltage is applied from a boost node, the converter 112 is thus configured to prevent a ripple caused by a complementary switching operation of the first switching element Q12 and the second switching element Q22.

Figure 10:
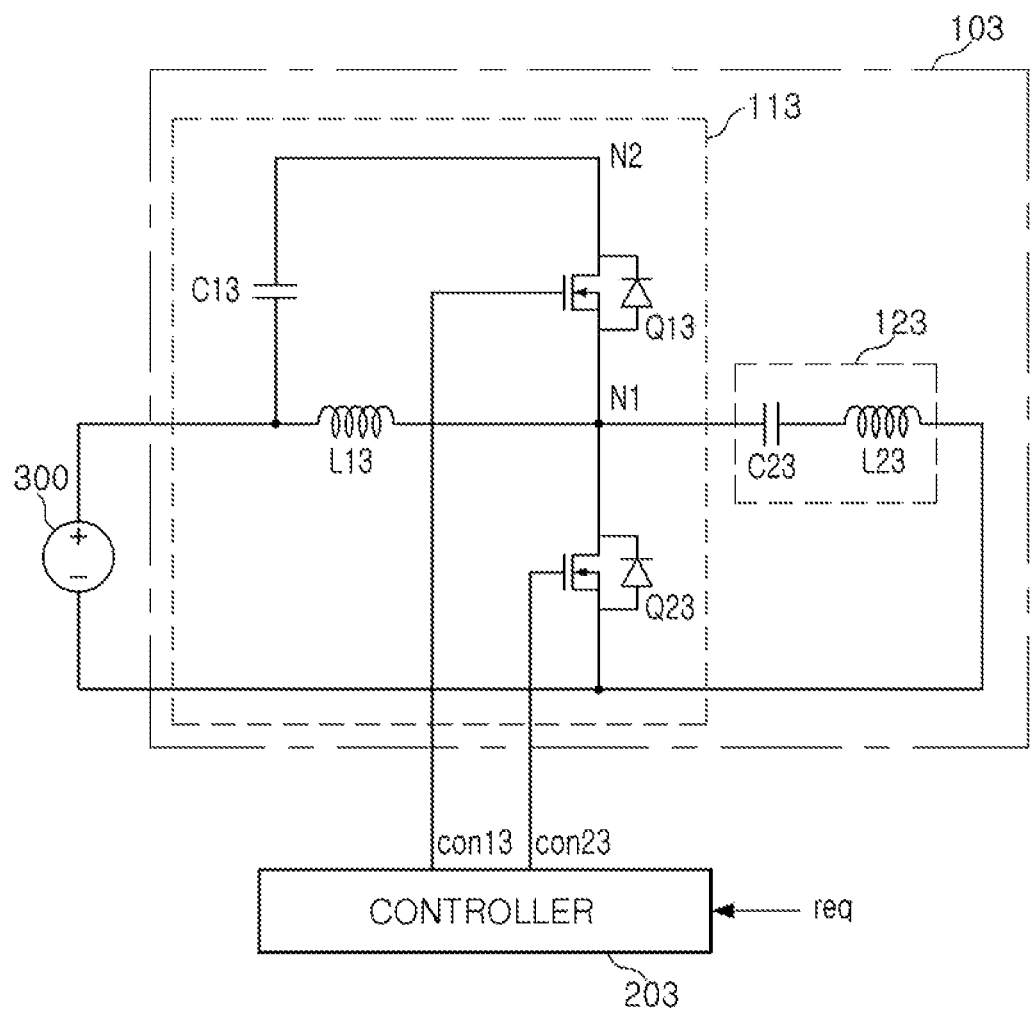

FIG. 10 is a diagram schematically illustrating a configuration of a wireless power transmitter 1-3 including a circuit 103 and a controller 203, according to an embodiment. The circuit 103 includes a converter 113 and a resonator 123. The converter 113 includes switching elements Q13 and Q23, a first coil L13 and a first capacitor C13. The resonator 123 includes a second capacitor C23 and a second coil L23.

Functions of the circuit 103, the converter 113, the resonator 123, the controller 203, and the input power source 300 may be substantially the same as those of the circuit 100, the converter 110, the resonator 120, the controller 200, and the input power source 300, respectively, described in FIG. 7. In addition, a configuration and an operation of the resonator 122 may be the same as those of the resonator 121 described in FIG. 8.

The first coil L13 is connected between a terminal to which the input voltage is applied and the first node N1. The first switching element Q13 is connected between the first node N1 and the second node N2. The second switching element Q23 is connected between the first node N1 and a ground terminal. The first capacitor C13 is connected between the second node N2 and the terminal to which the input voltage is applied. The AC voltage generated by the converter 113 is output to the first node N1. The voltage of the second node N2 is a boost voltage obtained by boosting the input voltage by the converter 113. The first switching element Q13 is turned on and off in response to a first control signal con13, and the second switching element Q23 is turned on and off in response to a second control signal con23. In addition, the first switching element Q13 and the second switching element Q23 are turned on and off in complement to each other.

An operation of the converter 113 can be understood with reference to the operation of the converter 111 described in FIG. 8. In addition, as illustrated in FIG. 10, the converter 113 includes half-bridge circuits Q13 and Q23, which perform both the functions of the boost converter and the inverter. That is, the converter 113 includes the boost converter and the inverter, and the boost converter and the inverter share the switching elements Q13 and Q23.

The converter 113 improves initial operation performance by causing an initial voltage of the first capacitor C13 to be the input voltage. In addition, the converter 113 prevents a ripple that may be caused when a boosting is performed by an alternative operation of the switching elements Q13 and Q23.

Figure 11:
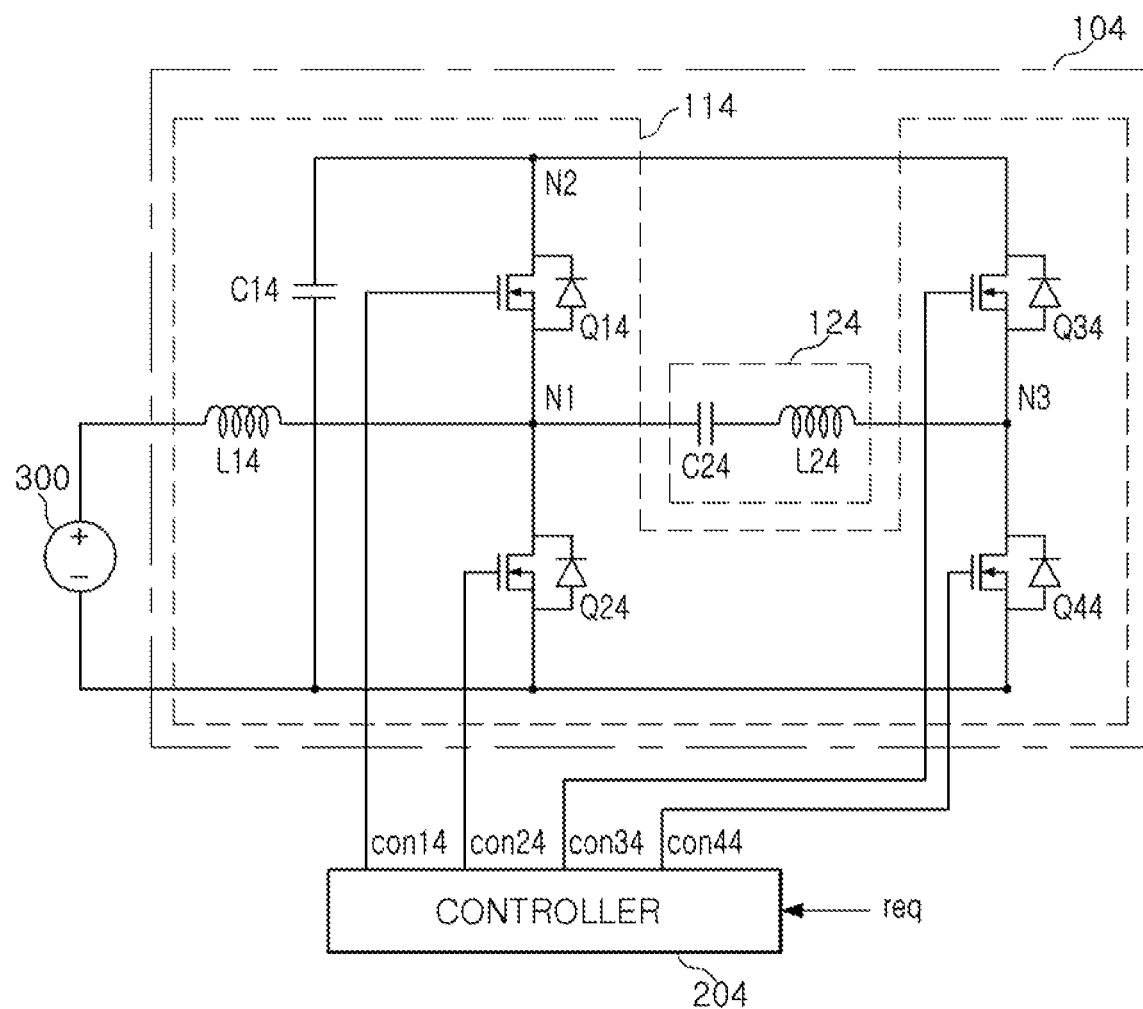

FIG. 11 is a diagram schematically illustrating a configuration of a wireless power transmitter 1-4 including a circuit 104 and a controller 204, according to an embodiment. The circuit 104 includes a converter 114 and a resonator 124. The converter 114 includes switching elements Q14, Q24, Q34, and Q44, a first coil L14, and a first capacitor C14. The resonator 124 includes a second capacitor C24 and a second coil L24.

Functions of the circuit 104, the converter 114, the resonator 124, the controller 204, and the input power source 300 may be substantially the same as those of the circuit unit 100, the converter 110, the resonator 120, the controller 200, and the input power source 300, respectively, described in FIG. 7. In addition, a configuration and an operation of the resonator 122 may be the same as those of the resonator 121 described in FIG. 8.

The first coil L14 is connected between a terminal to which the input voltage is applied and the first node N1. The first switching element Q14 is connected between the first node N1 and the second node N2. The second switching element Q24 is connected between the first node N1 and a ground terminal. The third switching element Q34 is connected between the second node N2 and a third node N3. The fourth switching element Q44 is connected between the third node N3 and a ground node. The first capacitor C14 is connected between the second node N2 and the ground node. A voltage between the first node N1 and the third node N3 is the AC voltage generated by the converter 114. The voltage of the second node N2 is a boost voltage obtained by the converter 114 boosting the input voltage. The first switching element Q14 is turned on and off in response to a first control signal con14. The second switching element Q24 is turned on and off in response to a second control signal con24. The third switching element Q34 is turned on and off in response to a third control signal con34. The fourth switching element Q44 is turned on and off in response to a fourth control signal con44. In addition, the first switching element Q14 and the second switching element Q24 are turned on and off in complement to each other, and the third switching element Q34 and the fourth switching element Q44 are turned on and off in complement to each other. The third switching element Q34 maintains an OFF state, or is turned on and off at the same time as the second switching element Q24. Further, the fourth switching element Q44 maintains an ON state, or is turned on and off at the same time as the first switching element Q14.

The resonator 124 is connected between the first node N1 and the third node N3.

That is, the converter 114 is implemented as a full-bridge circuit. In some cases, the third switching element Q34 maintains the OFF state and the fourth switching element Q44 maintains the ON state, such that the converter is operated in the same manner as the half-bridge circuit. The third switching element Q34 is turned on and off at the same time as the second switching element Q24, and the fourth switching element Q44 is turned on and off at the same time as the first switching element Q14, such that the converter 114 is operated in the same manner as the full-bridge circuit. In some cases, the third switching element Q34 and the fourth switching element Q44 are each turned on and off at a different time from that of each of the second switching element Q24 and the first switching element Q14, and the converter 114 is then also operated as the full-bridge circuit.

In the embodiment illustrated in FIG. 11, the first coil L14, the first capacitor C14, the first switching element Q14, and the second switching element Q24 are operated as the boost converter. Also, in the embodiment illustrated in FIG. 11, the first switching element Q14, the second switching element Q24, the third switching element Q34, and the fourth switching element Q44 are operated as the inverter. That is, the first switching element Q14 and the second switching element Q24 are operated as the boost converter, and are simultaneously operated as the inverter. In other words, the boost converter and the inverter share the first switching element Q14 and the second switching element Q24 and are coupled to each other.

An output voltage Vinv(t) of the converter 114 of the wireless power transmitter 1-4 of FIG. 11, that is, a voltage between the first node N1 and the third node N3, is determined by Equation 3.

$$Vinv(t)=4(Vin/(1-D))\sin(wt/\pi) \quad \text{[Equation 3]}$$

In Equation 3, Vin is magnitude of a voltage of power input from the input power source 300, D is a duty cycle of a control signal con24, and w is a frequency of control signals con14, con24, con34, and con44.

That is, according to the embodiment of FIG. 11, because the same effect as that of doubling the input voltage is obtained when compared to the half-bridge circuit, current stress of the coil is reduced, and efficiency is further improved.

Figure 12:
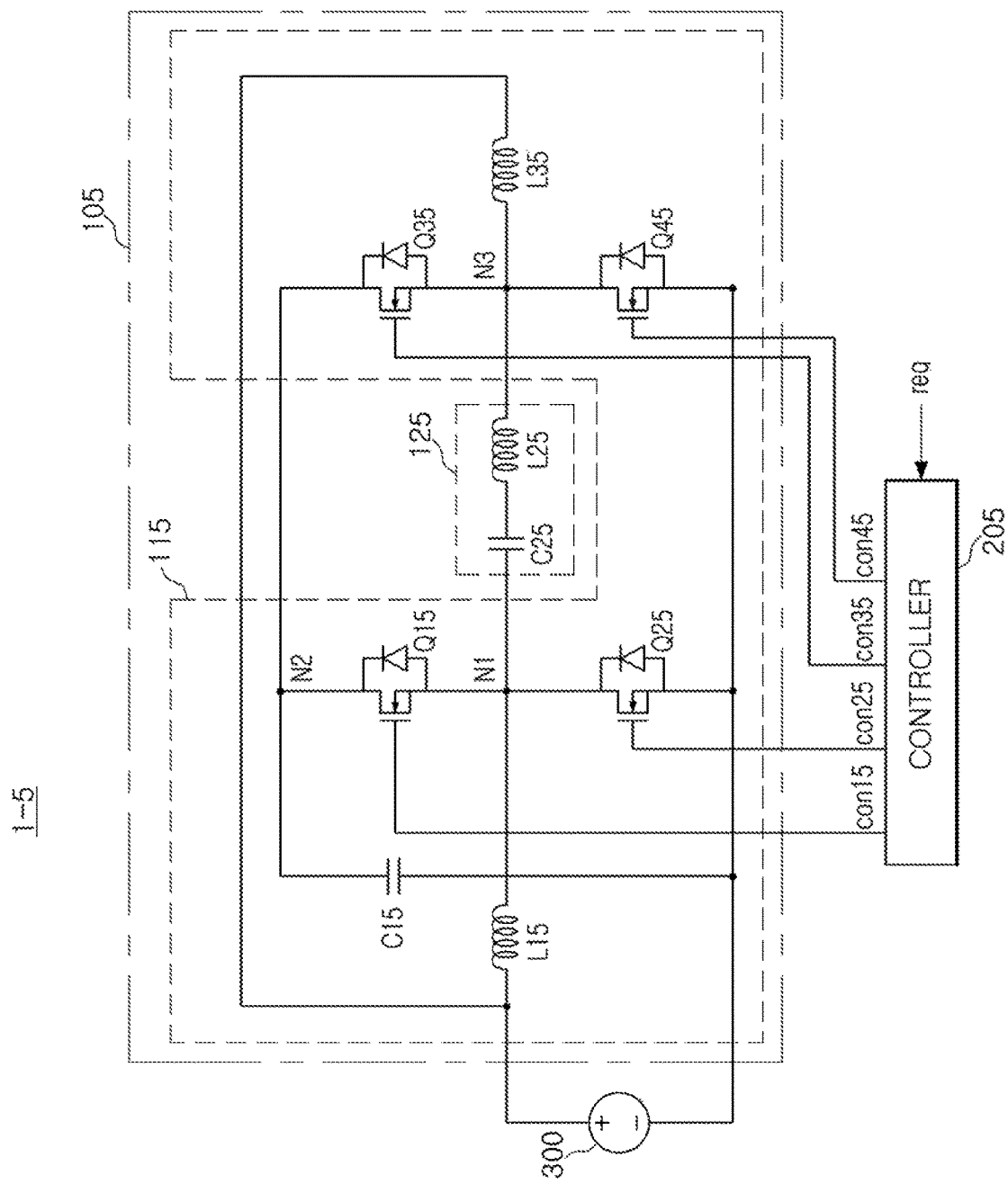

FIG. 12 is a diagram schematically illustrating a configuration of a wireless power transmitter 1-5 including a circuit 105 and a controller 205, according to an embodiment. The circuit 105 includes a converter 115 and a resonator 125. The converter 115 includes switching elements Q15, Q25, Q35, and Q45, a first coil L15, a third coil L35, and a first capacitor C15. The resonator 125 includes a second capacitor C25 and a second coil L25.

Functions of the circuit 105, the converter 115, the resonator 125, the controller 205, and the input power source 300 may be substantially the same as that of each of the circuit unit 100, the converter 110, the resonator 120, the controller 200, and the input power source 300, respectively, described in FIG. 7. In addition, a configuration and an operation of the resonator 125 may be the same as those of the resonator 121 described in FIG. 8.

The first coil L15 is connected between a terminal to which the input voltage is applied and the first node N1. The first switching element Q15 is connected between the first node N1 and the second node N2. The second switching element Q25 is connected between the first node N1 and a ground terminal. The third switching element Q35 is connected between the second node N2 and a third node N3. The fourth switching element Q45 is connected between the third node N3 and a ground node. The third coil L35 is connected between the terminal to which the input voltage is applied and the third node N3. The first capacitor C15 is connected between the second node N2 and the ground node. A voltage between the first node N1 and the third node N3 is the AC voltage generated by the converter 115. The voltage of the second node N2 is a boost voltage obtained by boosting the input voltage by the converter 115. The first switching element Q15 is turned on and off in response to a first control signal con15. The second switching element Q25 is turned on and off in response to a second control signal con25. The third switching element Q35 is turned on and off in response to a third control signal con35. The fourth switching element Q45 is turned on and off in response to a fourth control signal con45. In addition, the first switching element Q15 and the second switching element Q25 are turned on and off in complement to each other, and the third switching element Q35 and the fourth switching element Q45 are turned on and off in complement to each other. The third switching element Q35 maintains an OFF state, or is turned on and off at the same timing as the second switching element Q25. The fourth switching element Q45 maintains an ON state, or is turned on and off at the same timing as the first switching element Q15.

The resonator 125 is connected between the first node N1 and the third node N3.

That is, the converter 115 is implemented as a full-bridge circuit. In some cases, the third switching element Q35 maintains the OFF state and the fourth switching element Q45 maintains the ON state, such that the converter is operated in the same manner as the half-bridge circuit, and the third switching element Q35 is turned on and off at the same time as the second switching element Q25, and the fourth switching element Q45 is turned on and off at the same time as the first switching element Q15, such that the converter 115 is operated in the same manner as the full-bridge circuit. In some cases, the third switching element Q35 and the fourth switching element Q45 are each turned on and off at a different time from that of each of the second switching element Q25 and the first switching element Q15, and the converter 115 is also be operated as the full-bridge circuit.

In the embodiment illustrated in FIG. 12, the first coil L15, the third coil L25, the first capacitor L15, the first switching element C15, the second switching element Q25, the third switching element Q35, and the fourth switching element Q45 are operated as the boost converter. The first switching element Q15, the second switching element Q24, the third switching element Q35, and the fourth switching element Q45 are operated as the inverter. That is, the first switching element Q15, the second switching element Q24, the third switching element Q35, and the fourth switching element Q45 are operated as the boost converter, and are simultaneously operated as the inverter. In other words, the boost converter and the inverter share the first switching element Q15, the second switching element Q24, the third switching element Q35, and the fourth switching element Q45, and are coupled to each other.

According to the embodiment of FIG. 12, because the converter is operated as the full-bridge circuit to obtain the same effect as that of the input voltage being doubled when compared to the half-bridge circuit, current stress of the coil is reduced, and efficiency is improved. In addition, because the third switching element Q35 and the fourth switching element Q45 also contribute to boosting the input voltage, a capacitor having lower capacitance is used as the first capacitor C15.

Figure 13:
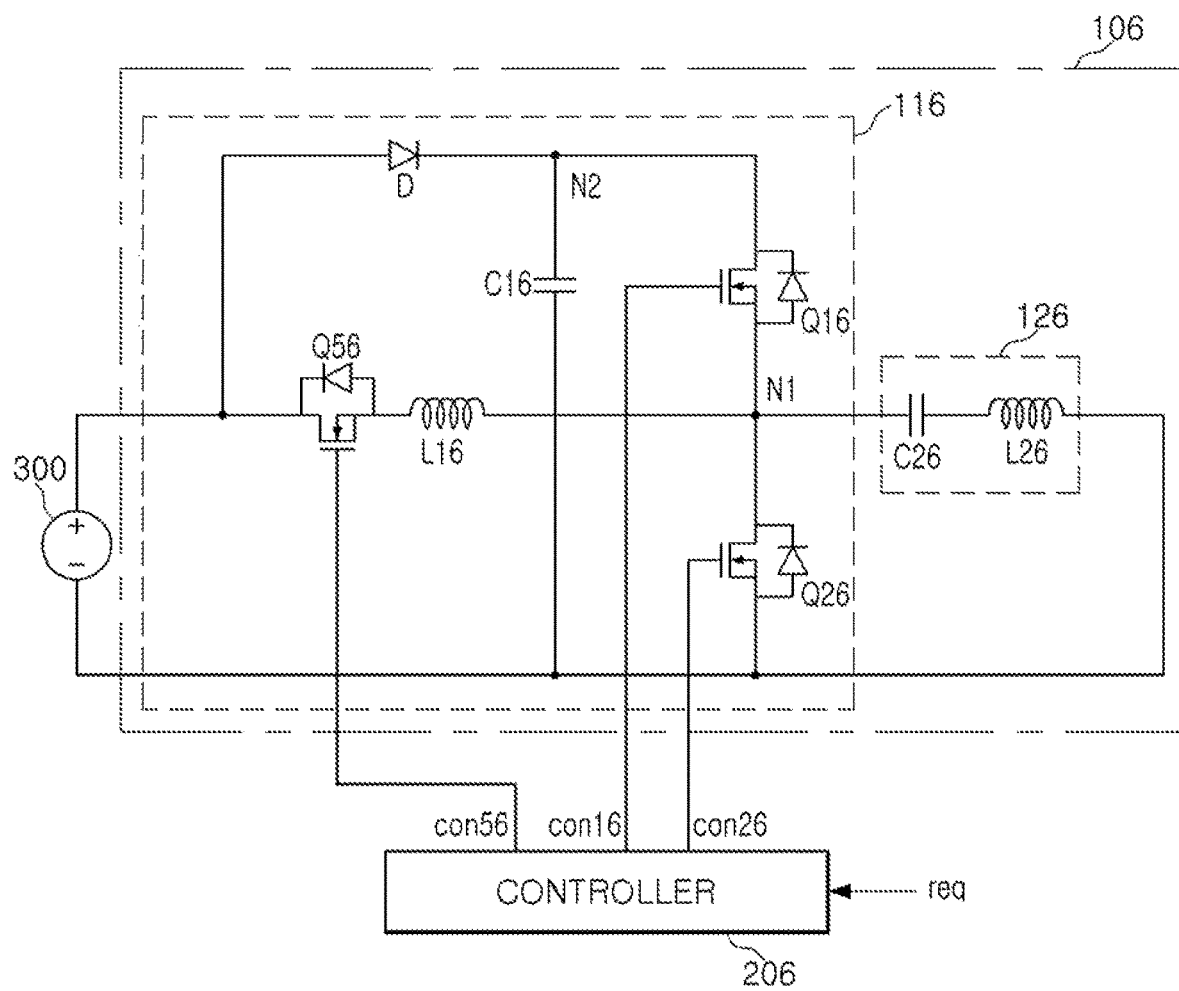

FIG. 13 is a diagram schematically illustrating a configuration of a wireless power transmitter 1-6 including a circuit 106 and a controller 206, according to an embodiment. The circuit 106 includes a converter 116 and a resonator 126. The converter 116 includes switching elements Q16, Q26, and Q56, a first coil L16, a first capacitor C16, and a diode D. The resonator 126 includes a second capacitor C26 and a second coil L26.

Functions of the circuit 106, the converter 116, the resonator 126, the controller 206, and the input power source 300 may be substantially the same as that of each of the circuit 101, the converter 111, the resonator 121, the controller 201, and the input power source 300, respectively, described in FIG. 8. In addition, a configuration and an operation of the resonator 126 may be the same as those of the resonator 121 described in FIG. 8.

The first coil L13 and a fifth switching element Q56 are connected in series between a terminal to which the input voltage is applied and the first node N1. The switching element Q16 is connected between the first node N1 and the second node N2. The second switching element Q26 is connected between the first node N1 and a ground terminal. The first capacitor C16 is connected between the second node N2 and the ground terminal. The diode D is connected between the second node N2 and the terminal to which the input voltage is applied. The AC voltage generated by the converter 116 is output to the first node N1. The voltage of the second node N2 is a boost voltage obtained by boosting the input voltage by the converter 116. The first switching element Q16 is turned on and off in response to a first control signal con16. The second switching element Q26 is turned on and off in response to a second control signal con22. The fifth switching element Q56 is turned on and off in response to a fifth control signal con56. In addition, the first switching element Q16 and the second switching element Q26 are turned on and off in complement to each other.

An operation of the converter 116 can be understood with reference to the operation of the converter 111 described in FIG. 8. In addition, as illustrated in FIG. 13, the converter 116 includes half-bridge circuits Q16 and Q26 that perform both, the functions of the boost converter and the inverter. That is, the converter 116 includes the boost converter and the inverter, and the boost converter and the inverter share the switching elements Q16 and Q26.

The fifth switching element Q56 is turned on and off according to the magnitude of the input voltage input from the input power source 300. For example, when the magnitude of the input voltage is a reference value or less, the fifth switching element Q56 is turned on. When the magnitude of the input voltage is greater than the reference value, the fifth switching element Q56 is turned off. When the fifth switching element Q56 is turned off, the converter 116 does not function as the boost converter, and functions only as the inverter.

Therefore, according to the embodiment of FIG. 13, because the function of the converter 116 varies depending on the magnitude of the input voltage, the power is efficiently transmitted.

Although not illustrated, the fifth switching element Q56 may also be added to each of the embodiments of FIGS. 8, 10, 11, and 12. In addition, the diode D of FIG. 9 may also be added to the embodiments of FIGS. 11 and 12. In addition, the first capacitor C14 and C15, according to the embodiments of FIGS. 11 and 12, may be connected in the same manner as the first capacitor C13, according to the embodiment of FIG. 10.

Figure 14:
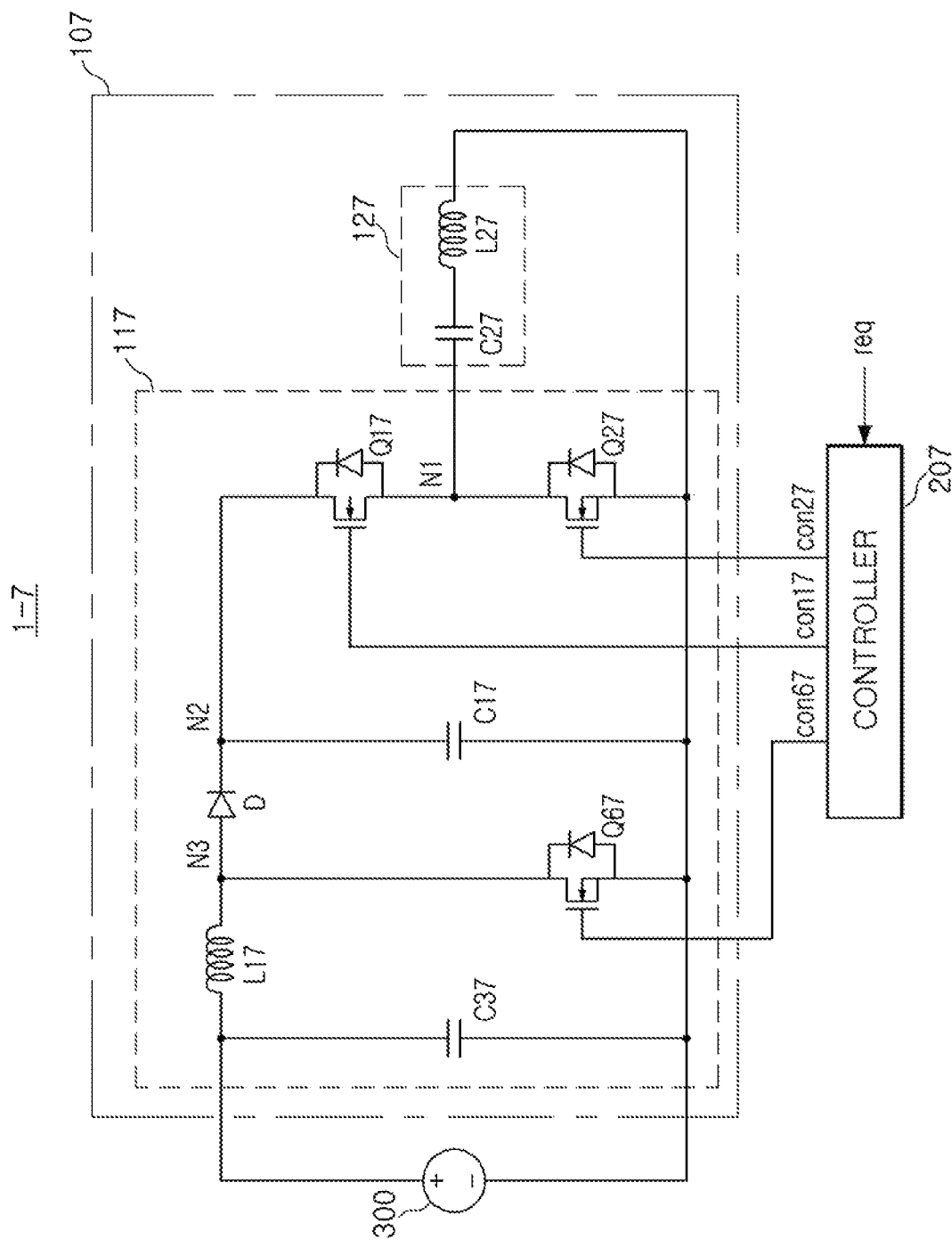

FIG. 14 is a diagram schematically illustrating a configuration of a wireless power transmitter 1-7 including a circuit 107 and a controller 207, according to an embodiment. The circuit 107 includes a converter 117 and a resonator 127. The converter 117 includes switching elements Q17, Q27, and Q67, a first coil L17, a first capacitor C17, a diode D, and a third capacitor C37. The resonator 127 includes a second capacitor C27 and a second coil L27.

Functions of the circuit 107, the converter 117, the resonator 127, the controller 207, and the input power source 300 may be substantially the same as that of each of the circuit 100, the converter 110, the resonator 120, the controller 200, and the input power source 300, respectively, described in FIG. 7. In addition, a configuration and an operation of the resonator 127 may be the same as those of the resonator 121 described in FIG. 8.

The first coil L17 is connected between a terminal, to which the input voltage is applied, and the third node N3. The third capacitor C37 is connected between the terminal, to which the input voltage is applied, and a ground terminal. The sixth switching element Q67 is connected between the third node N3 and the ground terminal. The diode D is connected between the third node N3 and the second node N2. The first capacitor C17 is connected between the second node N2 and the ground terminal. The first switching element Q12 is connected between the first node N1 and the second node N2. The second switching element Q22 is connected between the first node N1 and the ground terminal. The AC voltage generated by the converter 117 is output to the first node N1. The voltage of the second node N2 is a boost voltage obtained by boosting the input voltage by the converter 117. The first switching element Q17 is turned on and off in response to a first control signal con17. The second switching element Q27 is turned on and off in response to a second control signal con27. The sixth switching element Q67 is turned on and off in response to a fifth control signal con67. In addition, the first switching element Q17 and the second switching element Q27 are turned on and off in complement to each other.

According to the embodiment of FIG. 14, the duty cycles of the first switching element Q17 and the second switching element Q27 are fixed. That is, an amount of power received by the wireless power receiver is adjusted by adjusting a duty cycle of the sixth switching element Q67, or by adjusting an operating frequency of the first switching element Q17 and the second switching element Q27.

In FIG. 14, the first coil L17, the sixth switching element Q67, the diode D, and the first capacitor C17 are operated as the boost converter, and the first switching element Q17 and the second switching element Q27 are operated as the inverter. That is, the boost converter and the inverter of the converter 117 are similar to those illustrated in FIG. 14.

Although FIG. 14 illustrates the case in which the converter 117 includes the half-bridge inverter, the converter 117 may also include the boost converter and the full-bridge inverter.

Figure 15:
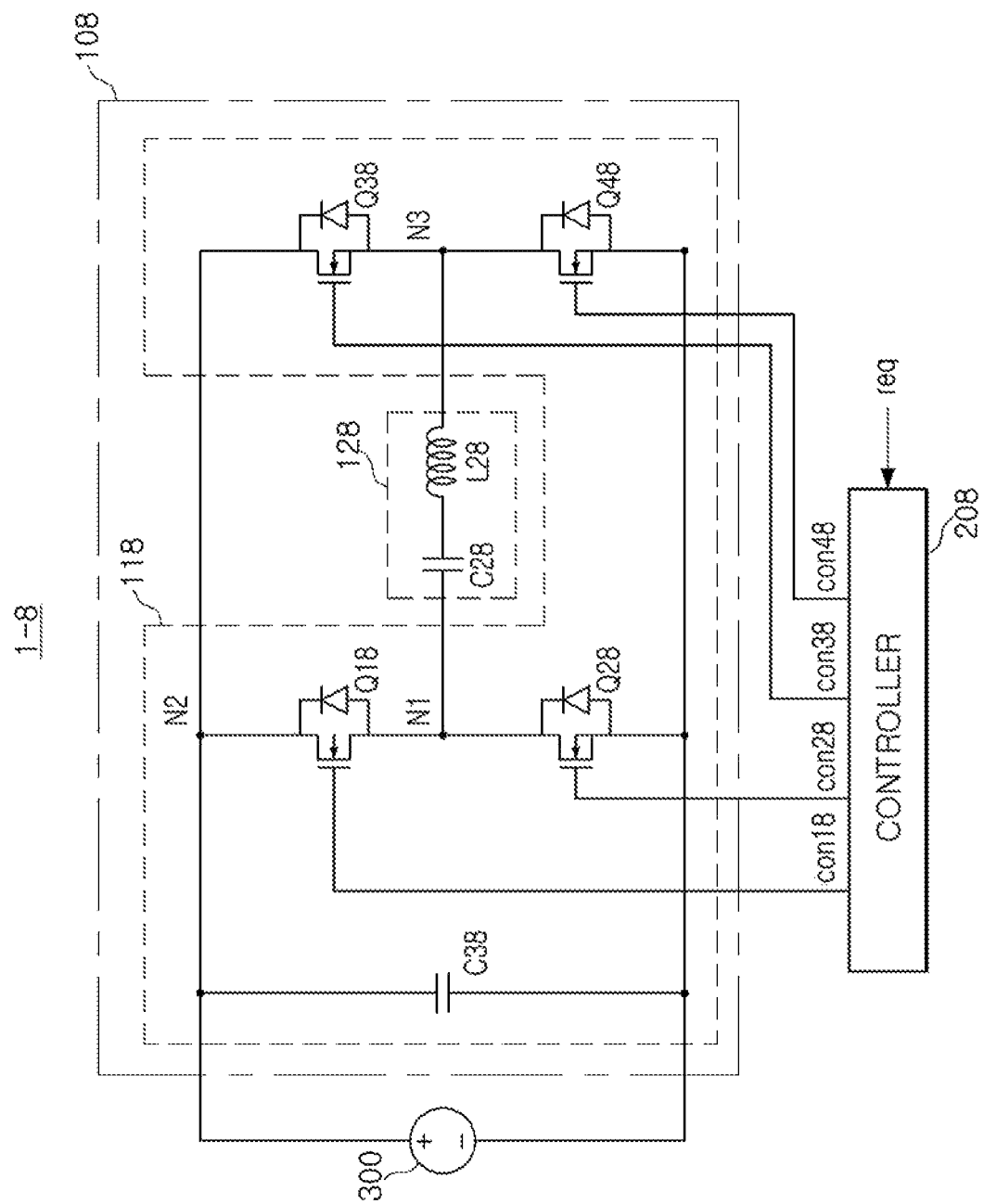

FIG. 15 is a diagram schematically illustrating a configuration of a wireless power transmitter, according to an embodiment. The wireless power transmitter 1-8 includes a circuit 108 and a controller 208. The circuit 108 includes a converter 118 and a resonator 128. The converter 118 includes switching elements Q18, Q28, Q38, and Q48, and a third capacitor C38. The resonator 128 includes a second capacitor C28 and a second coil L28. In FIG. 15, reference numeral 300 denotes an input power source.

Functions of the circuit 108, the converter 118, the resonator 128, the controller 208, and the input power source 300 may be substantially the same as that of each of the circuit 100, the converter 110, the resonator 120, the controller 200, and the input power source 300 described in FIG. 7. In addition, a configuration and an operation of the resonator 128 may be the same as those of the resonator 121 described in FIG. 8.

The first switching element Q18 is connected between the first node N1 and the second node N2. The second switching element Q28 is connected between the first node N1 and a ground terminal. The third switching element Q38 is connected between the second node N2 and the third node N3. The fourth switching element Q48 is connected between the third node N3 and a ground node. The third capacitor C38 is connected between the second node N2 and the ground node. A voltage between the first node N1 and the third node N3 is the AC voltage generated by the converter 118. The input voltage output from the input power source 300 is applied to the second node N2. The first switching element Q18 is turned on and off in response to a first control signal con18. The second switching element Q28 is turned on and off in response to a second control signal con28. The third switching element Q38 is turned on and off in response to a third control signal con38. The fourth switching element Q48 is turned on and off in response to a fourth control signal con48. In addition, the first switching element Q18 and the second switching element Q28 are turned on and off in complement to each other, and the third switching element Q38 and the fourth switching element Q48 are turned on and off in complement to each other. The third switching element Q38 maintains an OFF state, or is turned on and off at the same time as the second switching element Q28. The fourth switching element Q48 maintains an ON state, or is turned on and off at the same time as the first switching element Q18. In some examples, the third switching element Q38 and the fourth switching element Q48 are each turned on and off at a different time from that of each of the second switching element Q28 and the first switching element Q18.

The converter 118 may include only the inverter similar to that illustrated in FIG. 15. Although FIG. 15 illustrates the case in which the converter 118 includes the full-bridge inverter, the converter 118 may also include the half-bridge inverter.

In one example, the wireless power transmitters 1 through 1-8 illustrated in FIGS. 7 through 15 are operated in a detection mode and a power transmission mode. The power transmission mode includes two or more of the normal mode, the boost mode, and the reduction mode.

The detection mode, which is a mode to determine whether an external object is approaching the wireless power transmitter or whether the approaching external object is the wireless power receiver, corresponds to the analog ping phase and the digital ping phase described above.

In the detection mode, the wireless power transmitter transmits an analog ping signal to determine whether the external object is approaching and a digital ping signal to determine whether the approaching object is the wireless power receiver. In this example, as described above, after the wireless power transmitter periodically transmits the analog ping signal, the wireless power transmitter 1, 1-1, 1-2, 1-3, 1-4, 1-5, 1-6, 1-7, or 1-8 transmits the digital ping signal when the wireless power transmitter 1, 1-1, 1-2, 1-3, 1-4, 1-5, 1-6, 1-7, or 1-8 determines that the external object is approaching, or transmits the digital ping signal according to a set period.

Hereinafter, for convenience of explanation, the analog ping signal and the digital ping signal transmitted from the wireless power transmitter 1, 1-1, 1-2, 1-3, 1-4, 1-5, 1-6, 1-7, or 1-8 in the detection mode are collectively referred to as a ping signal.

The detection mode includes, for example, a first mode and a second mode. The first mode corresponds to an initial operation mode starting an operation to transmit the ping signal, after a stop state, for a reference period of time or longer, such as in an example in which turned-off power of the wireless power transmitter is switched to an ON state. The second mode corresponds to a standby operation mode to transmit the ping signal in the stop state for less than the reference time, after the initial operation mode.

In the initial operation mode, the converter 111, 112, 113, 114, 115, 116, or 117 (FIGS. 8 through 14) gradually boosts the input voltage, and stores boost power in the first capacitor C11, C12, C13, C14, C15, C16, or C17 (FIGS. 8 through 14). The converter 111, 112, 113, 114, 115, 116, or 117 eliminates a predetermined ripple that is caused in the boost power generated by the alternative switching by gradually boosting the input voltage.

The input voltage is gradually boosted by gradually increasing a duty cycle of a gate signal provided to the switching element Q21, Q22, Q23, Q24, Q25 (and/or Q45), Q26, or Q67 (FIGS. 8 through 14) of the converter 111, 112, 113, 114, 115, 116, or 117 from a first duty cycle. In one example, the gradual increase of the duty cycle is a duty cycle in which the duty cycle is repeatedly and sequentially increased from the specific duty cycle by a reference duty cycle.

As an example, a first duty cycle corresponds to a duty cycle increased from a duty cycle of 0% by the reference duty cycle. According to an embodiment, the first duty cycle is set as the duty cycle close to 0% to prevent the rapid boosting of the input power in a phase in which an operation starts, after the stop state for the reference time or more. As a result, the predetermined ripple caused in the boost power is effectively eliminated.

In an operation of boosting the input voltage by sequentially increasing the duty cycle from the first duty cycle close to the duty cycle of 0% by the reference duty cycle, the converter (or the controller) calculates data regarding a voltage level of the boost power, which is gradually boosted and a duty cycle corresponding to the voltage level. The data regarding the voltage level of the boost power, which is gradually boosted, and the duty cycle corresponding to the voltage level calculated by the converter 111, 112, 113, 114, 115, 116, or 117 (or the controller 201, 202, 203, 204, 205, 206, 207, or 208 (FIGS. 8 through 14)) are stored in a separate memory.

In addition, when the voltage level of the boost power stored in the first capacitor C11, C12, C13, C14, C15, C16, or C17 (FIGS. 8 through 14) reaches a voltage level of target boost power, the converter 111, 112, 113, 114, 115, 116, or 117 outputs an AC voltage (or an alternating current) to transmit a ping signal through the resonator 121, 122, 123, 124, 125, 126, or 127 (FIGS. 8 through 14).

Even in an example in which various voltage levels are provided by the input power source 300, the converter 111, 112, 113, 114, 115, 116, or 117 boosts the input voltage up to the target boost voltage. Therefore, even in an example in which the voltage level of the input voltage is varied, the converter 111, 112, 113, 114, 115, 116, or 117 boosts the input voltage up to a set target boost voltage to decrease dependency on the input power source 300.

Figure 16:
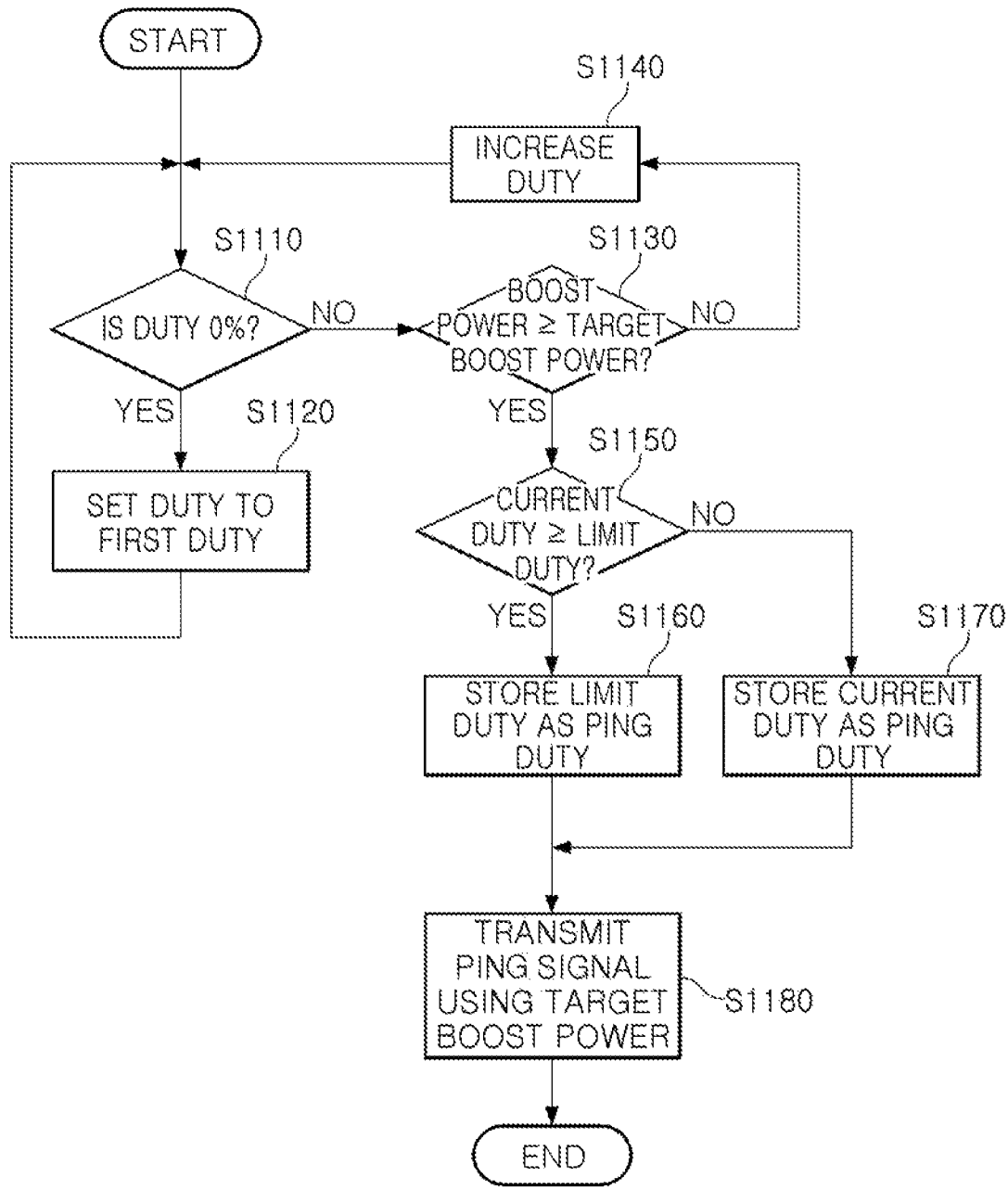
FIG. 16 is a flowchart illustrating an operation in an initial operation mode of the wireless power transmitter and the wireless power transmission method, according to an embodiment.

FIG. 16 is a flowchart illustrating an operation in an initial operation mode of the wireless power transmitter 1, 1-1, 1-2, 1-3, 1-4, 1-5, 1-6, 1-7, or 1-8 and the wireless power transmission method, according to an embodiment.

Referring to FIG. 16, in the initial operation mode, in operation S1110, the controller 201, 202, 203, 204, 205, 206, 207, or 208 determines whether a current duty cycle is a duty cycle of 0%. If the controller 201, 202, 203, 204, 205, 206, 207, or 208 is determines that the current set duty cycle is 0%, in operation S1120, the duty cycle is set as the first duty cycle which is increased from the duty cycle of 0% by the reference duty cycle. If the controller 201, 202, 203, 204, 205, 206, 207, or 208 determines that the current set duty cycle is not 0%, in operation S1130, the boost power and the target boost power are compared with each other. If the controller 201, 202, 203, 204, 205, 206, 207, or 208 determines, based on the comparison between the boost power and the target boost power, that the boost power does not reach the target boost power, at operation S1140, the duty cycle is increased by the reference duty cycle to gradually boost the boost power. On the other hand, if the controller 201, 202, 203, 204, 205, 206, 207, or 208 determines, based on the comparison between the boost power and the target boost power, that the boost power reaches the target boost power, in operation S1150, the current duty cycle and a limit duty cycle are compared with each other. The limit duty cycle corresponds to a maximum duty cycle that is allowed in the detection mode. By setting the limit duty cycle in the detection mode, excessive power consumption to transmit the ping signal is prevented and a heating problem is eliminated. If the controller 201, 202, 203, 204, 205, 206, 207, or 208 determines, based on the comparison between the current duty cycle and the limit duty cycle, that the current duty cycle is higher than the limit duty cycle, in operation S1160, the limit duty cycle is stored as a ping duty cycle corresponding to the target boost power, if the current duty cycle is lower than the limit duty cycle, in operation S1170, the current duty cycle is stored as the ping duty cycle corresponding to the target boost power. Thereafter, the ping signal is transmitted using the target boost power in operation S1180, and the initial operation mode ends. Thereafter, after the initial operation mode ends, the wireless power transmitter 1, 1-1, 1-2, 1-3, 1-4, 1-5, 1-6, 1-7, or 1-8 enters the standby operation mode, or enters a power transmission mode according to a response signal of the wireless power receiver 2 (FIG. 1) for the ping signal transmitted in the initial operation mode.

In the standby operation mode, the converter 111, 112, 113, 114, 115, 116, or 117 (or the controller 201, 202, 203, 204, 205, 206, 207, or 208) gradually increases the duty cycle from a second duty cycle to boost the input voltage. The converter gradually increases the duty cycle from the second duty cycle to significantly decrease an inrush current caused by a rapid voltage change and, thus, decrease standby power. In addition, the converter 111, 112, 113, 114, 115, 116, or 117 prevents a peak current from being input to the resonator to reduce noise of the wireless power transmitter.

The second duty cycle is determined according to a voltage level of the current boost power.

In the standby operation mode, the boost power stored in the first capacitor C11, C12, C13, C14, C15, C16, or C17 (each of FIGS. 8 through 14) is discharged according to a period in which the ping signal is transmitted, such that the voltage level of the boost power is gradually decreased. The second duty cycle is determined by considering an amount by which the boost power stored in the first capacitor C11, C12, C13, C14, C15, C16, or C17 is discharged according to a time interval at which the ping signal is transmitted. The second duty cycle may be higher than the first duty cycle.

As an example, the voltage level of the boost power stored in the first capacitor C11, C12, C13, C14, C15, C16, or C17 is directly detected by a separate detection element. A duty cycle corresponding to the detected voltage level of the boost power is determined as the second duty cycle.

In another example, the voltage level of the boost power is estimated according to the period in which the ping signal is transmitted. Specifically, because the voltage level of the boost power is decreased according to the discharge by the time interval at which the ping signal is transmitted, when the period of the ping signal is determined, the voltage level of the boost power in which the voltage level is partially decreased from the target boost power is estimated. A duty cycle corresponding to the estimated voltage level of the boost power is determined as the second duty cycle.

As described above, the data regarding the voltage level of the boost power, which is gradually boosted, and the duty cycle corresponding to the voltage level calculated by the converter 111, 112, 113, 114, 115, 116, or 117 (or the controller 201, 202, 203, 204, 205, 206, 207, or 208) of the initial operation mode may be stored in a separate memory element. In this case, the second duty cycle is determined based on the data regarding the voltage level of the boost power stored in the initial operation mode and the duty cycle corresponding to the voltage level of the boost power.

According to an embodiment, a weighting index is calculated by comparing the voltage level of the target boost power with the voltage level of the current boost power. The second duty cycle is calculated by applying the calculated weighting index to a ping duty cycle corresponding to the target boost power. In this case, the weighting index has a value greater than 0 but less than 1. This embodiment may be applied to an example in which only the voltage level of the target boost power and the ping duty cycle corresponding to the voltage level of the target boost power are stored in the initial operation mode. In the initial operation mode, all voltage levels of the boost power and a plurality of ping duties corresponding thereto are not stored. That is, only the voltage level of the target boost power and the ping duty cycle corresponding thereto are stored, thus, reducing a size of the memory.

According to another embodiment, the second duty cycle is determined by a retrieval of a duty cycle corresponding to the voltage level of the current boost power. This embodiment may be applied to an example in which all voltage levels of the boost power and ping duties corresponding thereto are stored in the initial operation mode. In this example, all voltage levels of the boost power and the ping duties corresponding thereto are stored in a form of a lookup table in the data, and a load of the calculation operation is removed by using the lookup table in the standby operation mode.

The converter 111, 112, 113, 114, 115, 116, or 117 (or the controller 201, 202, 203, 204, 205, 206, 207, or 208) gradually increases the duty cycle from the second duty cycle to gradually boost the input voltage. In a case in which the duty cycle is gradually increased and reaches the ping duty cycle, because the voltage level of the boost power stored in the first capacitor reaches the voltage level of the target boost power, the converter 111, 112, 113, 114, 115, 116, or 117 outputs the AC current to transmit the ping signal through the resonator 121, 122, 123, 124, 125, 126, or 127.

Figure 17:
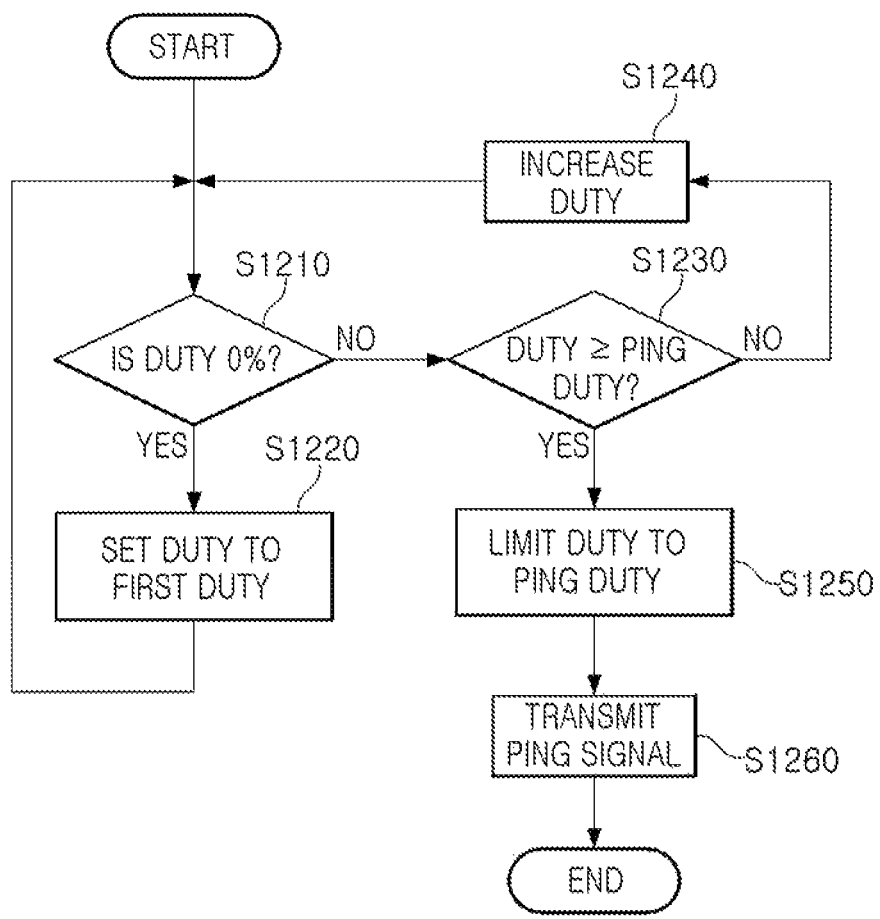
FIG. 17 is a flowchart illustrating an operation in a standby operation mode of the wireless power transmitter and the wireless power transmission method, according to an embodiment.

FIG. 17 is a flowchart illustrating an operation in a standby operation mode of the wireless power transmitter 1, 1-1, 1-2, 1-3, 1-4, 1-5, 1-6, 1-7, or 1-8 and the wireless power transmission method, according to an embodiment.

Referring to FIG. 17, in the standby operation mode, in operation S1210, the controller 201, 202, 203, 204, 205, 206, 207, or 208 determines whether a current duty cycle is a duty cycle of 0%. If it is determined that the current set duty cycle is 0%, in operation S1220, the duty cycle is set as the second duty cycle. The second duty cycle is higher than the first duty cycle, and as an example, the second duty cycle is calculated by applying a weighting index to a ping duty cycle. In this case, the weighting index is a value greater than 0 but less than 1.

If it is determined in operation S1210 that the current set duty cycle is not 0%, in operation S1230, the current duty cycle and the ping duty cycle, which is calculated and stored in the initial operation mode, are compared with each other. If it is determined, as a result of the comparison between the current duty cycle and the ping duty cycle, that the current duty cycle is lower than the ping duty cycle, in operation S1240, the duty cycle is increased by a reference duty cycle to gradually boost the boost power. Alternatively, if it is determined in operation S1230 that the current duty cycle is higher than the ping duty cycle, in operation S1250, the duty cycle is limited to the ping duty cycle, in operation S1260, the ping signal is transmitted, and the standby operation mode ends. Thereafter, the wireless power transmitter 1, 1-1, 1-2, 1-3, 1-4, 1-5, 1-6, 1-7, or 1-8 enters the power transmission mode according to the response signal of the wireless power receiver 2 for the ping signal.

Figure 18:
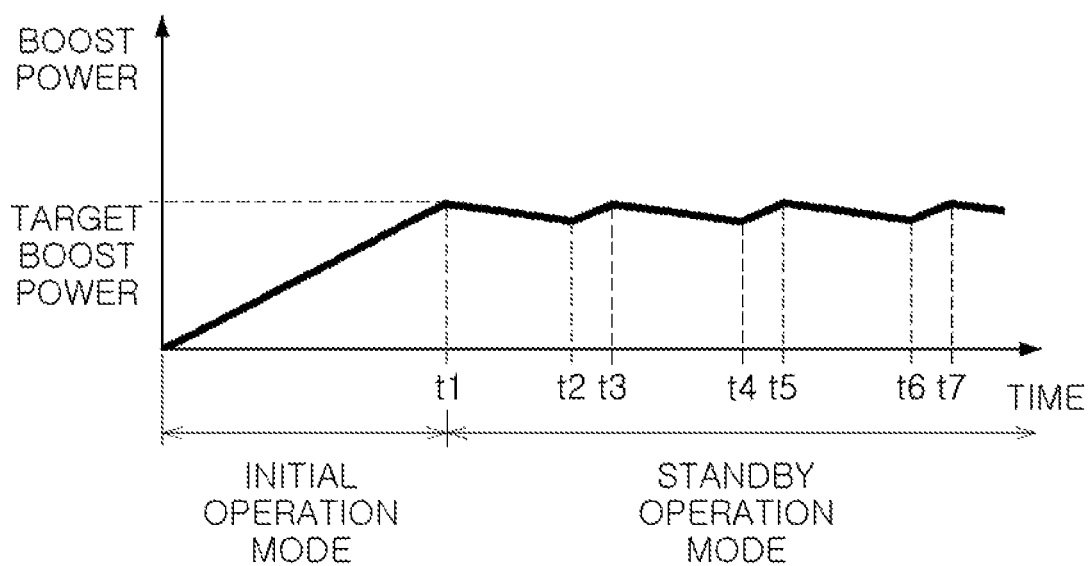
FIG. 18 is a diagram illustrating a change of a boost voltage in the initial operation mode and the standby operation mode of the wireless power transmitter and the wireless power transmission method, according to an embodiment.

FIG. 18 is a diagram illustrating a change of a boost voltage in the initial operation mode and the standby operation mode of the wireless power transmitter 1, 1-1, 1-2, 1-3, 1-4, 1-5, 1-6, 1-7, or 1-8 and the wireless power transmission method, according to an embodiment.

Referring to FIG. 18, in the initial operation mode, the converter 110, 111, 112, 113, 114, 115, 116, 117, or 118 (FIGS. 7 through 15) (or the controller 200, 201, 202, 203, 204, 205, 206, 207, or 208 (FIGS. 7 through 15)) gradually increases the duty cycle from the first duty cycle to gradually boost the input voltage. As a result of the boosting of the converter 110, 111, 112, 113, 114, 115, 116, 117, or 118, when the boost power stored in the first capacitor C11, C12, C13, C14, C15, C16, or C17 (FIGS. 8 through 14) reaches the target boost power, the ping signal is transmitted at a timing t1. After the ping signal is transmitted, the initial operation mode ends and the wireless power transmitter 1, 1-1, 1-2, 1-3, 1-4, 1-5, 1-6, 1-7, or 1-8 enters the standby operation mode.

In the standby operation mode, the voltage level of the boost power stored in the first capacitor C11, C12, C13, C14, C15, C16, or C17 is decreased according to the period in which the ping signal is transmitted. The converter 110, 111, 112, 113, 114, 115, 116, 117, or 118 (or the controller 200, 201, 202, 203, 204, 205, 206, 207, or 208) gradually increases the duty cycle from the second duty cycle at a timing t2 according to the voltage level of the boost power stored in the first capacitor to boost the input voltage, and transmits the ping signal at a timing t3 when the boost power stored in the first capacitor reaches the target boost power as a result of the boosting of the converter. In this example, the above-mentioned operation is repeated according to a transmission period of the ping signal, which is a time interval of a timing t3 to t5, or a time interval of a timing t5 to a timing t7. Thereafter, the wireless power transmitter 1, 1-1, 1-2, 1-3, 1-4, 1-5, 1-6, 1-7, or 1-8 enters the power transmission mode according to the response signal of the wireless power receiver 2 for the ping signal.

Next, the power transmission mode will be described. Hereinafter, an operation in the power transmission mode is performed by the controller 200, 201, 202, 203, 204, 205, 206, 207, or 208 (of FIGS. 7 through 15).

FIGS. 19A through 19H are waveform diagrams illustrating an operation of the wireless power transmitter 1, 1-1, 1-2, 1-3, 1-4, 1-5, 1-6, 1-7, or 1-8 and the wireless transmission method when an amount of power received by the wireless power receiver 2 is increased in a power transmission mode, according to an embodiment. The waveform diagrams of FIGS. 19A through 19H represent waveforms of a control signal to control switching elements of the wireless power transmitter 1, 1-1, 1-2, 1-3, 1-4, 1-5, 1-6, 1-7, or 1-8.

The first control signals con11, con12, con13, and con16 of FIGS. 8 through 10 and 13 are equivalent to the first control signal con1 of FIGS. 19A, 19C, 19E, and 19G, and the second control signals con21, con22, con23, and con26 of FIGS. 8 through 10 and 13 are equivalent to the second control signal con2 of FIGS. 19B, 19D, 19F, and 19H.

In addition, the first control signal con14, con15, and con18 of FIGS. 11, 12, and 15 are equivalent to the first control signal con1 of FIGS. 19A, 19C, 19E, and 19G, and the second control signals con24, con25, and con28 of FIGS. 11, 12, and 15 are equivalent to the second control signal con2 of FIGS. 19B, 19D, 19F, and 19H. In this example, the third control signals con34, con35, and con38 of FIGS. 11, 12, and 15 are maintained at a low level, and the fourth control signals con44, con45, and con48 of FIGS. 11, 12, and 15 are maintained at a high level.

Figure 19A:
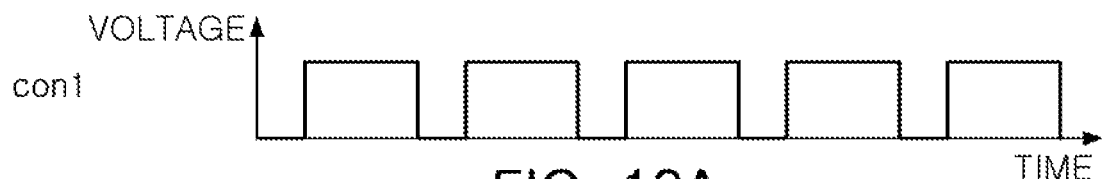
FIGS. 19A through 24H are waveform diagrams illustrating operations of the wireless power transmitter and the wireless power transmission method in a power transmission mode.
Figure 19B:
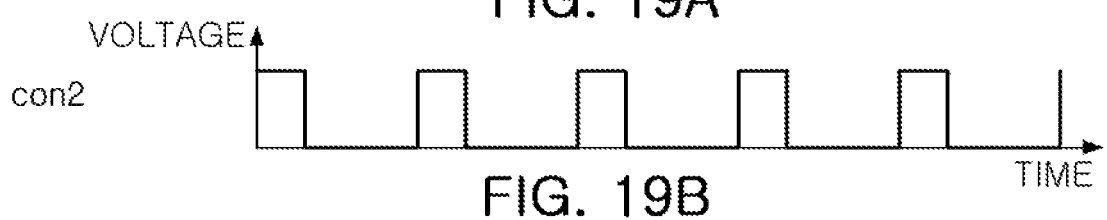

The control signals, initially output in the normal mode, have forms such as those illustrated in FIGS. 19A and 19B. In this example, a frequency and a duty cycle of the control signals are the ping frequency and the ping duty cycle described above. The control signals illustrated in FIGS. 19A and 19B may also be output in the detection mode.

Figure 19C:
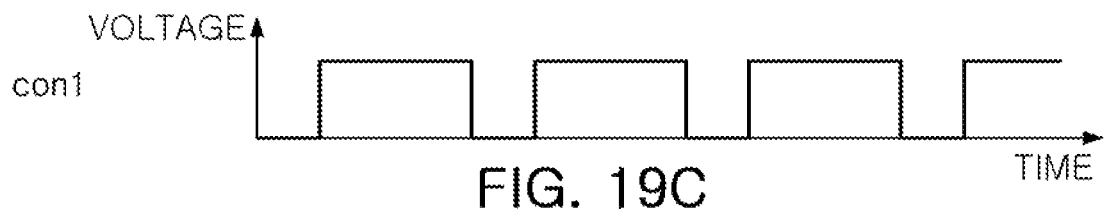
Figure 19D:
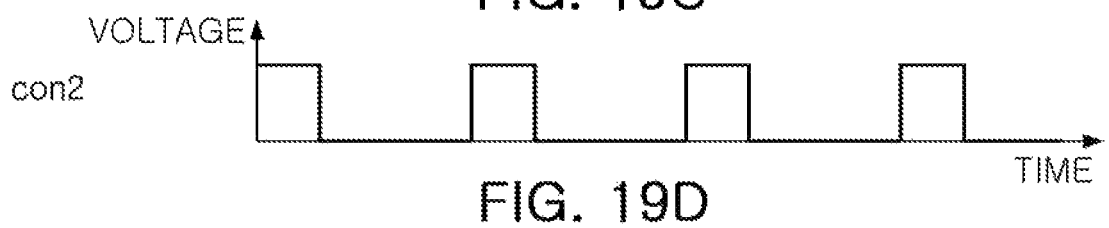

In the normal mode, the frequency of the control signal is adjusted according to the signal received from the wireless power receiver 2. That is, in an example in which an amount of power received by the wireless power receiver 2 is less than an amount of power required by the wireless power receiver 2, in the normal mode, the controller 200, 201, 202, 203, 204, 205, 206, 207, or 208 decreases the frequency of the control signals con1 and con2 as illustrated in FIG. 19C and FIG. 19D. Therefore, the amount of power received by the wireless power receiver 2 is increased. The frequency of the control signals con1 and con2 of FIG. 19C and FIG. 19D have a minimum value f1 (FIG. 6) of the frequency in the normal mode. In the normal mode, the duty cycle are fixed to the above-mentioned ping duty cycle.

Figure 19E:
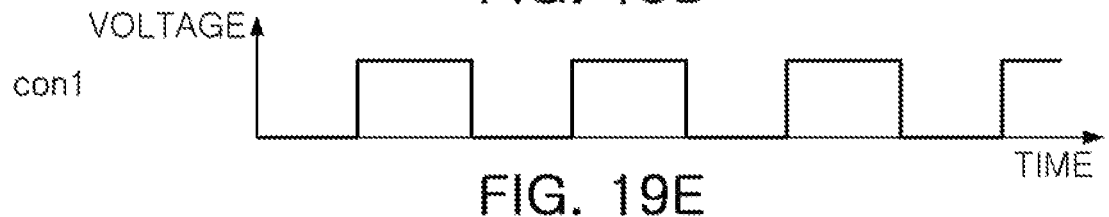
Figure 19F:
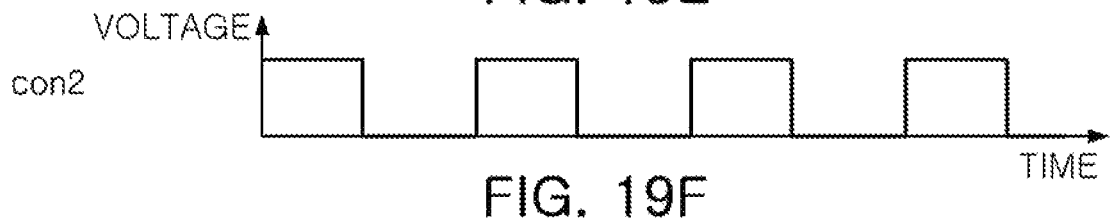

In the boost mode, the duty cycle of the control signal is adjusted according to the signal received from the wireless power receiver 2. That is, when the amount of power required by the wireless power receiver is not received even though the frequency of the control signals con1 and con2 is decreased up to a predetermined reference frequency (e.g., f1 of FIG. 6), as illustrated in FIG. 19E and FIG. 19F, the controller 200, 201, 202, 203, 204, 205, 206, 207, or 208 fixes the frequency of the control signals con1 and con2 to the reference frequency (e.g., f1 of FIG. 6), and increases the duty cycle of the second control signal con2.

Figure 19G:
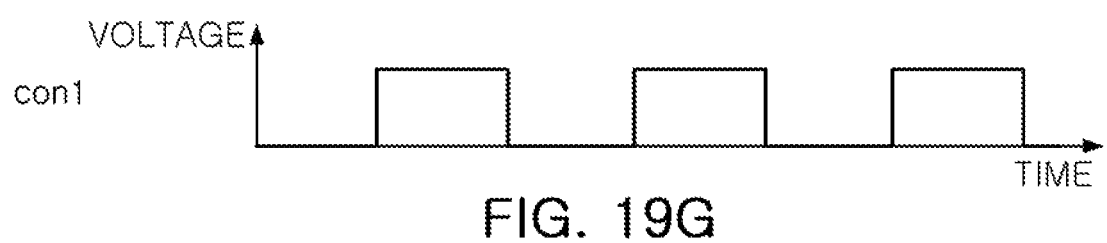
Figure 19H:
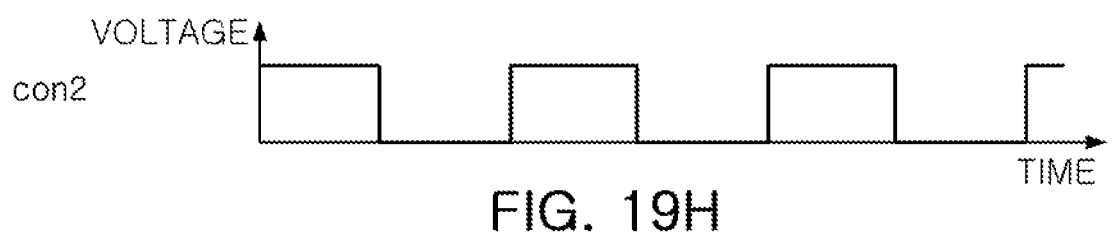

Alternatively, as illustrated in FIG. 19G and FIG. 19H, in the boost mode, the controller 200, 201, 202, 203, 204, 205, 206, 207, or 208 additionally decreases the frequency of the control signals con1 and con2. In this case, the duty cycle is fixed to the duty cycle which is previously increased.

FIGS. 20A through 20H are diagrams illustrating an operation of the wireless power transmitter 1, 1-1, 1-2, 1-3, 1-4, 1-5, 1-6, 1-7, or 1-8 and the wireless power transmission method when an amount of power received by the wireless power receiver 2 is increased in a power transmission mode, according to an embodiment. The waveform diagrams of FIGS. 20A through 20H represent waveforms of a control signal to control switching elements of the wireless power transmitter 1-1, 1-2, 1-3, 1-4, 1-5, 1-6, 1-7, or 1-8.

The first control signals con14, con15, and con18 of FIGS. 11, 12, and 15 are equivalent to the first control signal con1 of FIGS. 20A, 20C, 20E, and 20G, the second control signals con24, con25, and con28 of FIGS. 11, 12, and 15 are equivalent to the second control signal con2 of FIGS. 20B, 20D, 20F, and 20H, the third control signals con34, con35, and con38 of FIGS. 11, 12, and 15 are equivalent to the third control signal con3 of FIGS. 20B, 20D, 20F, and 20H, and the fourth control signals con44, con45, and con48 of FIGS. 11, 12, and 15 are equivalent to the fourth control signal con4 of FIGS. 20A, 20C, 20E, and 20G.

FIGS. 20A through 20H is similar to FIGS. 19A through 19H, except that FIGS. 20A through 20H relate to an example in which the s 114, 115, and 118 (FIGS. 11, 12, and 15) are operated as the full-bridge circuit.

Figure 20A:
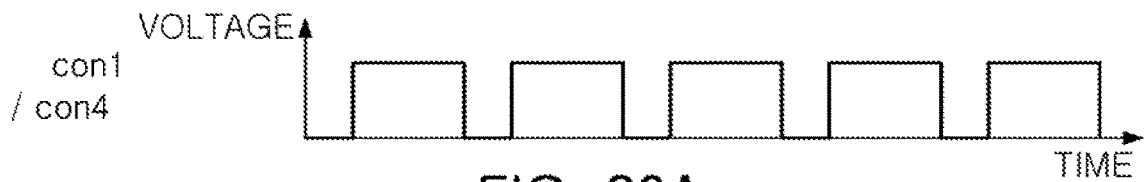
Figure 20B:
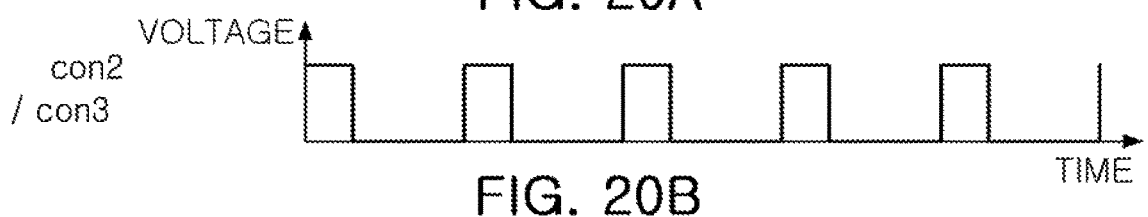

The controller 200, 201, 202, 203, 204, 205, 206, 207, or 208 outputs the control signals illustrated in FIGS. 20A and 20B. As described above, in the normal mode, the controller 200, 201, 202, 203, 204, 205, 206, 207, or 208 also outputs the control signals initially output in the forms illustrated in FIGS. 20A and 20B, and also outputs the control signals in the detection mode. The duty cycle of the control signals con1 and con4 illustrated in FIG. 20A is the above-mentioned ping duty cycle, and the frequency of the control signals con1, con2, con3, and con4 illustrated in FIGS. 20A and 20B are the above-mentioned ping frequency.

Figure 20C:
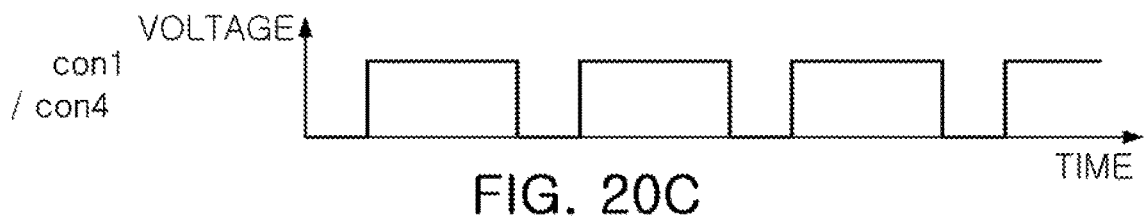
Figure 20D:
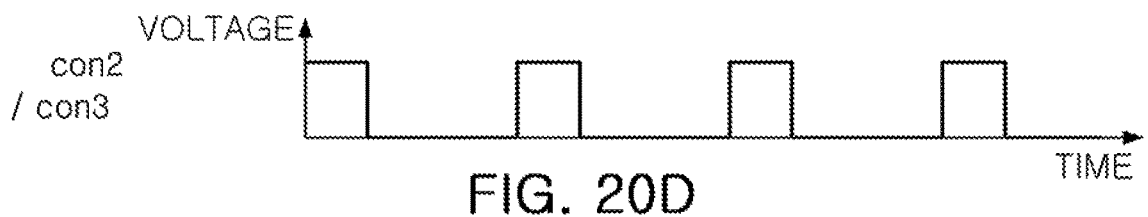

In the normal mode, in an example in which an amount of power received by the wireless power receiver 2 is less than an amount of power required by the wireless power receiver 2, the controller 200, 201, 202, 203, 204, 205, 206, 207, or 208 decreases the frequency of the control signals con1, con2, con3, and con4 as illustrated in FIGS. 20C and 20D.

Figure 20F:
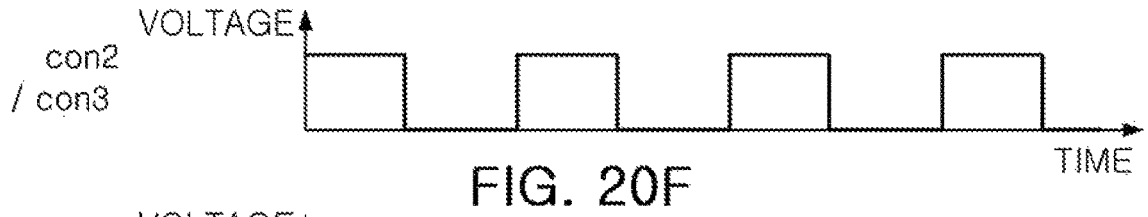

In the boost mode, the duty cycle of the control signal is adjusted according to the signal received from the wireless power receiver 2. That is, when the amount of power required by the wireless power receiver 2 is not received even though the frequency of the control signals con1, con2, con3, and con4 is decreased to a predetermined frequency (e.g., f1 of FIG. 6), as illustrated in FIGS. 20E and 20F, the controller 200, 201, 202, 203, 204, 205, 206, 207, or 208 fixes the frequency of the control signals con1, con2, con3, and con4 to the reference frequency (e.g., f1 of FIG. 6), and increases the duty cycle of the second control signal con2 and the third control signal con3.

Figure 20G:
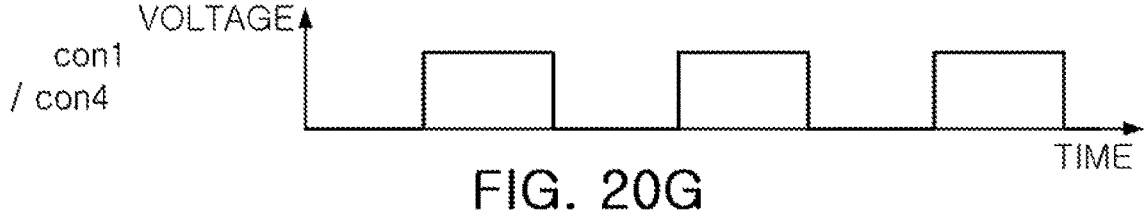
Figure 20H:
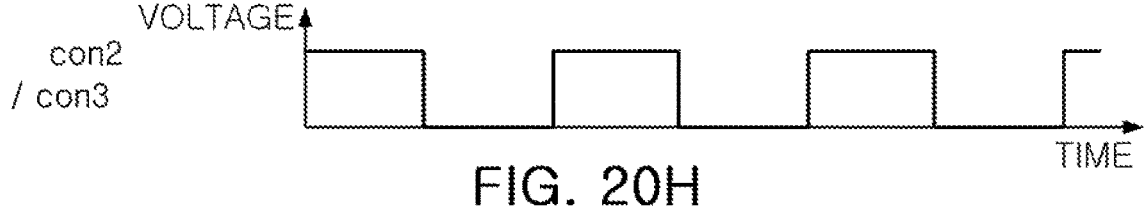

Alternatively, as illustrated in FIGS. 20G and 20H, in the boost mode, the controller 200, 201, 202, 203, 204, 205, 206, 207, or 208 further decreases the frequency of the control signals con1, con2, con3, and con5. In this example, the duty cycle is fixed to the duty cycle which is previously increased.

Although not illustrated in FIGS. 19 and 20, in the boost mode, the controller 200, 201, 202, 203, 204, 205, 206, 207, or 208 may also additionally increase the duty cycle after additionally decreasing the frequency as illustrated in FIGS. 20G and 20H.

FIGS. 21A through 21H are waveform diagrams illustrating an operation of the wireless power transmitter 1-1, 1-2, 1-3, 1-4, 1-5, 1-6, 1-7, or 1-8 and the wireless power transmission method in response to an amount of power received by the wireless power receiver 2 being decreased in a power transmission mode, according to an embodiment. The waveform diagrams of FIGS. 21A through 21H represent waveforms of a control signal for controlling switching elements of the wireless power transmitter 1-1, 1-2, 1-3, 1-4, 1-5, 1-6, 1-7, or 1-8.

The first control signals con11, con12, con13, and con16 of FIGS. 8 through 10, and 13 are equivalent to the first control signal con1 of FIGS. 21A, 21C, 21E, and 21G, and the second control signals con21, con22, con23, and con26 of FIGS. 8 through 10, and 13 are equivalent to the second control signal con2 of FIGS. 21B, 21D, 21F, and 21H.

In addition, the first control signals con14, con15, and con18 of FIGS. 11, 12, and 15 are equivalent to the first control signal con1 of FIGS. 21A, 21C, 21E, and 21G, and the second control signals con24, con25, and con28 of FIGS. 11, 12, and 15 are equivalent to the second control signal con2 of FIGS. 21B, 21D, 21F, and 21H. In this case, the third control signals con34, con35, and con38 of FIGS. 11, 12, and 15 are maintained at a low level, and the fourth control signal con44, con45, and con48 of FIGS. 11, 12, and 15 are maintained at a high level.

Figure 21E:
Figure 21A:
Figure 21B:
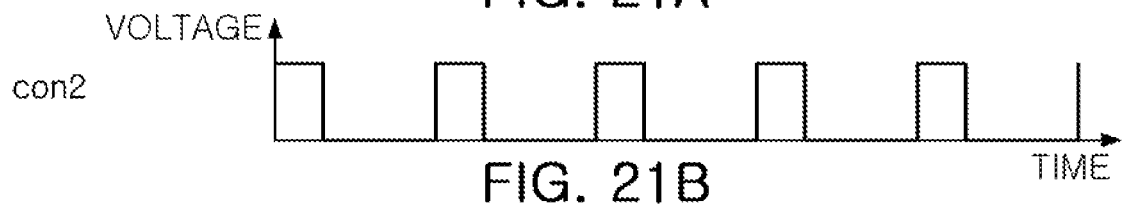

First, the controller 200, 201, 202, 203, 204, 205, 206, 207, or 208 outputs the same control signals con1 and con2 as those illustrated in FIGS. 21A and 21B of FIG. 21. The controller 200, 201, 202, 203, 204, 205, 206, 207, or 208 also outputs the control signals initially output in the forms illustrated in FIGS. 21A and 21B in the normal mode, and also outputs the same control signals as those illustrated in FIGS. 21A and 21B in the detection mode.

Figure 21C:
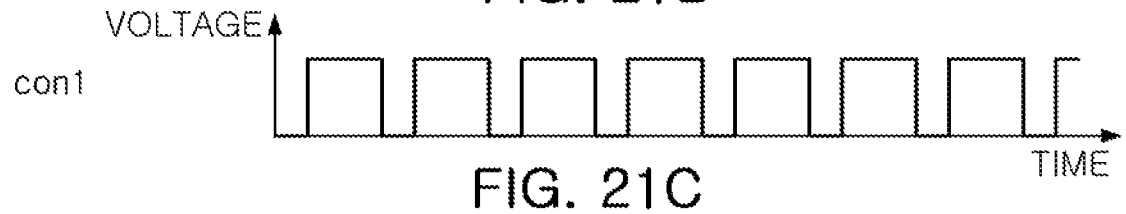
Figure 21D:
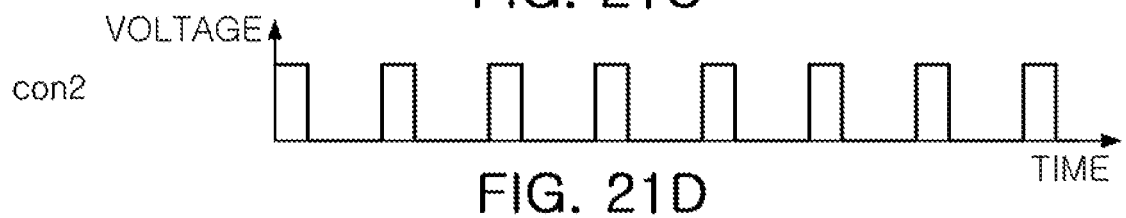
Figure 21E:
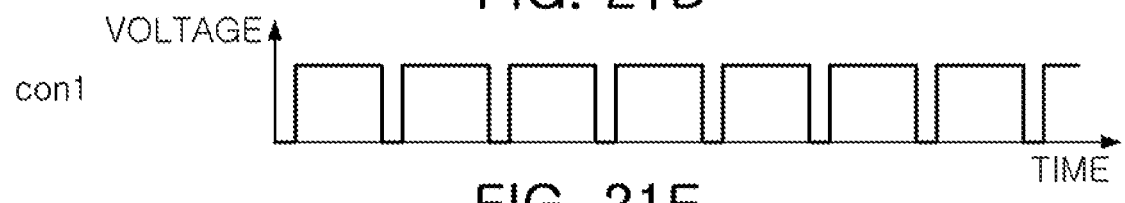

In an example in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1 and con2 as illustrated in FIGS. 21C and 21D. Therefore, the amount of power received by the wireless power receiver 2 decreases. The frequency of the control signals con1 and con2 of FIGS. 21C and 21D has a maximum value f2 (FIG. 6) of the frequency in the normal mode. In the normal mode, the duty cycle is fixed to the above-mentioned ping duty cycle.

Figure 21F:
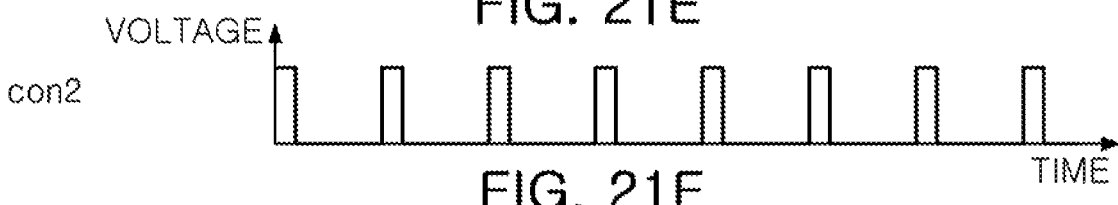

In the reduction mode, the duty cycle of the control signal is adjusted according to the signal received from the wireless power receiver. That is, when the amount of power received by the wireless power receiver 2 is greater than the amount of power required by the wireless power receiver 2, even though the frequency of the control signals con1 and con2 is increased to a predetermined reference frequency (e.g., f2 of FIG. 6), as illustrated in FIGS. 21E and 21F, the controller 200, 201, 202, 203, 204, 205, 206, 207, or 208 fixes the frequency of the control signals con1 and con2 to the reference frequency (e.g., f2 of FIG. 6), and decreases the duty cycle of the second control signal con2.

Figure 21G:
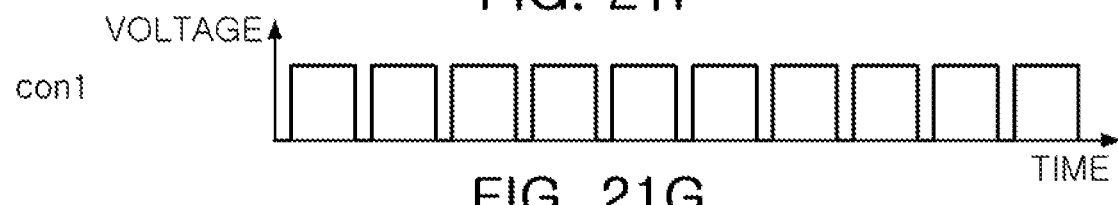
Figure 21H:
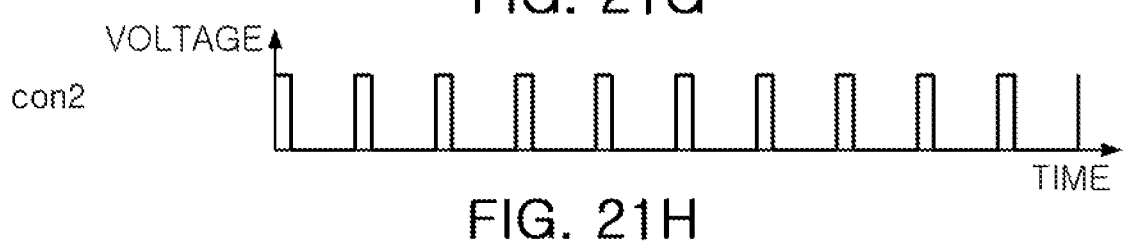

Alternatively, as illustrated in FIGS. 21G and 21H, in the reduction mode, the controller 200, 201, 202, 203, 204, 205, 206, 207, or 208 further increases the frequency of the control signals con1 and con2. In this case, the duty cycle is fixed to the duty cycle previously decreased.

FIGS. 22A through 22H are waveform diagrams illustrating an operation of the wireless power transmitter 1, 1-2, 1-3, 1-4, 1-5, 1-6, 1-7, or 1-8 and the wireless power transmission method in response to an amount of power received by the wireless power receiver 2 being decreased in a power transmission mode, according to an embodiment. The waveform diagram of FIGS. 22A through 22H represent a waveform of a control signal to control switching elements of the wireless power transmitter 1, 1-2, 1-3, 1-4, 1-5, 1-6, 1-7, or 1-8.

Figure 22A:
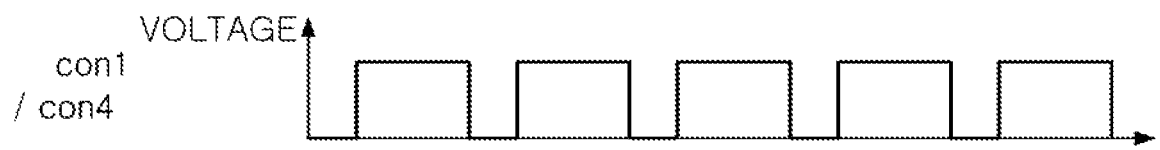

The first control signals con14, con15, and con18 of FIGS. 11, 12, and 15 are equivalent to the first control signal con1 of FIGS. 22A. 22C, 22E, and 22G, the second control signals con24, con25, and con28 of FIGS. 11, 12, and 15 are equivalent to the second control signal con2 of FIGS. 22B, 22D, 22F, and 22H, the third control signals con34, con35, and con38 of FIGS. 11, 12, and 15 are equivalent to the third control signal con1 of 22 FIGS. 22B, 22D, 22F, and 22H. The fourth control signals con44, con45, and con48 of FIGS. 11, 12, and 15 are equivalent to the fourth control signal con4 of FIGS. 22A. 22C, 22E, and 22G.

FIGS. 22A through 22H is similar to FIGS. 21A through 21H except that FIGS. 22A through 22H relate to an example in which the converter 114, 115, and 118 (FIGS. 11, 12, and 15) is operated as the full-bridge circuit.

Figure 22B:
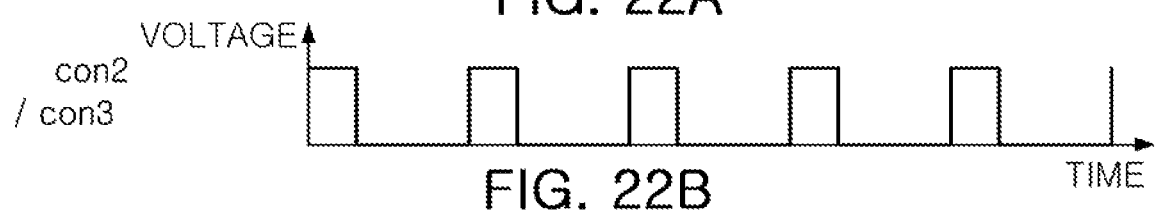

First, the controller 200, 201, 202, 203, 204, 205, 206, 207, or 208 outputs the same control signals con1, con2, con3, and con4 as those illustrated in FIGS. 22A and 22B. The controller 200, 201, 202, 203, 204, 205, 206, 207, or 208 also outputs the control signals initially output in the forms illustrated in FIGS. 22A and 22B in the normal mode, and outputs the same control signals as those illustrated in FIGS. 22A and 22B in the detection mode.

Figure 22C:
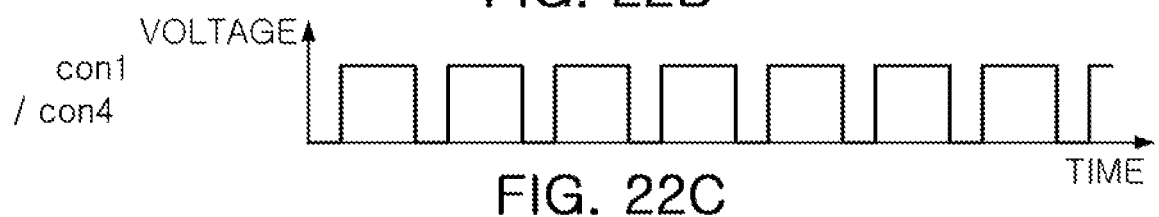
Figure 22D:
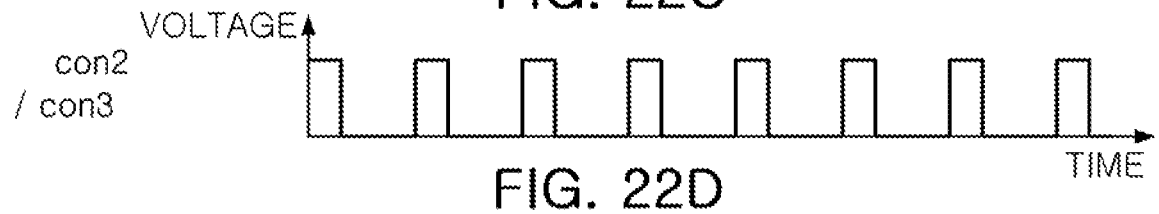

In an example in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1, con2, con3, and con4 as illustrated in FIGS. 22C and 22D. Therefore, the amount of power received by the wireless power receiver 2 decreases. The frequency of the control signals con1, con2, con3, and con4 of FIGS. 22C and 22D has a maximum value f2 (FIG. 6) of the frequency in the normal mode. In the normal mode, the duty cycle is fixed to the above-mentioned ping duty cycle.

Figure 22E:
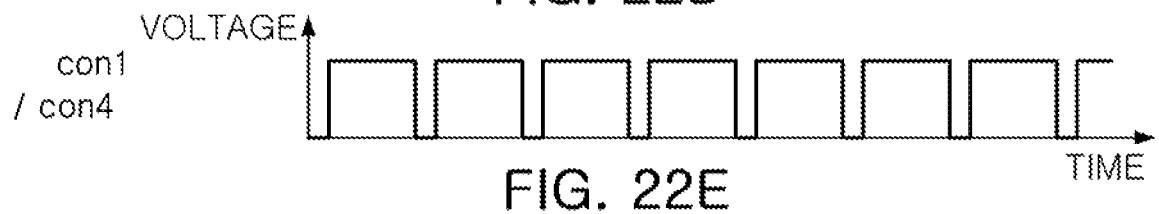
Figure 22F:
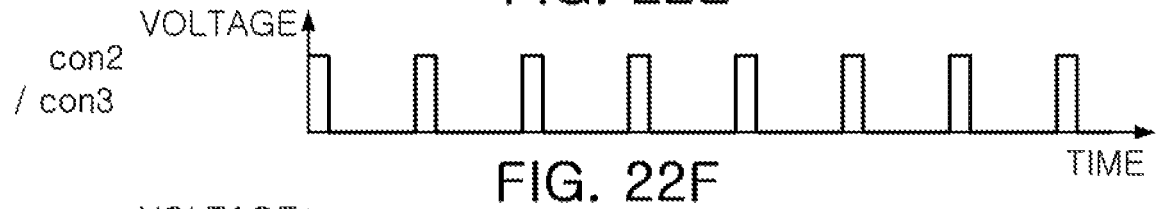

In the reduction mode, the duty cycle of the control signal is adjusted according to the signal received from the wireless power receiver 2. That is, in response to the amount of power received by the wireless power receiver 2 being greater than the amount of power required by the wireless power receiver 2 even though the frequency of the control signals con1, con2, con3, and con4 is increased up to a predetermined reference frequency (e.g., f2 of FIG. 6), as illustrated in FIGS. 22E and 22F, the controller 200, 201, 202, 203, 204, 205, 206, 207, or 208 fixes the frequency of the control signals con1, con2, con3, and con4 to the reference frequency (e.g., f2 of FIG. 6), and decreases the duty cycle of the second control signal con2 and the third control signal con2 and con3.

Figure 22G:
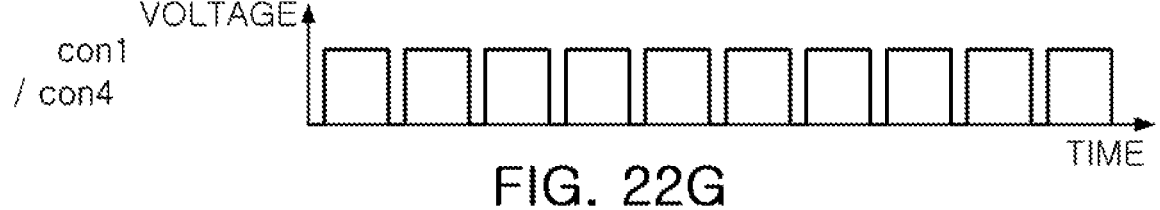
Figure 22H:
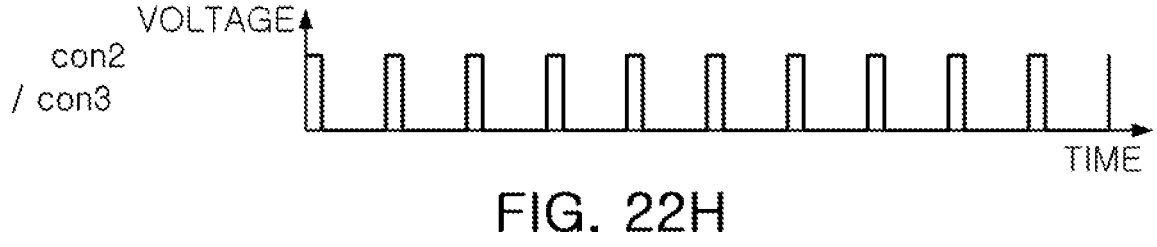

Alternatively, as illustrated in FIGS. 22G and 22H, in the reduction mode, the controller 200, 201, 202, 203, 204, 205, 206, 207, or 208 increases the frequency of the control signals con1, con2, con3, and con4. In this example, the duty cycle is fixed to the duty cycle previously decreased.

FIGS. 23A through 23L are waveform diagrams illustrating an operation of the wireless power transmitter 1, 1-2, 1-3, 1-4, 1-5, 1-6, 1-7, or 1-8 and the wireless power transmission method in response to an amount of power received by the wireless power receiver 2 being decreased in a power transmission mode, according to an embodiment. The waveform diagrams of FIGS. 23A through 23L represent waveforms of a control signal to control switching elements of the wireless power transmitter 1, 1-2, 1-3, 1-4, 1-5, 1-6, 1-7, or 1-8.

The first control signals con14, con15, and con18 of FIGS. 11, 12, and 15 are equivalent to the first control signal con1 of FIGS. 23A, 23C, 23E, and 23I, the second control signals con24, con25, and con28 of FIGS. 11, 12, and 15 are equivalent to the second control signal con2 of FIGS. 23B, 23D, 23F, and 23J, the third control signals con34, con35, and con38 of FIGS. 11, 12, and 15 are equivalent to the third control signal con3 of FIGS. 23B, 23D, 23G, and 23K, and the fourth control signals con44, con45, and con48 of FIGS. 11, 12, and 15 are equivalent to the fourth control signal con4 of FIGS. 23A, 23C, 23H, and 23L.

Figure 23A:
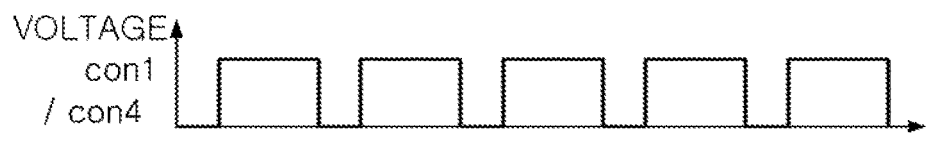
Figure 23B:
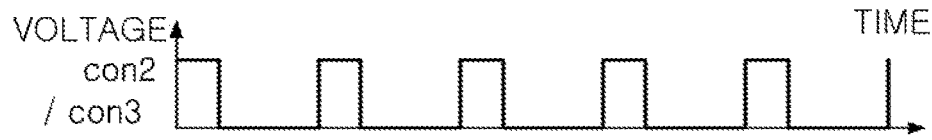

First, the controller 200, 201, 202, 203, 204, 205, 206, 207, or 208 outputs the same control signals con1, con2, con3, and con4 as those illustrated in FIGS. 23A and 23B. The controller 200, 201, 202, 203, 204, 205, 206, 207, or 208 also outputs the control signals initially output in the forms illustrated in FIGS. 23A and 23B in the normal mode, and also outputs the same control signals as those illustrated in FIGS. 23A and 23B in the detection mode.

Figure 23C:
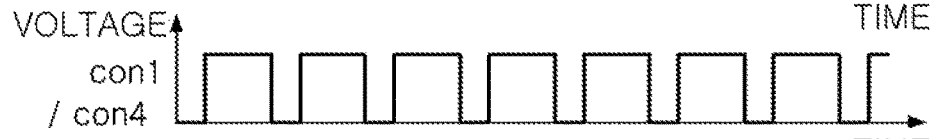
Figure 23D:
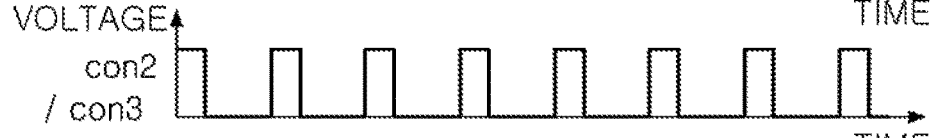

In a case in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1, con2, con3, and con4 as illustrated in FIGS. 23C and 23D. Therefore, the amount of power received by the wireless power receiver 2 decreases. The frequency of the control signals con1, con2, con3, and con4 of FIGS. 23C and 23D has a maximum value f2 (FIG. 6) of the frequency in the normal mode. In the normal mode, the duty cycle is fixed to the above-mentioned ping duty cycle.

In the reduction mode, the duty cycle of the control signal mis adjusted according to the signal received from the wireless power receiver 2. That is, when the amount of power received by the wireless power receiver 2 is greater than the amount of power required by the wireless power receiver 2, even though the frequency of the control signals con1, con2, con3, and con4 is increased up to a predetermined reference frequency (e.g., f2 of FIG. 6), as illustrated in FIGS. 23E, 23F, 23G, and 23H, the controller 200, 201, 202, 203, 204, 205, 206, 207, or 208 fixes the frequency of the control signals con1, con2, con3, and con4 to the reference frequency (e.g., f2 of FIG. 6), fixes the duty cycle of the second control signal con2, and decreases the duty cycle of the fourth control signal con4. In this case, a dead time is increased in the full-bridge circuit, and the amount of power transmitted by the wireless power transmitter 1, 1-2, 1-3, 1-4, 1-5, 1-6, 1-7, or 1-8 is decreased. As a result, the amount of power received by the wireless power receiver 2 is also decreased.

Figure 23E:
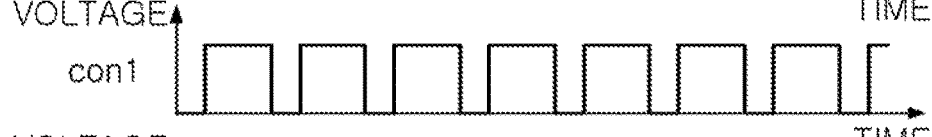
Figure 23F:
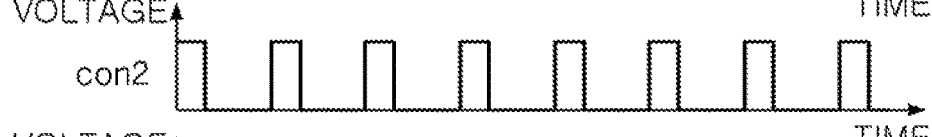
Figure 23G:
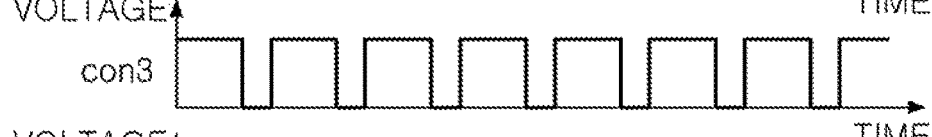
Figure 23H:
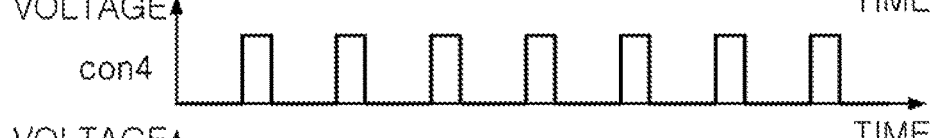
Figure 23I:
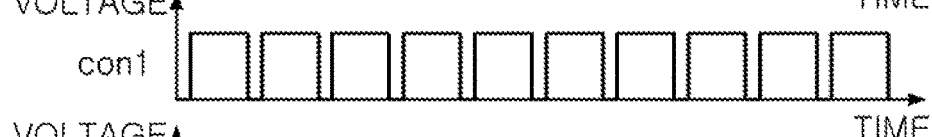
Figure 23J:
Figure 23K:
Figure 23L:
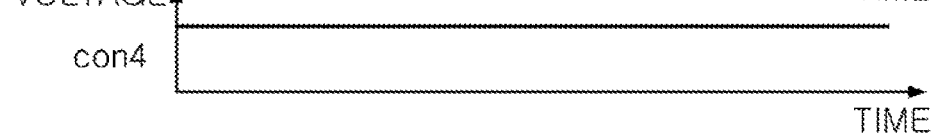

Alternatively, as illustrated in FIGS. 23I and 23J, in the reduction mode, the controller 200, 201, 202, 203, 204, 205, 206, 207, or 208 also increases the frequency of the control signals con1, con2, con3, and con4. In this example, the duty cycle of the control signals con1 and con2 of FIGS. 23E and 23F is equal to the duty cycle of the control signals con1 and con2 of FIGS. 23I and 23J. In addition, at the same time, as illustrated in FIGS. 23K and 23L, the third control signal con3 maintains a low level, and the fourth control signal con4 maintains a high level. In this example, the converter 114, 115, or 118 of FIG. 11, 12 or 15 is operated as the half-bridge circuit, such that the amount of power transmitted by the wireless power transmitter 2 is decreased. Thus, the amount of power received by the wireless power receiver 2 is further decreased when compared to the example in which only the frequency is adjusted.

Although FIGS. 23K and 23L illustrate the cases in which the controller 200, 201, 202, 203, 204, 205, 206, 207, or 208 fixes or maintains the third control signal con3 at the low level, and maintains the fourth control signal con4 at the high level, the third control signal con3 is equal to the second control signal con2 of FIG. 23J, and the fourth control signal con4 is equal to the first control signal con1 of FIG. 23I. That is, by increasing the frequencies of all of the first to fourth control signals, the power received by the wireless power receiver 2 is reduced.

FIGS. 24A through 24H are waveform diagrams illustrating an operation of the wireless power transmitter 1, 1-2, 1-3, 1-4, 1-5, 1-6, 1-7, or 1-8 and the wireless power transmission method in response to an amount of power received by the wireless power receiver 2 being decreased in a power transmission mode, according to an embodiment. The waveform diagram of FIG. 24 represents a waveform of a control signal to control switching elements of the wireless power transmitter 1, 1-2, 1-3, 1-4, 1-5, 1-6, 1-7, or 1-8.

Figure 24A:
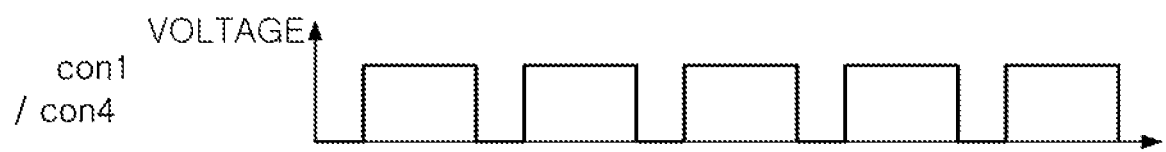
Figure 24B:
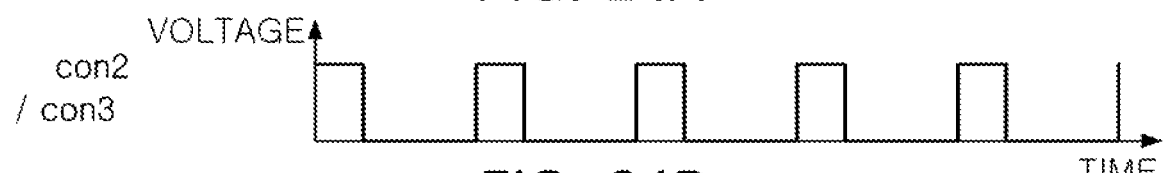
Figure 24C:
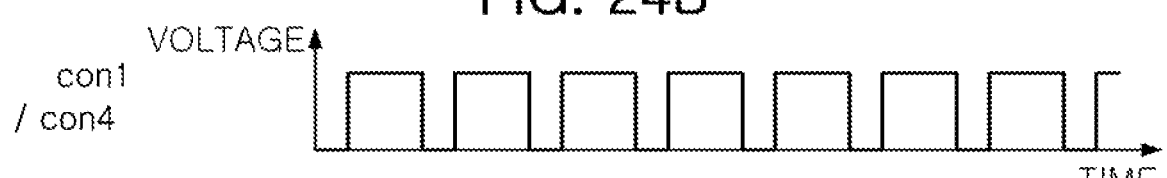
Figure 24D:
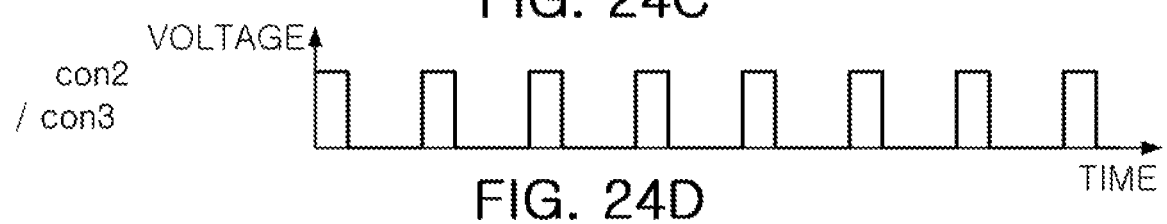
Figure 24E:
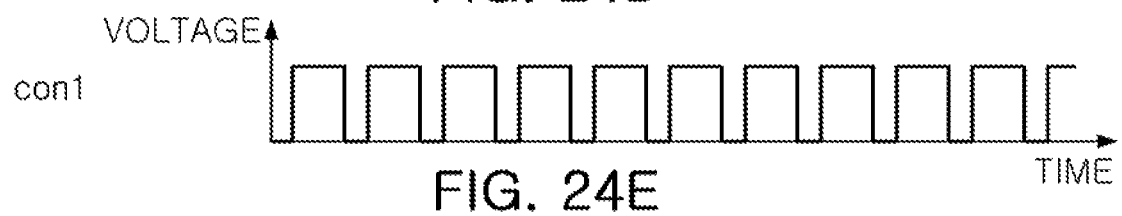
Figure 24F:
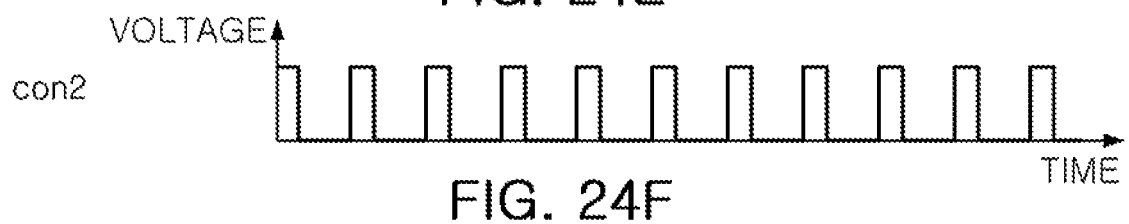
Figure 24G:
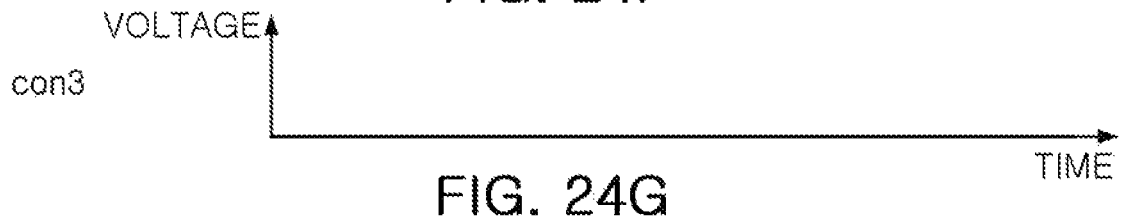
Figure 24H:
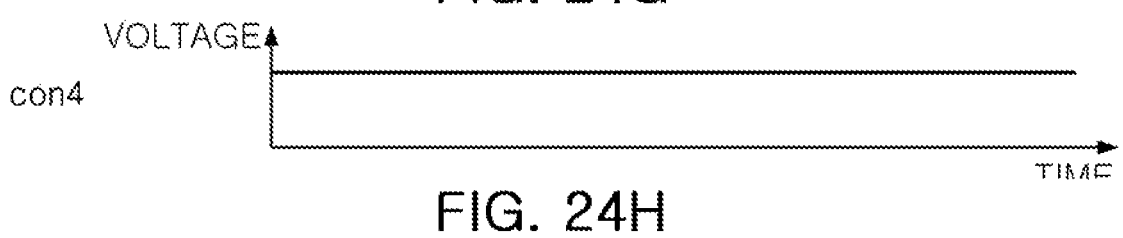

The first control signals con14, con15, and con18 of FIGS. 11, 12, and 15 are equivalent to the first control signal con1 of FIGS. 24A, 24C, and 24E, the second control signals con24, con25, and con28 of FIGS. 11, 12, and 15 are equivalent to the second control signal con2 of FIGS. 24B, 24D, and 24F, the third control signals con34, con35, and con38 of FIGS. 11, 12, and 15 are equivalent to the third control signal con3 of FIGS. 24B, 24D, and 24G, and the fourth control signals con44, con45, and con48 of FIGS. 11, 12, and 15 are equivalent to the fourth control signal con4 of FIGS. 24A, 24C, and 24H.

First, the controller 200, 201, 202, 203, 204, 205, 206, 207, or 208 outputs the same control signals con1, con2, con3, and con4 as those illustrated in FIGS. 24A and 24B. The controller 200, 201, 202, 203, 204, 205, 206, 207, or 208 also outputs the control signals initially output in the forms illustrated in FIGS. 24A and 24B in the normal mode, and outputs the same control signals as those illustrated in FIGS. 24A and 24B in the detection mode.

In an example in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1, con2, con3, and con4 as illustrated in FIGS. 24C and 24D. Therefore, the amount of power received by the wireless power receiver 2 decreases. The frequency of the control signals con1, con2, con3, and con4 of FIGS. 24C and 24D has a maximum value f2 (FIG. 6) of the frequency in the normal mode. In the normal mode, the duty cycle is fixed to the above-mentioned ping duty cycle.

In an example in which an amount of power received by the wireless power receiver 2 is greater than an amount of power required by the wireless power receiver 2, even though the frequency of the control signals con1, con2, con3, and con4 is increased up to a predetermined reference frequency (e.g., f2 of FIG. 6), the controller 200, 201, 202, 203, 204, 205, 206, 207, or 208 is operated in the reduction mode. In the reduction mode, as illustrated in FIGS. 24E, 24F, 24G, and 24H, the controller 200, 201, 202, 203, 204, 205, 206, 207, or 208 increases the frequency of the first control signal con1 and the second control signal con2, while the third control signal con3 maintains a low level and the fourth control signal con4 maintains a high level. In this case, the converters 114, 115, and 118 of FIGS. 11, 12 and/or 15 are operated as the half-bridge circuit, such that the amount of power transmitted by the wireless power transmitter 1, 1-2, 1-3, 1-4, 1-5, 1-6, 1-7, or 1-8 is decreased, where the amount of power received by the wireless power receiver 2 is further decreased compared with the example in which only the frequency is adjusted.

Figure 25:
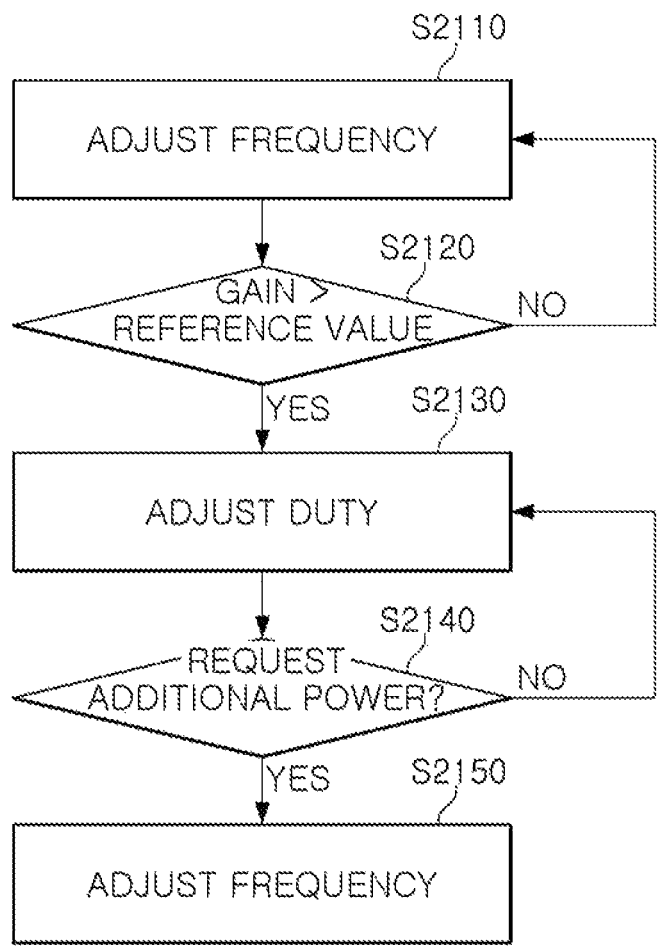
FIGS. 25 and 26 are diagrams schematically illustrating a process of changing adjusted variables in the wireless power transmitter and the wireless power transmission method, according to an embodiment.

FIG. 25 is a diagram schematically illustrating a process of changing adjusted variables in the wireless power transmitter 1, 1-1, 1-2, 1-3, 1-4, 1-5, 1-6, 1-7, or 1-8 and the wireless power transmission method, according to an embodiment.

Referring to FIG. 25, in operation S2110, the controller 200, 201, 202, 203, 204, 205, 206, 207, or 208 adjusts a frequency of the power that is wirelessly transmitted in response to the request signal input from the wireless power receiver 2. For example, the controller 200, 201, 202, 203, 204, 205, 206, 207, or 208 adjusts the frequency of the power that is wirelessly transmitted by adjusting the frequency of the control signal. That is, in an example in which the wireless power receiver 2 needs a large amount of power, the controller 200, 201, 202, 203, 204, 205, 206, 207, or 208 decreases the frequency and, in an example in which the wireless power receiver 2 needs a small amount of power, the controller 200, 201, 202, 203, 204, 205, 206, 207, or 208 increases the frequency. Operation S2110 may also be performed in the normal mode, and may also be performed in the boost mode.

Next, in operation S2120, the controller 200, 201, 202, 203, 204, 205, 206, 207, or 208 determines whether a gain at the adjusted frequency is greater than a reference value. In this example, by determining whether the adjusted frequency reaches the reference value, the controller 200, 201, 202, 203, 204, 205, 206, 207, or 208 determines whether the adjusted frequency is greater than the reference value.

As a result of the determination in operation S2120, if the controller 200, 201, 202, 203, 204, 205, 206, 207, or 208 determines that the gain at the adjusted frequency is less than the reference value, operation S2110 is performed.

As a result of the determination in operation S2120, if the controller 200, 201, 202, 203, 204, 205, 206, 207, or 208 determines that a gain at a current frequency is equal to or greater than the reference value, in operation S2130, the duty cycle of the control signal is adjusted. In this example, the frequency is fixed. That is, in the case in which operation S2110 is performed in the normal mode, the operation mode is changed to the boost mode.

Next, even after the duty cycle is adjusted up to a limit value, the controller 200, 201, 202, 203, 204, 205, 206, 207, or 208 determines in operation S2140 whether there is an additional power request. For example, even after the duty cycle is increased up to the limit value, the controller 200, 201, 202, 203, 204, 205, 206, 207, or 208 determines whether the wireless power receiver requires a larger amount of power.

As a result of the determination in operation S2140, if there is an additional power request, the frequency is also adjusted in operation S2150. Operation S2150 may be performed in the boost mode.

Although FIG. 25 illustrates an example in which the amount of power received by the wireless power receiver 2 is increased, an operation to decrease the amount of power received from the wireless power receiver 2 may be implemented similarly to FIG. 25.

Figure 26:
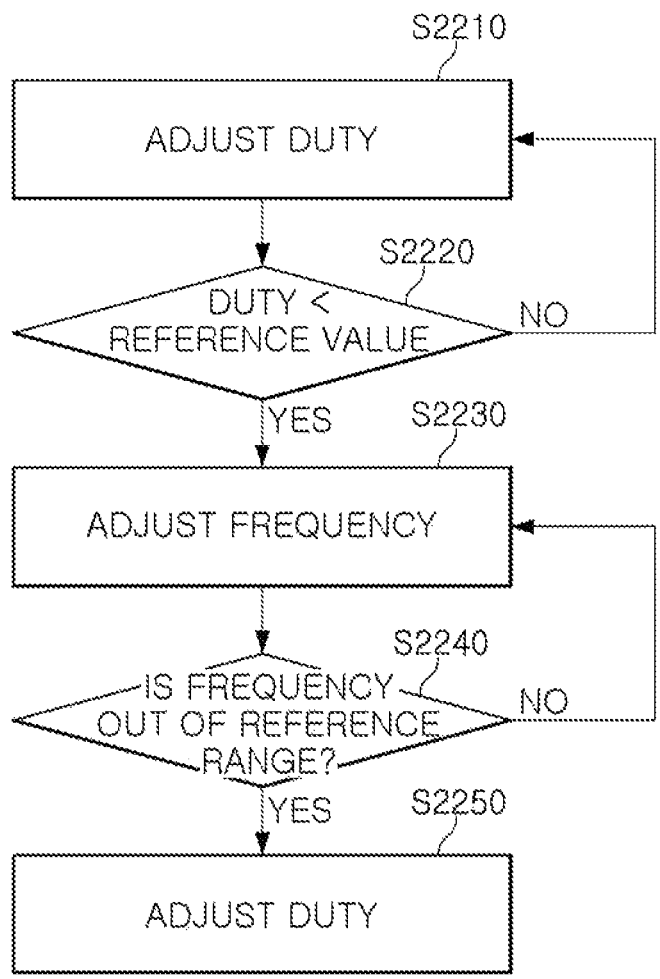

FIG. 26 is a diagram schematically illustrating a process of changing adjusted variables in the wireless power transmitter 1, 1-1, 1-2, 1-3, 1-4, 1-5, 1-6, 1-7, or 1-8 and the wireless power transmission method, according to an embodiment.

Referring to FIG. 26, in operation S2210, the controller 200, 201, 202, 203, 204, 205, 206, 207, or 208 adjusts the duty cycle of the control signal, in response to the request signal input from the wireless power receiver 2. For example, in a case in which the wireless power receiver 2 needs a large amount of power, the controller 200, 201, 202, 203, 204, 205, 206, 207, or 208 increases the duty cycle, and in a case in which the wireless power receiver 2 needs a small amount of power, the controller 200, 201, 202, 203, 204, 205, 206, 207, or 208 decreases the duty cycle. Operation S2210 may also be performed in the boost mode and the reduction mode.

Next, in operation S2220, the controller 200, 201, 202, 203, 204, 205, 206, 207, or 208 determines whether the adjusted duty cycle is less than a reference value. If it is determined in operation S2220 that the adjusted duty cycle is greater than the reference value, operation S2210 is performed.

If it is determined in operation S2220 that the adjusted duty cycle is equal to or less than the reference value, in operation S2230, the frequency of the power which is wirelessly transmitted is adjusted. In this example, the duty cycle is fixed to the reference value. In addition, the frequency of the power which is wirelessly transmitted is adjusted by adjusting the frequency of the control signal. For example, the amount of power received from the wireless power receiver 2 is decreased by increasing the frequency of the control signal. In the example in which operation S2210 is performed in the boost mode, operation S2230 is performed in the normal mode.

Next, in operation S2240, the controller 200, 201, 202, 203, 204, 205, 206, 207, or 208 determines whether the adjusted frequency is outside a reference range.

If it is determined in operation S2240 that the adjusted frequency is outside the reference range, in operation S2250, the duty cycle is adjusted. For example, if the controller 200, 201, 202, 203, 204, 205, 206, 207, or 208 determines in operation S2240 that the adjusted frequency is the reference value or more, in operation S2250, the frequency is fixed to the reference value and the duty cycle is decreased. In the example in which operation S2230 is performed in the normal mode, operation S2250 is performed in the reduction mode. Alternatively, all of the operations illustrated in FIG. 23 may be performed in the reduction mode.

Although FIG. 26 illustrates an example in which the amount of power received by the wireless power receiver 2 is decreased, an operation of increasing the amount of power received by the wireless power receiver 2 may be implemented similarly to the manner illustrated in FIG. 26.

FIGS. 27 through 46 are diagrams each illustrating an operation of determining, by the controller 200, 201, 202, 203, 204, 205, 206, 207, or 208, an operating frequency and an operating duty cycle. The controller 200, 201, 202, 203, 204, 205, 206, 207, or 208 determines the operating frequency and the operating duty cycle using the methods illustrated in FIGS. 27 through 46, and outputs the control signals that control the switching elements using the determined operating frequency and operating duty cycle.

Error information in each of FIGS. 27 through 46, which is information received from the wireless power receiver 2, is information included in the request signal req of FIGS. 7 through 15, and is provided to the controller 200, 201, 202, 203, 204, 205, 206, 207, or 208 in a form of an independent signal.

In each of FIGS. 27 through 46, the operating duty cycle is a duty cycle of the control signal that controls a low side switching element (i.e., the second switching element Q21, Q22, Q23, Q24, Q25, Q26, and Q28 and/or the fourth switching element Q44, Q45, and Q48 of FIGS. 8 through 13, and 15) or the switching element of the boost converter (i.e., the sixth switching element Q67 of FIG. 14). Therefore, a duty cycle of each of the controlling signals that controls a high side switching element (i.e., the first switching element Q11, Q12, Q13, Q14, Q15, Q16, and Q18 and/or the third switching element Q34, Q35, and Q38 of FIGS. 8 through 13, and 15) may be a 100−operating duty cycle d_c.

In addition, in each of FIGS. 27 through 46, the operating frequency is an operating frequency of at least one of the switching elements (i.e., the switching elements Q11, Q21, Q12, Q22, Q13, Q23, Q14, Q24, Q34, Q44, Q15, Q25, Q35, Q45, Q16, Q26, Q17, Q27, Q18, Q28, Q38, and Q48 of FIGS. 8 through 15) performing an inverter function.

In FIGS. 27 through 46, the first reference frequency f1 and the second reference frequency f2 is set by the same method used to set the first and second reference frequencies f1 and f2 illustrated in FIG. 6. In addition, a first reference duty cycle d1 and a second reference duty cycle d2 may also be set similarly to the setting of the first reference frequency f1 and the second reference frequency f2. For example, the first reference duty cycle d1, which is a lower limit value of the duty cycle, which is adjustable in a first reduction mode, is determined by considering power transmission efficiency, element characteristics of the wireless power transmitter 1, 1-2, 1-3, 1-4, 1-5, 1-6, 1-7, or 1-8 and the wireless power receiver 2, standards, or other protocols. The second reference duty cycle d2, which is an upper limit value of the duty cycle which is adjustable in a first boost mode, is determined by considering power transmission efficiency, element characteristics of the wireless power transmitter 1, 1-2, 1-3, 1-4, 1-5, 1-6, 1-7, or 1-8 and the wireless power receiver 2, a degree of heating, standards, or other protocols. In one example, the second reference frequency f2 is greater than the first reference frequency f1, and the second reference duty cycle d2 is greater than the first reference duty cycle d1. In addition, in an example, the first reference frequency f1 is less than or equal to a ping frequency f_p, and the second reference frequency f2 is greater than or equal to the ping frequency f_p. The first reference duty cycle d1 is less than or equal to a ping duty cycle d_p, and the second reference duty cycle d2 is greater than or equal to the ping duty cycle d_p. In addition, the first reference frequency f1 is greater than the resonance frequency of the resonator 120, 121, 122, 123, 124, 125, 126, 127, or 128 of FIGS. 7 through 15.

Figure 27:
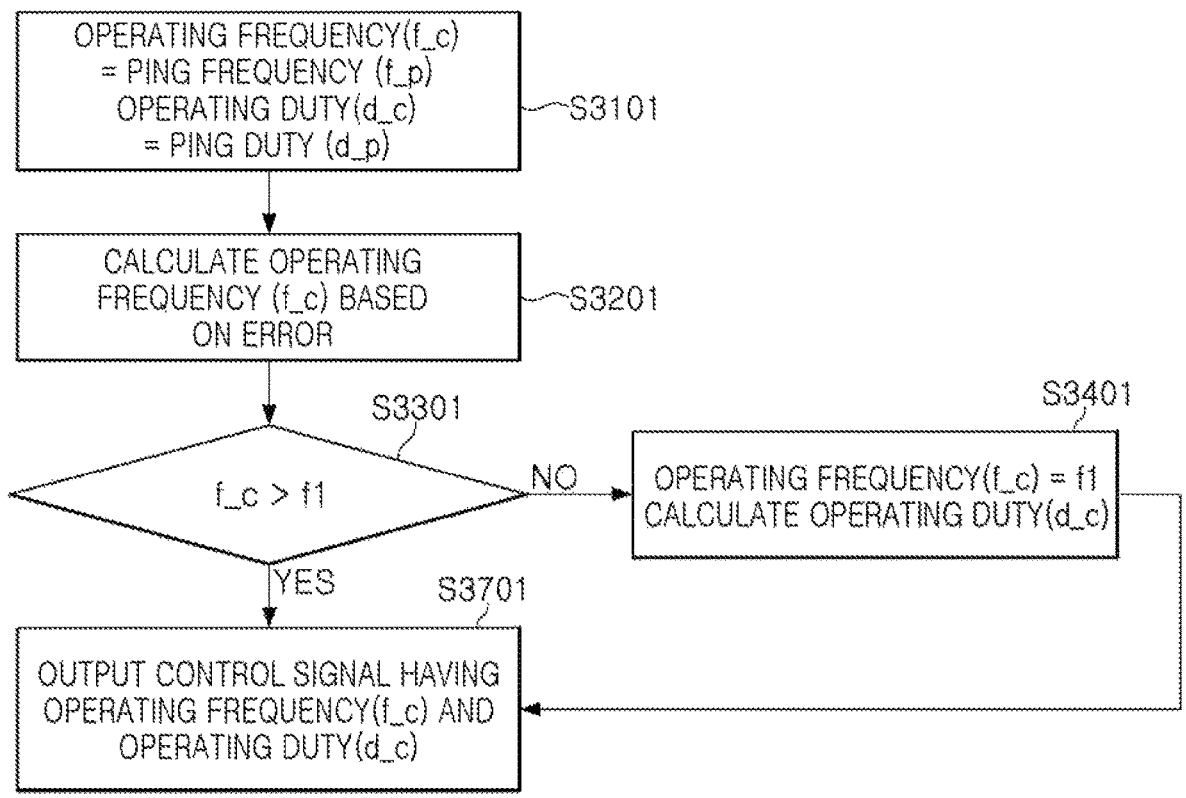
FIGS. 27 through 46 are operation flowcharts illustrating an operation of the wireless power transmitter and the wireless power transmission method in a power transmission mode, according to an embodiment, and diagrams illustrating a change of an operating frequency and an operating duty cycle.

FIG. 27 is a flowchart illustrating an operation of the wireless power transmitter 1, 1-2, 1-3, 1-4, 1-5, 1-6, 1-7, or 1-8 or the wireless power transmission method in a power transmission mode, according to an embodiment.

First, in operation S3101, the controller 200, 201, 202, 203, 204, 205, 206, 207, or 208 sets the operating frequency f_c to the ping frequency f_p, and sets the operating duty cycle d_c to the ping duty cycle d_p. Operation S3101 is performed in the detection mode.

Next, in operation S3201, the controller 200, 201, 202, 203, 204, 205, 206, 207, or 208 calculates the operating frequency f_c based on the error information received from the wireless power receiver 2. In this example, the operating duty cycle d_c is fixed to the ping duty cycle d_p. The error information is information regarding a difference between the amount of power required by the wireless power receiver 2 and the amount of power received by the wireless power receiver 2.

Next, in operation S3301, the controller 200, 201, 202, 203, 204, 205, 206, 207, or 208 determines whether the calculated operating frequency f_c is greater than the first reference frequency f1.

If it is determined in operation S3301 that the calculated operating frequency f_c is greater than the first reference frequency f1, in operation S3701, the controller 200, 201, 202, 203, 204, 205, 206, 207, or 208 generates the control signals using the calculated operating frequency f_c and operating duty cycle d_c, and outputs the generated control signals.

If it is determined in operation S3301 that the operating frequency f_c is less than or equal to the first reference frequency f1, in operation S3401, the controller 200, 201, 202, 203, 204, 205, 206, 207, or 208 sets the operating frequency f_c to the first reference frequency f1, and calculates the operating duty cycle d_c based on the error information.

After performing operation S3401, in operation S3701, the controller 200, 201, 202, 203, 204, 205, 206, 207, or 208 generates the control signals using the calculated operating frequency f_c and operating duty cycle d_c, and outputs the generated control signals.

Figure 28:
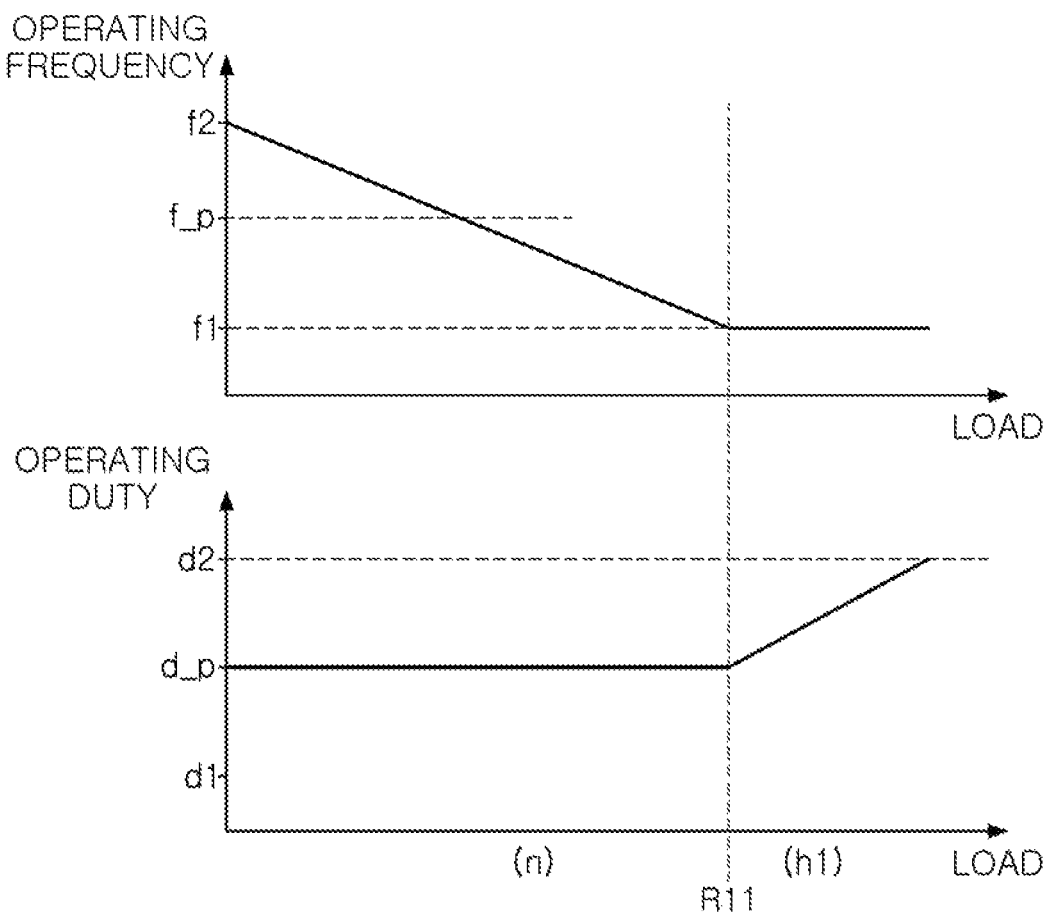

FIG. 28 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 28, first, in the normal mode n, the controller 200, 201, 202, 203, 204, 205, 206, 207, or 208 adjusts the amount of power received by the wireless power receiver 2 by varying the operating frequency f_c, in response to the error information received from the wireless power receiver 2. In this example, the operating duty cycle d_c is fixed to the ping duty cycle d_p. In the normal mode n, the operating frequency f_c varies within the range of the first reference frequency f1 to the second reference frequency f2.

When the amount of power received by the wireless power receiver 2 is less than the amount of power required by the wireless power receiver 2, even in the example in which the operating frequency f_c is decreased to the first reference frequency f1, the operation mode of the controller 200, 201, 202, 203, 204, 205, 206, 207, or 208 changes to the first boost mode h1, and the controller 200, 201, 202, 203, 204, 205, 206, 207, or 208 is adjusted the operating duty cycle d_c after fixing the operating frequency f_c to the first reference frequency f1. In the first boost mode h1, the operating duty cycle d_c varies within the range of the ping duty cycle d_p to the second reference duty cycle d2.

An operation of FIG. 28 will be described below with reference to the amount of power required by the wireless power receiver 2, that is, a load amount.

With respect to FIG. 28, in response to the load amount being less than a first reference load amount R11, the controller 200, 201, 202, 203, 204, 205, 206, 207, or 208 is operated in the normal mode n. In the normal mode n, the controller 200, 201, 202, 203, 204, 205, 206, 207, or 208 fixes the operating duty cycle d_c to the ping duty cycle d_p, and varies the operating frequency f_c. In the normal mode, the operating frequency f_c varies within the range of the first reference frequency f1 to the second reference frequency f2.

If the load amount is greater than the first reference load amount R11, the controller 200, 201, 202, 203, 204, 205, 206, 207, or 208 is operated in the first boost mode h1. In the first boost mode h1, the controller 200, 201, 202, 203, 204, 205, 206, 207, or 208 fixes the operating frequency f_c to the first reference frequency f1, and varies the operating duty cycle d_c. In the first boost mode h1, the controller 200, 201, 202, 203, 204, 205, 206, 207, or 208 varies the operating duty cycle d_c in the range of the ping duty cycle d_p to the second duty cycle.

Figure 29:
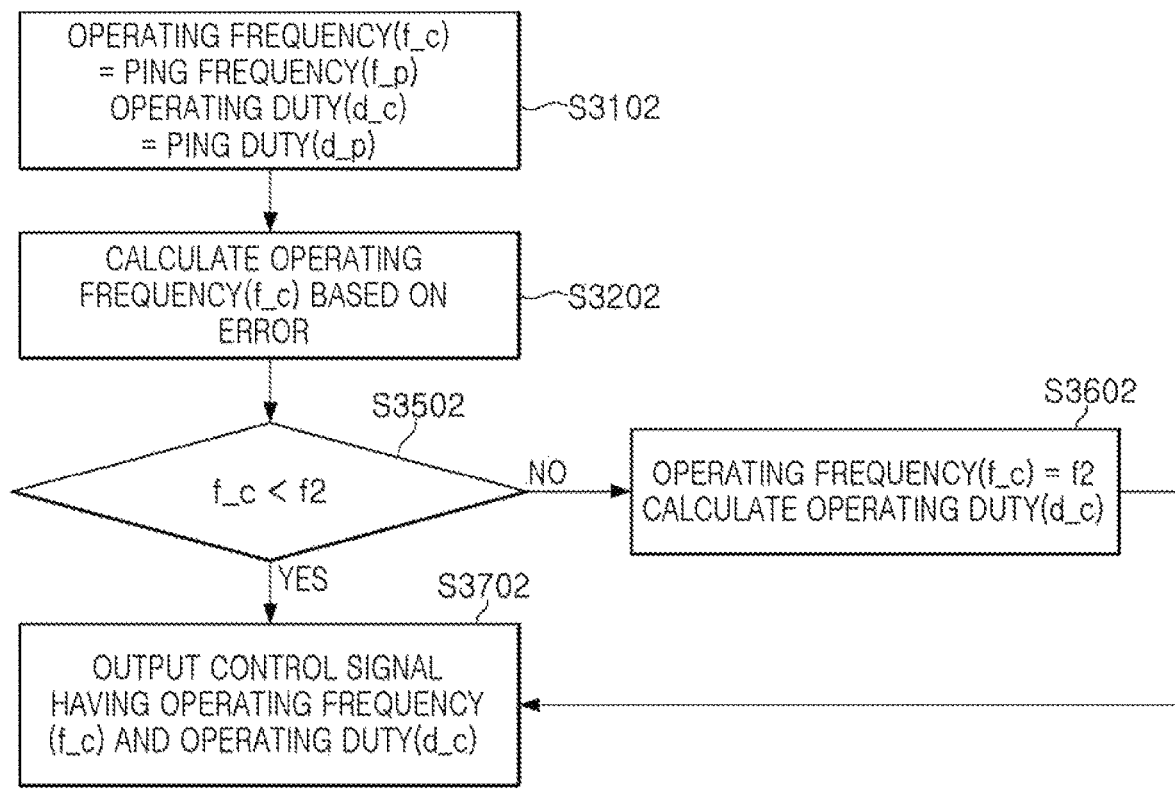

FIG. 29 is a flowchart illustrating an operation of the wireless power transmitter 1, 1-2, 1-3, 1-4, 1-5, 1-6, 1-7, or 1-8 and the wireless power transmission method in a power transmission mode, according to an embodiment.

In operation S3102, the controller 200, 201, 202, 203, 204, 205, 206, 207, or 208 sets the operating frequency f_c to the ping frequency f_p, and sets the operating duty cycle d_c to the ping duty cycle d_p. Operation S3102 may be performed in the detection mode.

In operation S3202, the controller 200, 201, 202, 203, 204, 205, 206, 207, or 208 calculates the operating frequency f_c based on the error information received from the wireless power receiver 2. In this example, the operating duty cycle d_c is fixed to the ping duty cycle d_p. The error information error is information regarding a difference between the amount of power required by the wireless power receiver 2 and the amount of power received by the wireless power receiver 2.

In operation S3502, the controller 200, 201, 202, 203, 204, 205, 206, 207, or 208 determines whether the calculated operating frequency f_c is less than the second reference frequency f2.

If it is determined in operation S3502 that the calculated operating frequency f_c is less than the second reference frequency f2, in operation S3702, the controller 200, 201, 202, 203, 204, 205, 206, 207, or 208 generates the control signals using the calculated operating frequency f_c and operating duty cycle d_c, and outputs the generated control signals.

Alternatively, if it is determined in operation S3502 that the operating frequency f_c is greater than or equal to the second reference frequency f2, in operation S3602, the controller 200, 201, 202, 203, 204, 205, 206, 207, or 208 sets the operating frequency f_c to the second reference frequency f2, and calculates the operating duty cycle d_c based on the error information error.

In operation S3702, the controller 200, 201, 202, 203, 204, 205, 206, 207, or 208 generates the control signals using the calculated operating frequency f_c and operating duty cycle d_c, and outputs the generated control signals.

Figure 30:
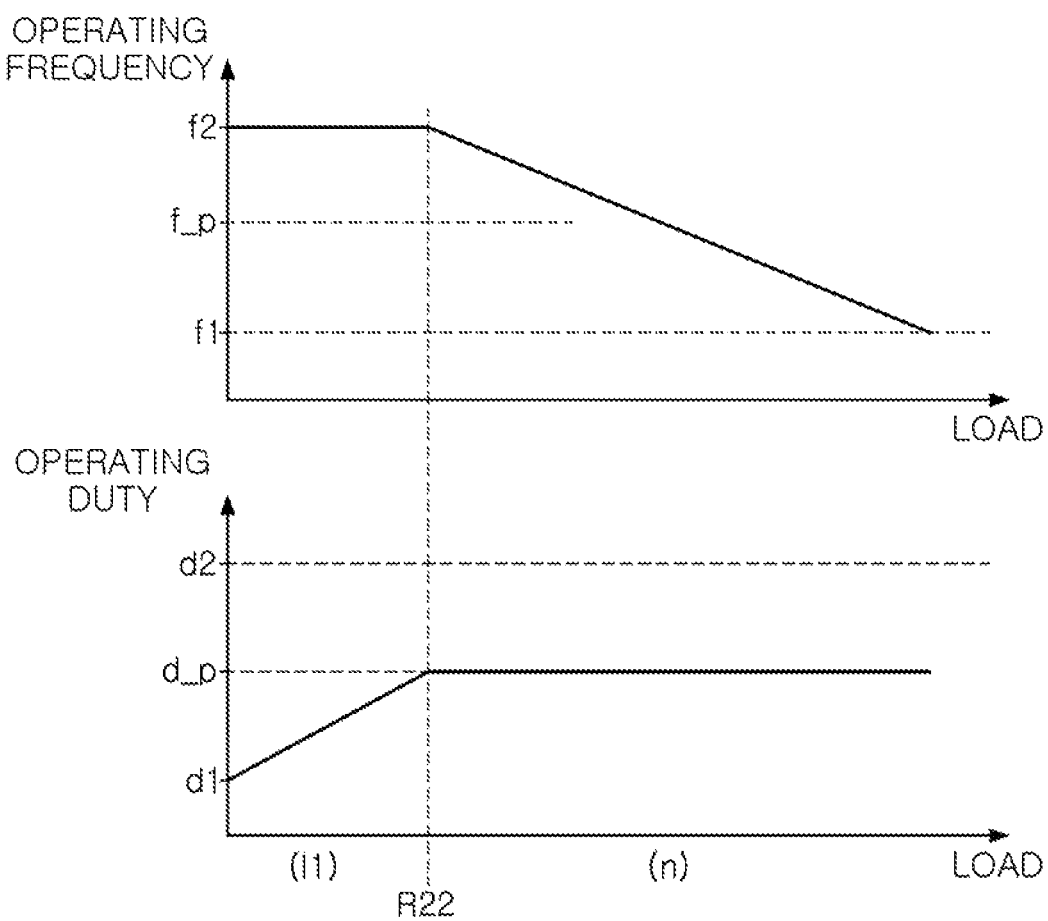

FIG. 30 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 30, in the normal mode n, in response to the error information received from the wireless power receiver 2, the controller 200, 201, 202, 203, 204, 205, 206, 207, or 208 adjusts the amount of power received by the wireless power receiver 2 by varying the operating frequency f_c. In this example, the operating duty cycle d_c is fixed to the ping duty cycle d_p.

In response to the amount of power received by the wireless power receiver 2 being greater than the amount of power required by the wireless power receiver 2, even in the example in which the operating frequency f_c is increased to the second reference frequency f2, the operation mode of the controller 200, 201, 202, 203, 204, 205, 206, 207, or 208 changes to a first reduction mode l1, and the controller 200, 201, 202, 203, 204, 205, 206, 207, or 208 adjusts the operating duty cycle d_c after fixing the operating frequency f_c to the second reference frequency f2.

An operation of FIG. 30 will be described below with reference to the amount of power needed by the wireless power receiver 2, that is, a load amount.

Referring to FIG. 30, in response to the load amount being greater than a second reference load amount R22, the controller 200, 201, 202, 203, 204, 205, 206, 207, or 208 is operated in the normal mode n. In the normal mode n, the controller 200, 201, 202, 203, 204, 205, 206, 207, or 208 fixes the operating duty cycle d_c to the ping duty cycle d_p, and varies the operating frequency f_c. In the normal mode, the operating frequency f_c varies within the range of the first reference frequency f1 to the second reference frequency f2.

In response to the load amount being less than the second reference load amount R22, the controller 200, 201, 202, 203, 204, 205, 206, 207, or 208 is operated in the first reduction mode l1. In the first reduction mode l1, the controller 200, 201, 202, 203, 204, 205, 206, 207, or 208 fixes the operating frequency f_c to the second reference frequency f2, and varies the operating duty cycle d_c. In the first reduction mode l1, the controller 200, 201, 202, 203, 204, 205, 206, 207, or 208 varies the operating duty cycle d_c in the range of the ping duty cycle d_p to the first duty cycle d1.

Figure 31:
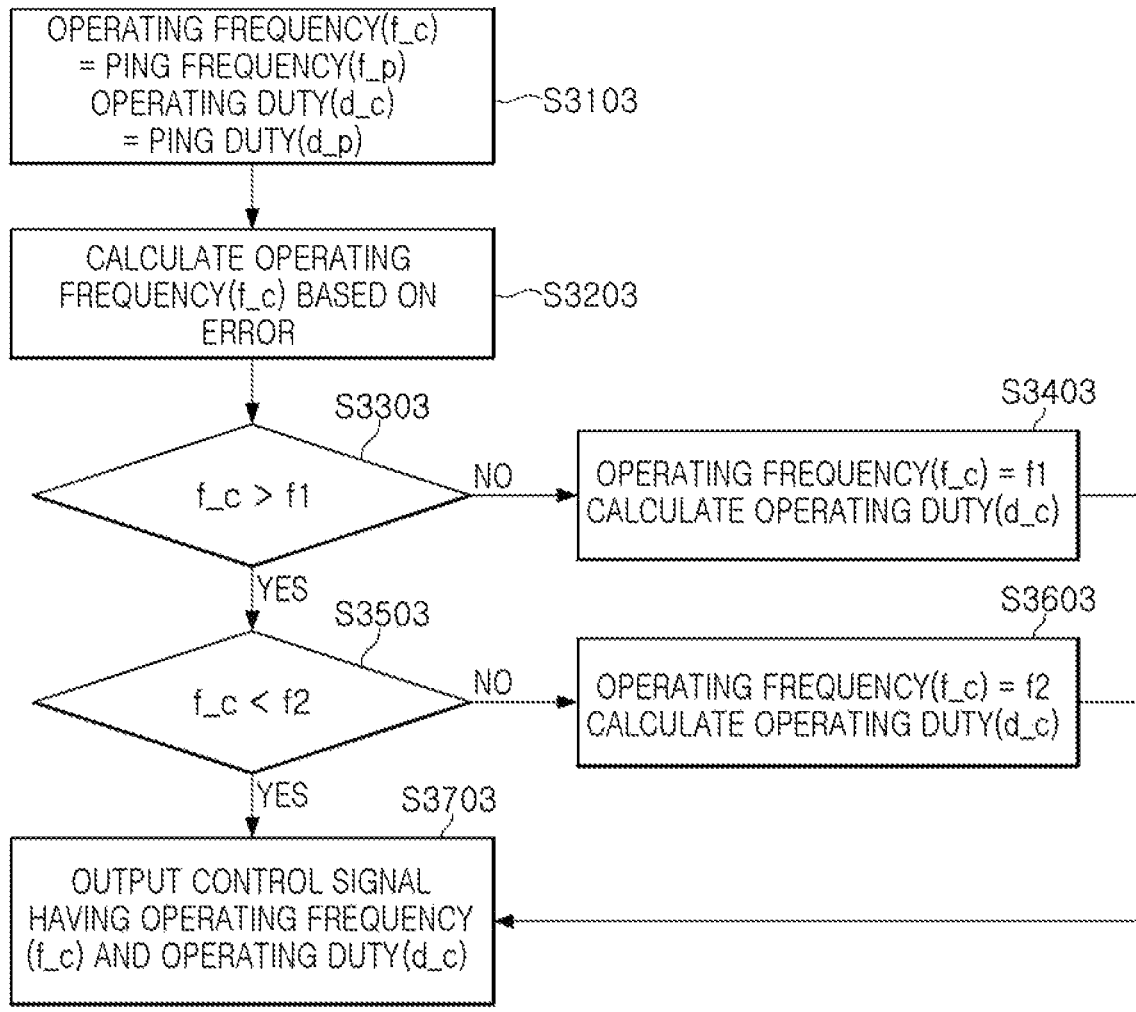

FIG. 31 is a flowchart illustrating an operation of the wireless power transmitter 1, 1-2, 1-3, 1-4, 1-5, 1-6, 1-7, or 1-8 and the wireless power transmission method, according to an embodiment.

In operation S3103, the controller 200, 201, 202, 203, 204, 205, 206, 207, or 208 sets the operating frequency f_c to the ping frequency f_p, and sets the operating duty cycle d_c to the ping duty cycle d_p. Operation S3103 may be performed in the detection mode.

In operation S3203, the controller 200, 201, 202, 203, 204, 205, 206, 207, or 208 calculates the operating frequency f_c based on the error information received from the wireless power receiver. In this example, the operating duty cycle d_c is fixed to the ping duty cycle d_p. The error information is information regarding a difference between the amount of power required by the wireless power receiver 2 and the amount of power received by the wireless power receiver 2.

In operation S3303, the controller 200, 201, 202, 203, 204, 205, 206, 207, or 208 determines whether the calculated operating frequency f_c is greater than the first reference frequency f1.

If it is determined in operation S3303 that the operating frequency f_c is less than or equal to the first reference frequency f1, in operation S3403, the controller 200, 201, 202, 203, 204, 205, 206, 207, or 208 sets the operating frequency f_c to the first reference frequency f1, and calculates the operating duty cycle d_c based on the error information.

In operation S3703, the controller 200, 201, 202, 203, 204, 205, 206, 207, or 208 generates the control signals using the calculated operating frequency f_c and operating duty cycle d_c, and outputs the generated control signals.

Alternatively, if it is determined in operation S3303 that the calculated operating frequency f_c is greater than the first reference frequency f1, in operation S3503, the controller 200, 201, 202, 203, 204, 205, 206, 207, or 208 determines whether the calculated operating frequency f_c is less than the second reference frequency f2.

If it is determined in operation S3503 that the calculated operating frequency f_c is less than the second reference frequency f2, that is, the operating frequency f_c calculated in operation S3203 is a value between the first reference frequency f1 and the second reference frequency f2, in operation S3703, the controller 200, 201, 202, 203, 204, 205, 206, 207, or 208 generates the control signals using the calculated operating frequency f_c and operating duty cycle d_c, and outputs the generated control signals.

Alternatively, if it is determined in operation S3503 that the operating frequency f_c is greater than or equal to the second reference frequency f2, in operation S3603, the controller 200, 201, 202, 203, 204, 205, 206, 207, or 208 sets the operating frequency f_c to the second reference frequency f2, and calculates the operating duty cycle d_c based on the error information.

In operation S3703, the controller 200, 201, 202, 203, 204, 205, 206, 207, or 208 generates the control signals using the calculated operating frequency f_c and operating duty cycle d_c, and outputs the generated control signals.

Figure 32:
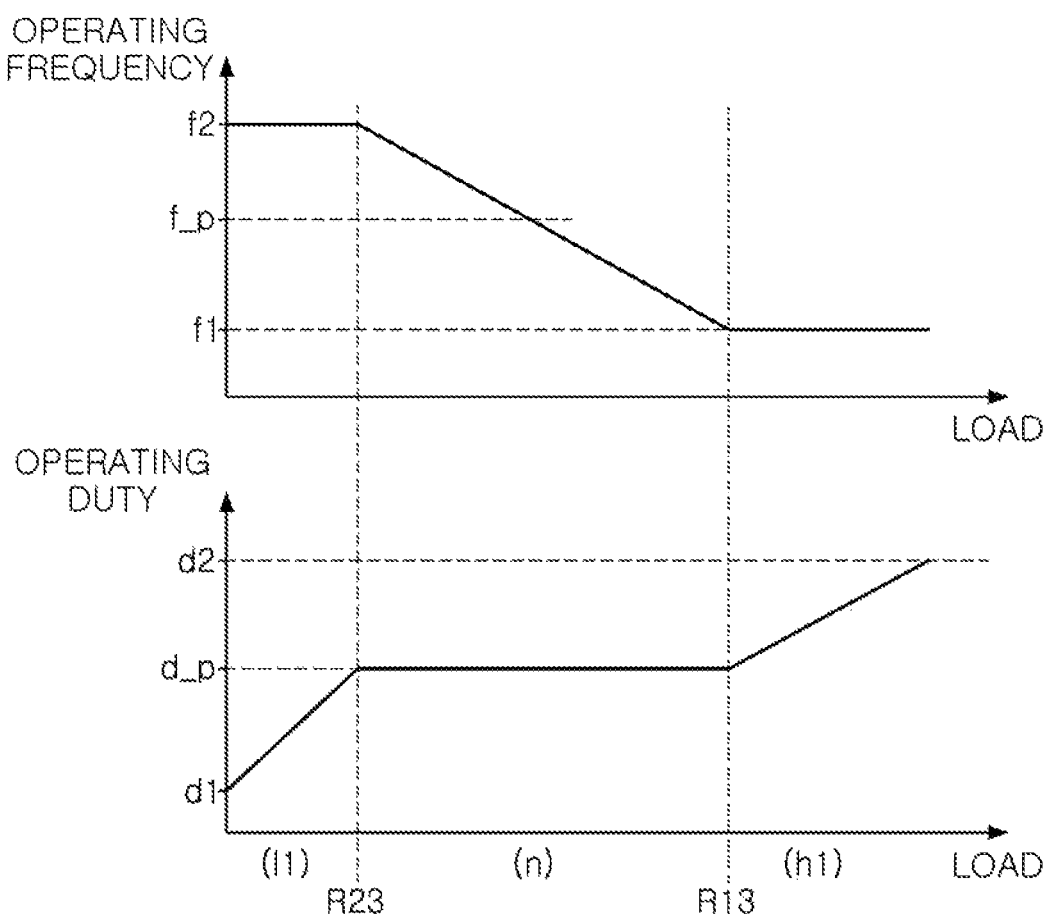

FIG. 32 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 32, in the normal mode n, in response to the error information received from the wireless power receiver 2, the controller 200, 201, 202, 203, 204, 205, 206, 207, or 208 adjusts the amount of power received by the wireless power receiver 2 by varying the operating frequency f_c. In this example, the operating duty cycle d_c may be fixed to the ping duty cycle d_p.

When the amount of power received by the wireless power receiver 2 is less than the amount of power needed by the wireless power receiver 2, even in the example in which the operating frequency f_c is decreased to the first reference frequency f1, the operation mode of the controller 200, 201, 202, 203, 204, 205, 206, 207, or 208 changes to the first boost mode h1, and the controller 200, 201, 202, 203, 204, 205, 206, 207, or 208 adjusts the operating duty cycle d_c after fixing the operating frequency f_c to the first reference frequency f1.

In response to the amount of power received by the wireless power receiver 2 being greater than the amount of power needed by the wireless power receiver 2, even in the example in which the operating frequency f_c is increased to the second reference frequency f2, the operation mode of the controller 200, 201, 202, 203, 204, 205, 206, 207, or 208 changes to a first reduction mode l1, and the controller 200, 201, 202, 203, 204, 205, 206, 207, or 208 adjusts the operating duty cycle d_c after fixing the operating frequency f_c to the second reference frequency f2.

An operation of FIG. 32 will be described below with reference to the amount of power required by the wireless power receiver 2, that is, a load amount.

If the load amount is less than a first reference load amount R13 and is greater than a second reference load amount R23, the controller 200, 201, 202, 203, 204, 205, 206, 207, or 208 operates in the normal mode n. In the normal mode n, the controller 200, 201, 202, 203, 204, 205, 206, 207, or 208 fixes the operating duty cycle d_c to the ping duty cycle d_p, and varies the operating frequency f_c. In the normal mode, the operating frequency f_c is varied within the range of the first reference frequency f1 to the second reference frequency f2.

If the load amount is greater than the first reference load amount R13, the controller 200, 201, 202, 203, 204, 205, 206, 207, or 208 is operated in the first boost mode h1. In the first boost mode h1, the controller 200, 201, 202, 203, 204, 205, 206, 207, or 208 fixes the operating frequency f_c to the first reference frequency f1, and varies the operating duty cycle d_c. In the first boost mode h1, the controller 200, 201, 202, 203, 204, 205, 206, 207, or 208 varies the operating duty cycle d_c in the range of the ping duty cycle d_p to the second duty cycle d2.

If the load amount is less than the second reference load amount R22, the controller 200, 201, 202, 203, 204, 205, 206, 207, or 208 is operated in the first reduction mode l1. In the first reduction mode l1, the controller 200, 201, 202, 203, 204, 205, 206, 207, or 208 fixes the operating frequency f_c to the second reference frequency f2, and varies the operating duty cycle d_c. In the first reduction mode l1, the controller 200, 201, 202, 203, 204, 205, 206, 207, or 208 varies the operating duty cycle d_c in the range of the ping duty cycle d_p to the first duty cycle d1.

Figure 33:
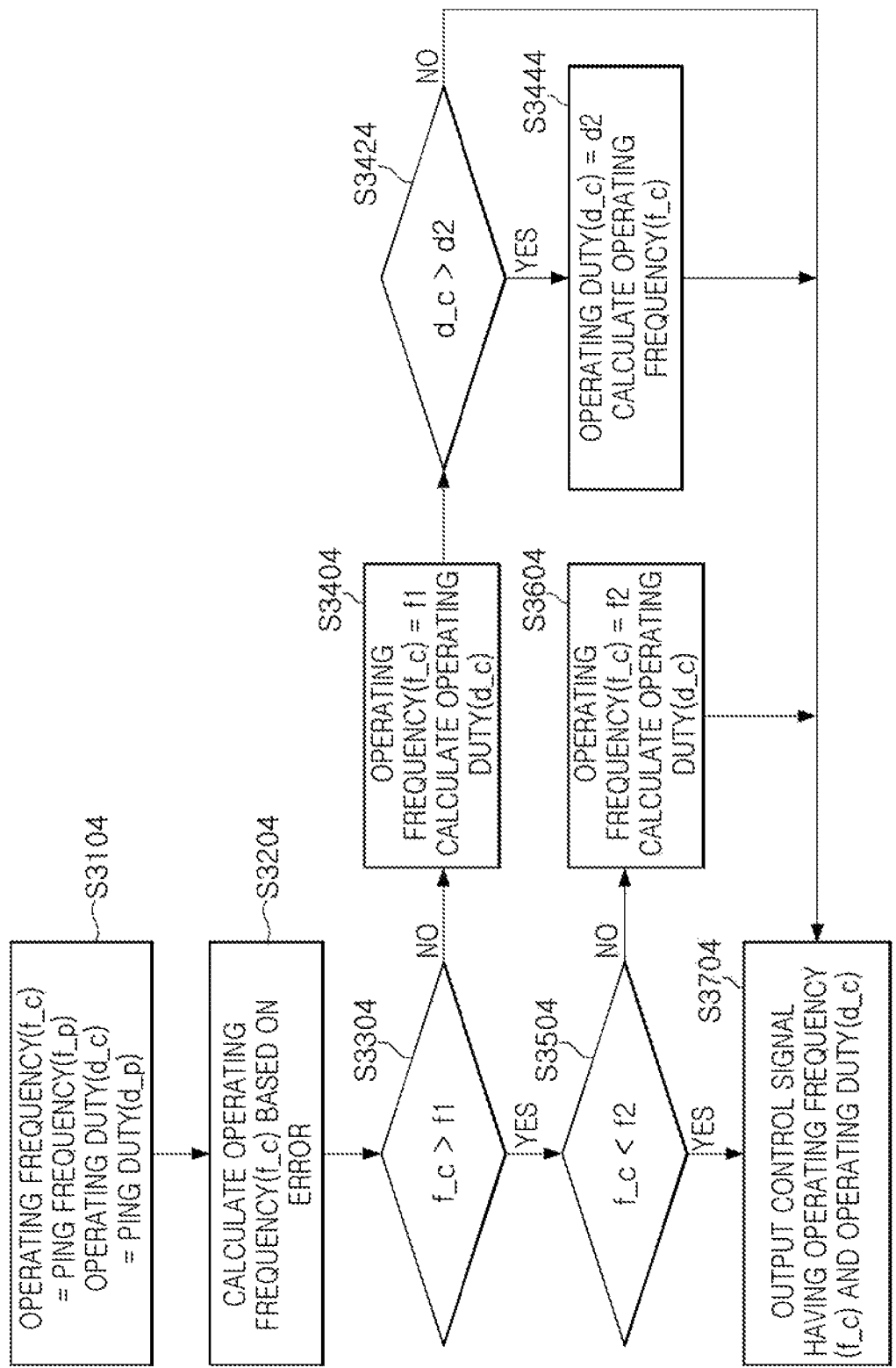

FIG. 33 is a flowchart illustrating an operation of the wireless power transmitter 1, 1-2, 1-3, 1-4, 1-5, 1-6, 1-7, or 1-8 and the wireless power transmission method in a power transmission mode, according to an embodiment.

Referring to FIG. 33, first, the controller 200, 201, 202, 203, 204, 205, 206, 207, or 208 sets the operating frequency f_c to the ping frequency f_p, and sets the operating duty cycle d_c to the ping duty cycle d_p in operation S3104. Operation S3104 may be performed in the detection mode.

Next, in operation S3204, the controller 200, 201, 202, 203, 204, 205, 206, 207, or 208 calculates the operating frequency f_c based on the error information received from the wireless power receiver 2. In this example, the operating duty cycle d_c is fixed to the ping duty cycle d_p. The error information is information regarding a difference between the amount of power needed by the wireless power receiver 2 and the amount of power received by the wireless power receiver 2.

In operation S3304, the controller 200, 201, 202, 203, 204, 205, 206, 207, or 208 determines whether the calculated operating frequency f_c is greater than the first reference frequency f1.

If it is determined in operation S3304 that the operating frequency f_c is less than or equal to the first reference frequency f1, in operation S3404, the controller 200, 201, 202, 203, 204, 205, 206, 207, or 208 sets the operating frequency f_c to the first reference frequency f1, and calculates the operating duty cycle d_c based on the error information.

In operation S3424, the controller 200, 201, 202, 203, 204, 205, 206, 207, or 208 determines whether the calculated operating duty cycle d_c is greater than the second reference duty cycle d2.

If it is determined in S3424 that the calculated operating duty cycle d_c is less than or equal to the second reference duty cycle d2, in operation S3704, the controller 200, 201, 202, 203, 204, 205, 206, 207, or 208 generates the control signals using the calculated operating frequency f_c and operating duty cycle d_c, and outputs the generated control signals.

Alternatively, if it is determined in operation S3424 that the calculated operating duty cycle d_c is greater than the second reference duty cycle d2, in operation S3444, the controller 200, 201, 202, 203, 204, 205, 206, 207, or 208 fixes the operating duty cycle d_c to the second duty cycle, and again calculates the operating frequency f_c based on the error information.

After performing operation S3444, in operation S3704, the controller 200, 201, 202, 203, 204, 205, 206, 207, or 208 generates the control signals using the calculated operating frequency f_c and operating duty cycle d_c, and outputs the generated control signals.

If it is determined in operation S3304 that the calculated operating frequency f_c is greater than the first reference frequency f1, in operation S3504, the controller 200, 201, 202, 203, 204, 205, 206, 207, or 208 determines whether the calculated operating frequency f_c is less than the second reference frequency f2.

If it is determined in operation S3504 that the calculated operating frequency f_c is less than the second reference frequency f2, that is, the operating frequency f_c calculated in operation S3204 is a value between the first reference frequency f1 and the second reference frequency f2, in operation S3704, the controller 200, 201, 202, 203, 204, 205, 206, 207, or 208 generates the control signals using the calculated operating frequency f_c and operating duty cycle d_c, and outputs the generated control signals.

If it is determined in operation S3504 that the operating frequency f_c is greater than or equal to the second reference frequency f2, in operation S3604, the controller 200, 201, 202, 203, 204, 205, 206, 207, or 208 sets the operating frequency f_c to the second reference frequency f2, and calculates the operating duty cycle d_c based on the error information error.

After performing S3604, in operation S3704, the controller 200, 201, 202, 203, 204, 205, 206, 207, or 208 generates the control signals using the calculated operating frequency f_c and operating duty cycle d_c, and outputs the generated control signals.

Figure 34:
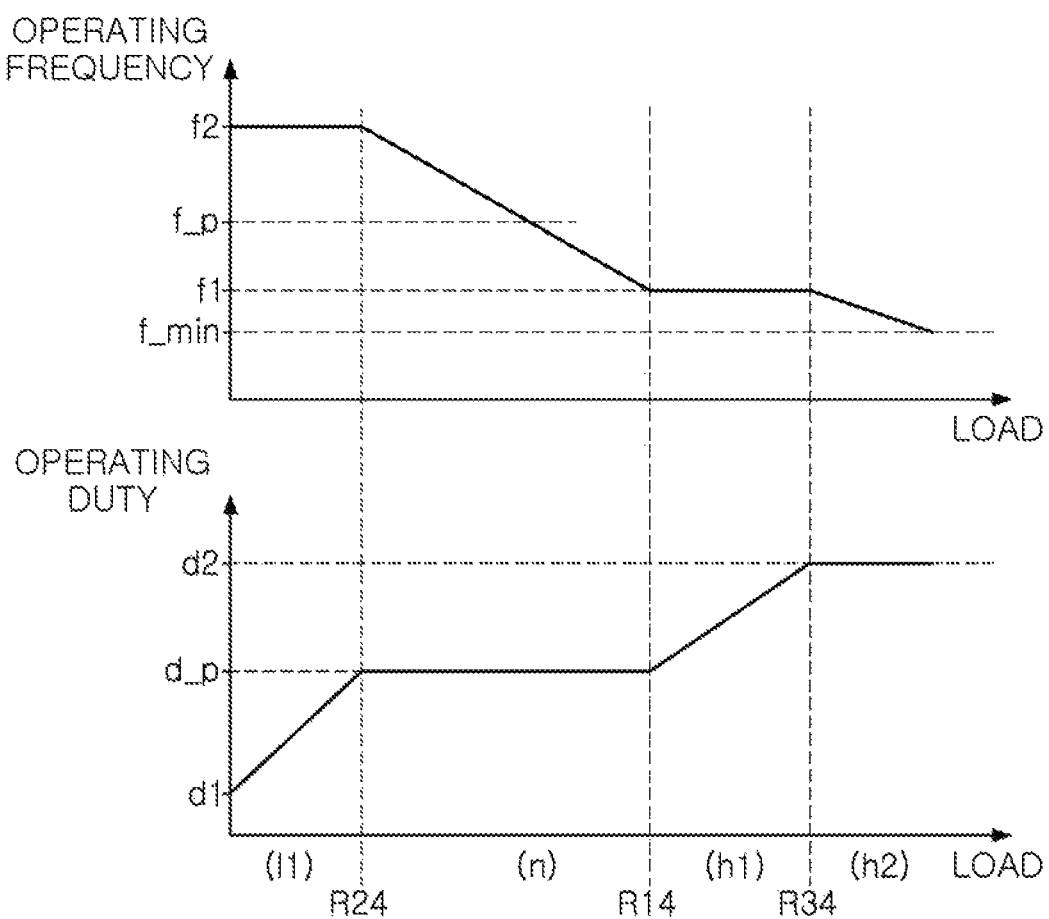

FIG. 34 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In the normal mode n, in response to the error information received from the wireless power receiver 2, the controller 200, 201, 202, 203, 204, 205, 206, 207, or 208 adjusts the amount of power received by the wireless power receiver 2 by varying the operating frequency f_c. In this example, the operating duty cycle d_c is fixed to the ping duty cycle d_p. In the normal mode n, the operating frequency f_c varies within the range of the first reference frequency f1 to the second reference frequency f2.

In response to the amount of power received by the wireless power receiver 2 being less than the amount of power required by the wireless power receiver 2, even in the example in which the operating frequency f_c is decreased up to the first reference frequency f1, the operation mode of the controller 200, 201, 202, 203, 204, 205, 206, 207, or 208 changes to the first boost mode h1, and the controller 200, 201, 202, 203, 204, 205, 206, 207, or 208 adjusts the operating duty cycle d_c after fixing the operating frequency f_c to the first reference frequency f1. In the first boost mode h1, the operating duty cycle d_c varies within the range of the ping duty cycle d_p to the second reference duty cycle d2.

When the amount of power received by the wireless power receiver 2 is less than the amount of power required by the wireless power receiver 2, even in the case in which the operating duty cycle d_c increases to the second reference duty cycle d2 in the first boost mode h1, the operation mode of the controller 200, 201, 202, 203, 204, 205, 206, 207, or 208 changes to a second boost mode h2, and the controller 200, 201, 202, 203, 204, 205, 206, 207, or 208 adjusts the amount of power received at the wireless power receiver 2 by varying the operating frequency f_c. In the second boost mode h2, the operating duty cycle d_c may be fixed to the second reference duty cycle d2. In the second boost mode h2, the operating frequency f_c varies within the range of the first reference frequency f1 to a minimum frequency f_min.

In the normal mode, when the amount of power received by the wireless power receiver 2 is greater than the amount of power needed by the wireless power receiver 2, even in the example in which the operating frequency f_c increases to the second reference frequency f2, the operation mode of the controller 200, 201, 202, 203, 204, 205, 206, 207, or 208 changes to the first reduction mode l1, and the controller 200, 201, 202, 203, 204, 205, 206, 207, or 208 adjusts the operating duty cycle d_c after fixing the operating frequency f_c to the second reference frequency f2. In the first reduction mode l1, the operating duty cycle d_c may be varied within the range of the first reference duty cycle d1 to the ping duty cycle d_p.

An operation of FIG. 34 will be described below with reference to the amount of power required by the wireless power receiver 2, that is, a load amount.

If the load amount is less than a first reference load amount R14 and is greater than a second reference load amount R24, the controller 200, 201, 202, 203, 204, 205, 206, 207, or 208 operates in the normal mode. If the load amount is greater than the first reference amount R14 and is less than a third reference load amount R34, the controller 200, 201, 202, 203, 204, 205, 206, 207, or 208 operates in the first boost mode h1. If the load amount is less than the second reference amount R24, the controller 200, 201, 202, 203, 204, 205, 206, 207, or 208 operates in the first reduction mode l1. The operations in the first reduction mode l1, the normal mode n, and the first boost mode h1 are the same as those described with respect to FIG. 32.

If the load amount is greater than the third reference load amount R34, the controller 200, 201, 202, 203, 204, 205, 206, 207, or 208 is operated in the second boost mode h2. In the second boost mode h2, the controller 200, 201, 202, 203, 204, 205, 206, 207, or 208 fixes the operating duty cycle d_c to the second reference duty cycle d2, and varies the operating frequency f_c. In the second boost mode h2, the operating frequency f_c is varied within the range of the first reference frequency f1 to the minimum frequency f_min.

Figure 35:
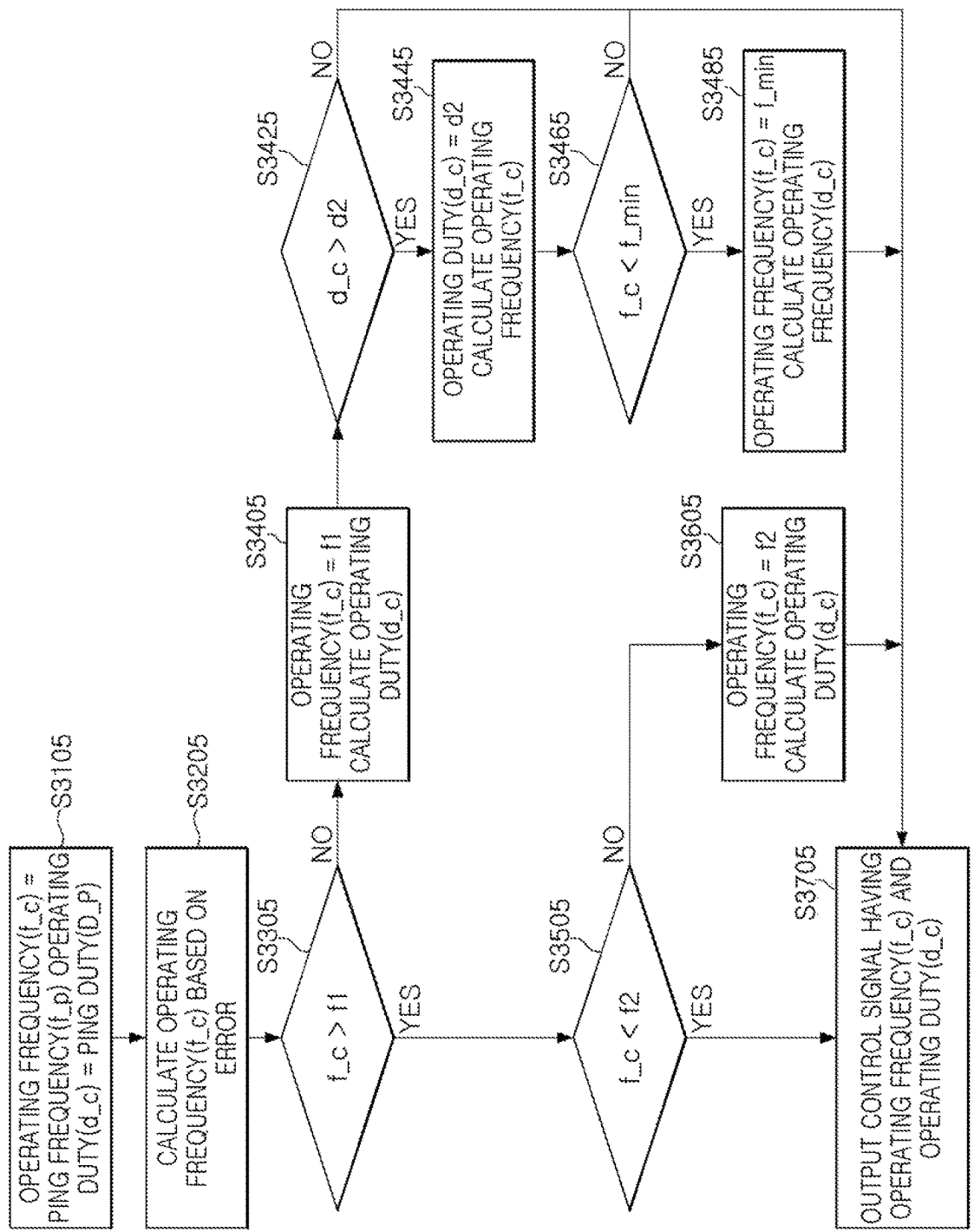

FIG. 35 is a flowchart illustrating an operation of the wireless power transmitter 1, 1-2, 1-3, 1-4, 1-5, 1-6, 1-7, or 1-8 and the wireless power transmission method in a power transmission mode, according to an embodiment.

Operations S3105, S3205, S3305, S3405, S3425, S3445, S3505, S3605, and S3705 are the same as operations S3104, S3204, S3304, S3404, S3424, S3444, S3504, S3604, and S3704 described in FIG. 33, respectively.

After the operating frequency f_c is calculated in operation S3445, in operation S3465, the controller 200, 201, 202, 203, 204, 205, 206, 207, or 208 determines whether the operating frequency f_c is less than the minimum frequency f_min.

If it is determined in operation S3465 that the operating frequency f_c calculated in operation S3445 is greater than or equal to the minimum frequency f_min, in operation S3705, the controller 200, 201, 202, 203, 204, 205, 206, 207, or 208 generates the control signals using the calculated operating frequency f_c and operating duty cycle d_c, and outputs the generated control signals.

Alternatively, if it is determined in operation S3465 that the operating frequency f_c calculated in operation S3445 is less than the minimum frequency f_min, in operation S3485, the controller 200, 201, 202, 203, 204, 205, 206, 207, or 208 sets the operating frequency to the minimum frequency f_min, and calculates the operating duty cycle d_c based on the error information error. In operation S3485, the operating duty cycle d_c is greater than the second reference duty cycle d2. For example, the operating duty cycle d_c has a value of 50% or more.

After performing operation S3485, in operation S3705, the controller 200, 201, 202, 203, 204, 205, 206, 207, or 208 generates the control signals using the calculated operating frequency f_c and operating duty cycle d_c, and outputs the generated control signals.

Figure 36:
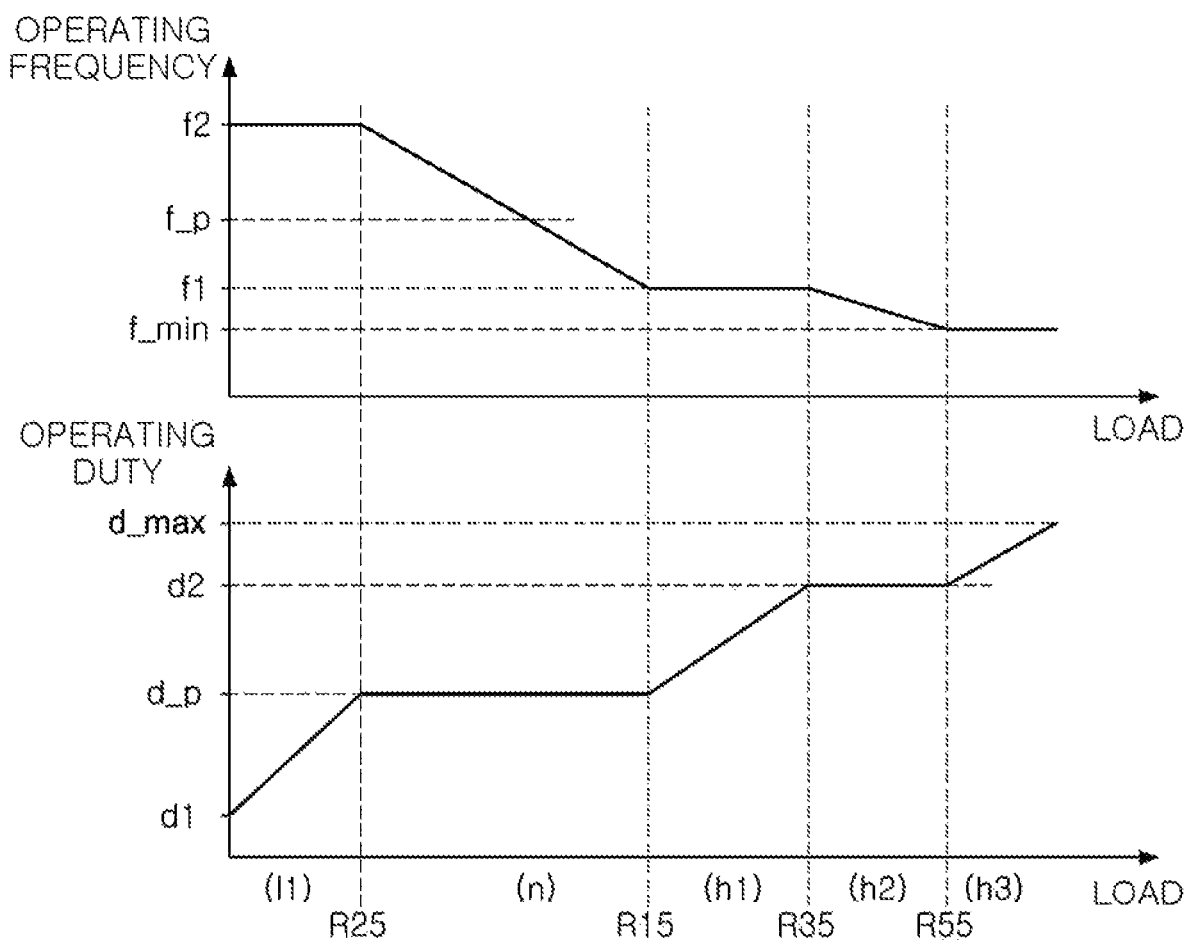

FIG. 36 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 36, the operations in the first reduction mode l1, the normal mode n, the first boost mode h1, and the second boost mode h2 are the same as those described in FIG. 34.

Referring to FIG. 36, in the second boost mode h2, when the amount of power received by the wireless power receiver 2 is less than the amount of power needed by the wireless power receiver 2, even in the example in which the operating frequency decreased to the minimum frequency f_min, the operation mode of the controller 200, 201, 202, 203, 204, 205, 206, 207, or 208 changes a third boost mode h3. In the third boost mode h3, the controller 200, 201, 202, 203, 204, 205, 206, 207, or 208 fixes the operating frequency f_c to the minimum frequency f_min, and increases the operating duty cycle d_c. In the third boost mode h3, the operating duty cycle d_c has a value of the second reference duty cycle d2 or more. For example, in the third boost mode h3, the operating duty cycle d_c is adjusted between the range of the second reference duty cycle d2 or more to the maximum duty cycle d_max or less. The second reference duty cycle d2 and the maximum duty cycle d_max may be set by a user in consideration of limitations according to standards and other protocols, or an environment in which the wireless power transmitter 1, 1-2, 1-3, 1-4, 1-5, 1-6, 1-7, or 1-8 is used.

That is, if the load amount is greater than a fifth reference load amount R55, the controller 200, 201, 202, 203, 204, 205, 206, 207, or 208 is operated in the third boost mode h3.

Figure 37:
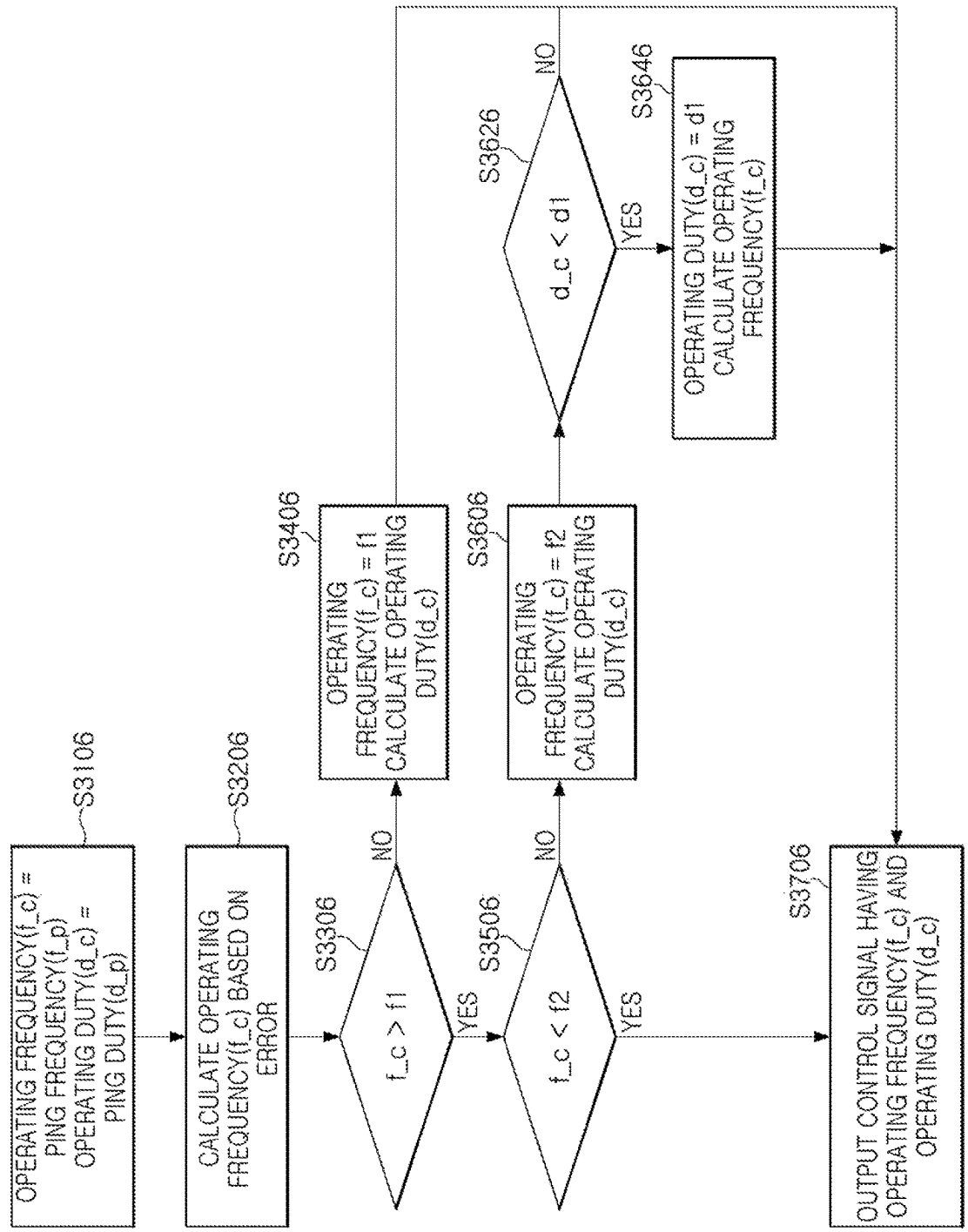

FIG. 37 is a flowchart illustrating an operation of the wireless power transmitter 1, 1-2, 1-3, 1-4, 1-5, 1-6, 1-7, or 1-8 and the wireless power transmission method in a power transmission mode, according to an embodiment.

In FIG. 37, operations S3106, S3206, S3306, S3406, S3506, S3606, and S3706 are the same as operations S3103, S3203, S3303, S3403, S3503, S3603, and S3703 described in FIG. 28, respectively.

After the operating duty cycle d_c is calculated in operation S3606, in operation S3626, the controller 200, 201, 202, 203, 204, 205, 206, 207, or 208 determines whether the calculated operating duty cycle d_c is less than the first reference duty cycle d1.

If it is determined in operation S3626 that the operating duty cycle d_c is greater than or equal to the first reference duty cycle d1, in operation S3706, the controller 200, 201, 202, 203, 204, 205, 206, 207, or 208 generates the control signals using the operating frequency f_c and the operating duty cycle d_c calculated in operation S3606, and outputs the generated control signals.

Alternatively, if it is determined in operation S3626 that the operating duty cycle d_c is less than the first reference duty cycle d1, in operation S3646, the controller 200, 201, 202, 203, 204, 205, 206, 207, or 208 fixes the operating duty cycle d_c to the first reference duty cycle d1, and calculates the operating frequency f_c based on the error information error.

After performing operation S3646, in operation S3706, the controller 200, 201, 202, 203, 204, 205, 206, 207, or 208 generates the control signals using the calculated operating frequency f_c and operating duty cycle d_c, and outputs the generated control signals.

Figure 38:
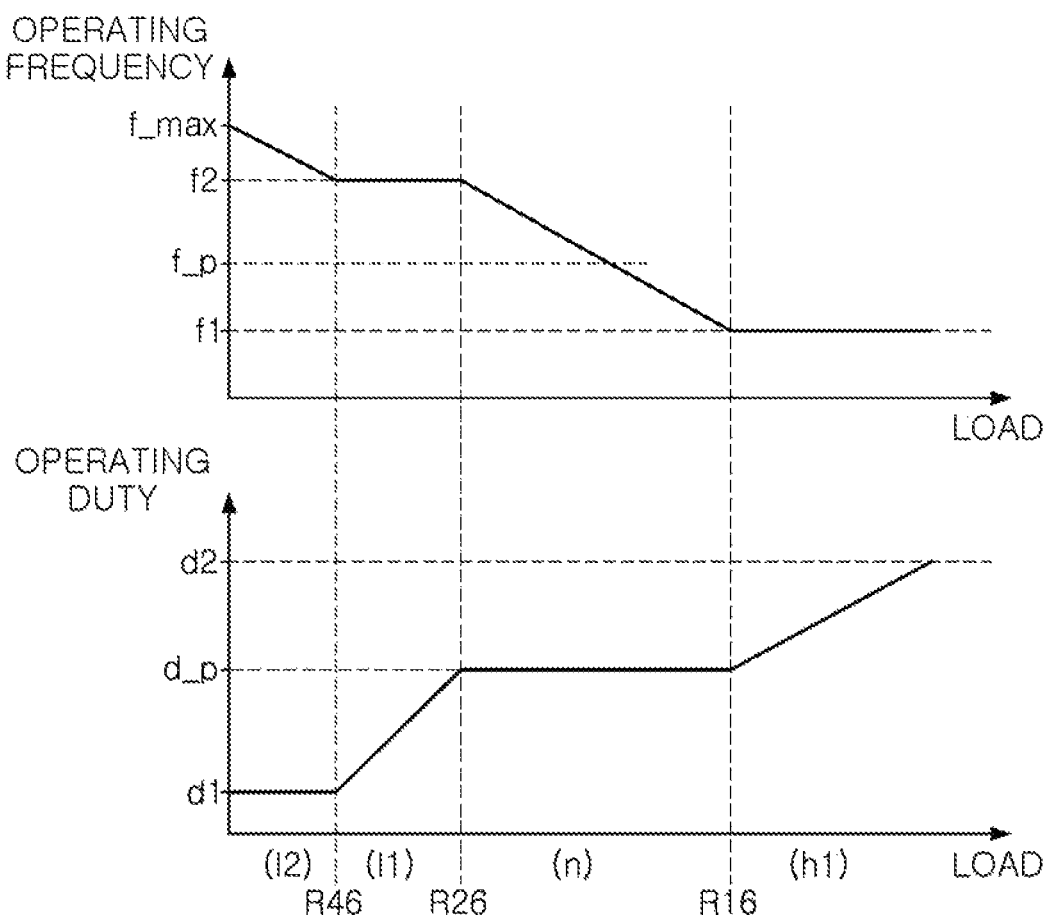

FIG. 38 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 38, the operations in the first reduction mode l1, the normal mode n, and the first boost mode h1 are the same as those described in FIG. 32.

In the first reduction mode l1, in response to the amount of power received by the wireless power receiver 2 being greater than the amount of power required by the wireless power receiver 2, even in the example in which the operating duty cycle d_c is decreased up to the first reference duty cycle d1, the operation mode of the controller 200, 201, 202, 203, 204, 205, 206, 207, or 208 changes to a second reduction mode l2. In the second reduction mode l2, the controller 200, 201, 202, 203, 204, 205, 206, 207, or 208 fixes the operating duty cycle d_c to the first reference duty cycle d1, and varies the operating frequency f_c. In the second reduction mode l2, the operating frequency f_c varies within the range of the second reference frequency f2 to the maximum frequency f_max.

That is, in response to the load amount being greater than a fourth reference load amount R46, the controller 200, 201, 202, 203, 204, 205, 206, 207, or 208 is operated in the second reduction mode l2.

Figure 39:
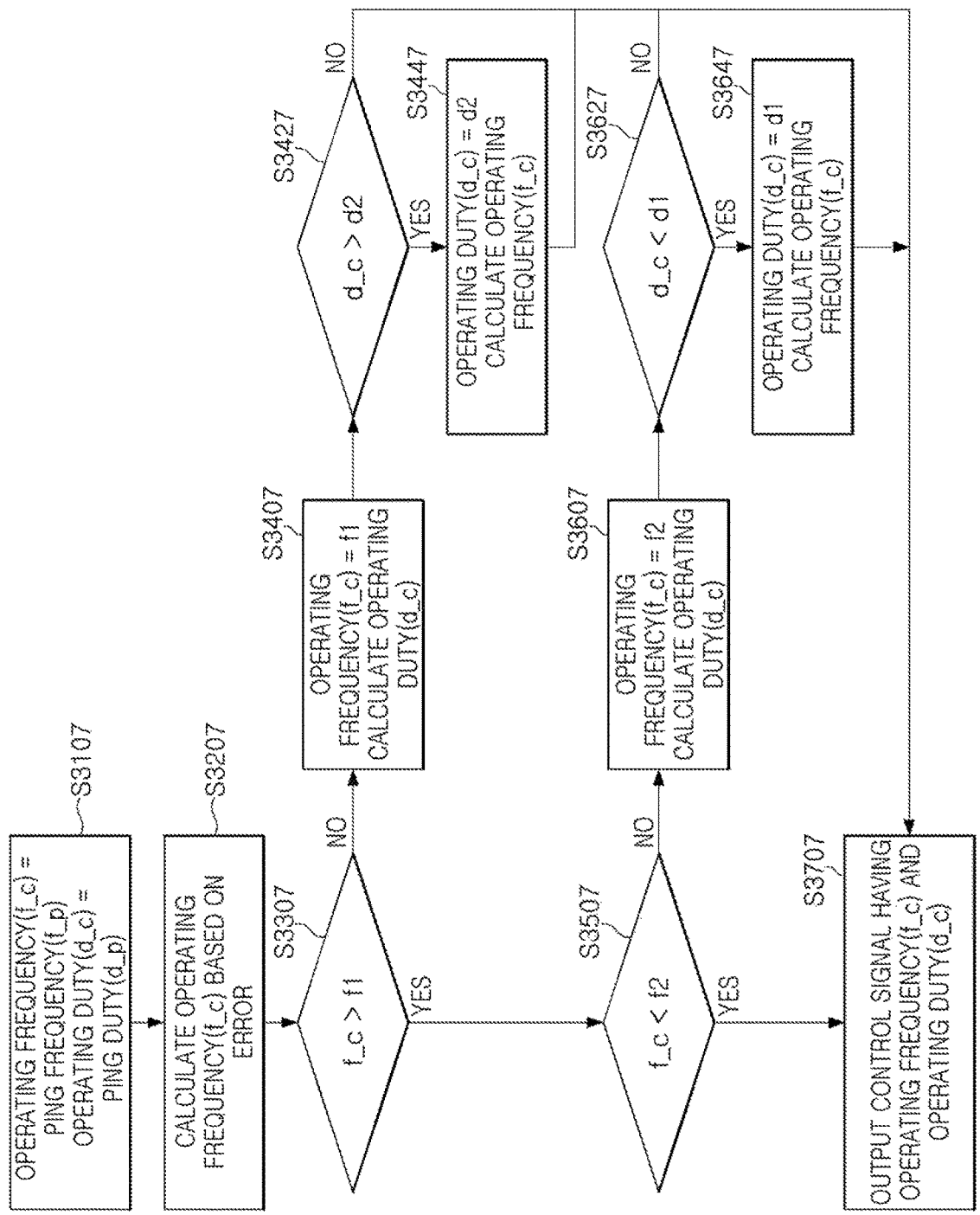

FIG. 39 is a flowchart illustrating an operation of the wireless power transmitter 1, 1-2, 1-3, 1-4, 1-5, 1-6, 1-7, or 1-8 and the wireless power transmission method in a power transmission mode, according to an embodiment.

In FIG. 39, operations S3107, S3207, S3307, S3407, S3507, S3607, and S3707 are the same as operations S3103, S3203, S3303, S3403, S3503, S3603, and S3703 described in FIG. 31, respectively.

Referring to FIG. 39, after the operating duty cycle d_c is calculated in operation S3407, in operation S3427, the controller 200, 201, 202, 203, 204, 205, 206, 207, or 208 determines whether or not the calculated operating duty cycle d_c is greater than the second reference duty cycle d2.

If it is determined in operation S3427 that the calculated operating duty cycle d_c is less than or equal to the second reference duty cycle d2, in operation S3707, the controller 200, 201, 202, 203, 204, 205, 206, 207, or 208 generates the control signals using the operating frequency f_c and the operating duty cycle d_c, which are calculated in operation S3407, and outputs the generated control signals.

Alternatively, if it is determined in operation S3427 that the calculated operating duty cycle d_c is greater than the second reference duty cycle d2, in operation S3447, the controller 200, 201, 202, 203, 204, 205, 206, 207, or 208 fixes the operating duty cycle d_c to the second duty cycle, and once again calculates the operating frequency f_c based on the error information.

After performing operation S3447, in operation S3707, the controller 200, 201, 202, 203, 204, 205, 206, 207, or 208 generates the control signals using the calculated operating frequency f_c and operating duty cycle d_c, and outputs the generated control signals.

After the operating duty cycle d_c is calculated in operation S3607, in operation S3627, the controller 200, 201, 202, 203, 204, 205, 206, 207, or 208 determines whether the calculated operating duty cycle d_c is less than the first reference duty cycle d1.

If it is determined in operation S3627 that the operating duty cycle d_c is greater than or equal to the first reference duty cycle d1, in operation S3707, the controller 200, 201, 202, 203, 204, 205, 206, 207, or 208 generates the control signals using the operating frequency f_c and the operating duty cycle d_c, which are calculated in operation S3607, and outputs the generated control signals.

Alternatively, if it is determined in operation S3627 that the operating duty cycle d_c is less than the first reference duty cycle d1, in operation S3647, the controller 200, 201, 202, 203, 204, 205, 206, 207, or 208 fixes the operating duty cycle d_c to the first reference duty cycle d1, and calculates the operating frequency f_c based on the error information error.

After performing operation S3647, in operation S3707, the controller 200, 201, 202, 203, 204, 205, 206, 207, or 208 generates the control signals using the calculated operating frequency f_c and operating duty cycle d_c, and outputs the generated control signals.

Figure 40:
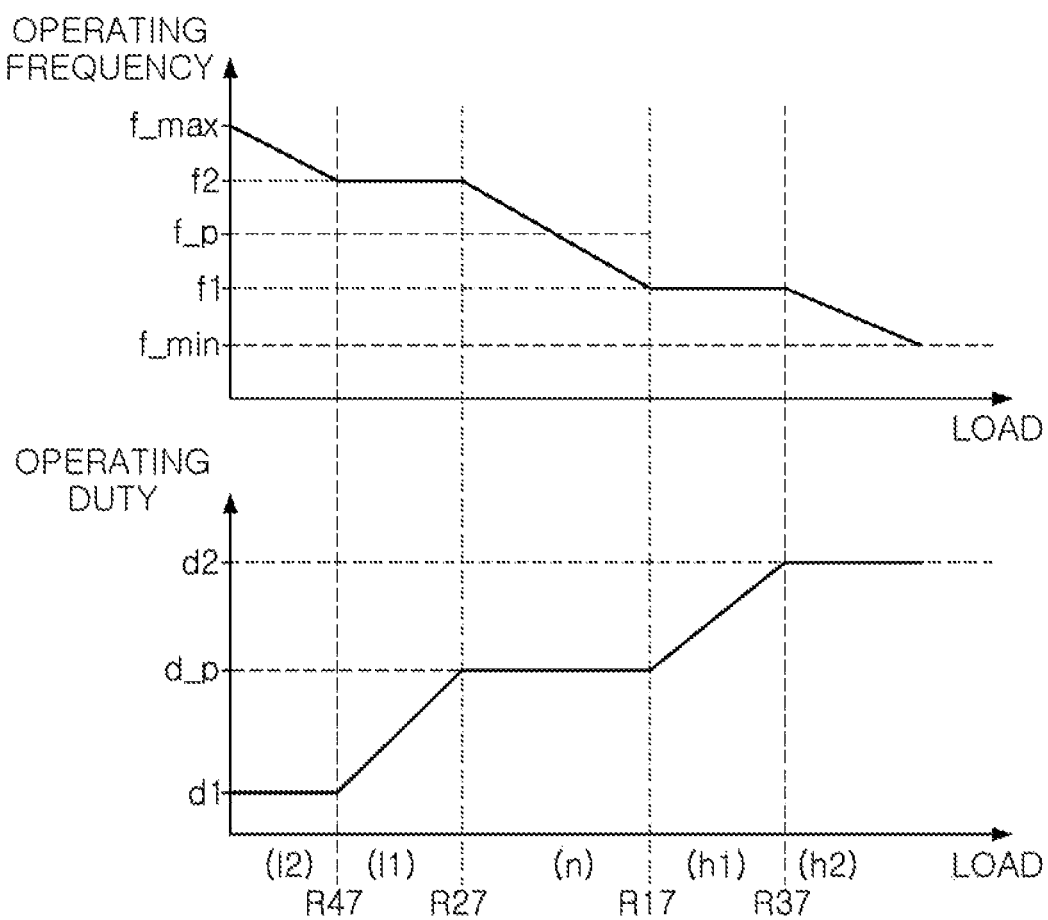

FIG. 40 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 40, the operations in the first reduction mode l1, the normal mode n, and the first boost mode h1 are the same as those described in FIG. 32.

Referring to FIG. 40, in the first reduction mode l1, in response to the amount of power received by the wireless power receiver 2 being greater than the amount of power required by the wireless power receiver 2, even in the example in which the operating duty cycle d_c decreases to the first reference duty cycle d1, the operation mode of the controller 200, 201, 202, 203, 204, 205, 206, 207, or 208 changes to a second reduction mode l2. In the second reduction mode l2, the controller 200, 201, 202, 203, 204, 205, 206, 207, or 208 fixes the operating duty cycle d_c to the first reference duty cycle d1, and varies the operating frequency f_c. In the second reduction mode l2, the operating frequency f_c varies within the range of the second reference frequency f2 to the maximum frequency f_max.

That is, if the load amount is greater than a fourth reference load amount R47, the controller 200, 201, 202, 203, 204, 205, 206, 207, or 208 is operated in the second reduction mode l2.

When the amount of power received by the wireless power receiver 2 is less than the amount of power needed by the wireless power receiver 2, even in the example in which the operating duty cycle d_c increases to the second reference duty cycle d2 in the first boost mode h1, the operation mode of the controller 200, 201, 202, 203, 204, 205, 206, 207, or 208 changes to a second boost mode h2, and the controller 200, 201, 202, 203, 204, 205, 206, 207, or 208 adjusts the amount of power received by the wireless power receiver 2 by varying the operating frequency f_c. In the second boost mode h2, the operating duty cycle d_c is fixed to the second reference duty cycle d2. In the second boost mode h2, the operating frequency f_c varies within the range of the first reference frequency f1 to a minimum frequency f_min.

That is, in response to the load amount being greater than a third reference load amount R37, the controller 200, 201, 202, 203, 204, 205, 206, 207, or 208 is operated in the second boost mode h2.

Figure 41:
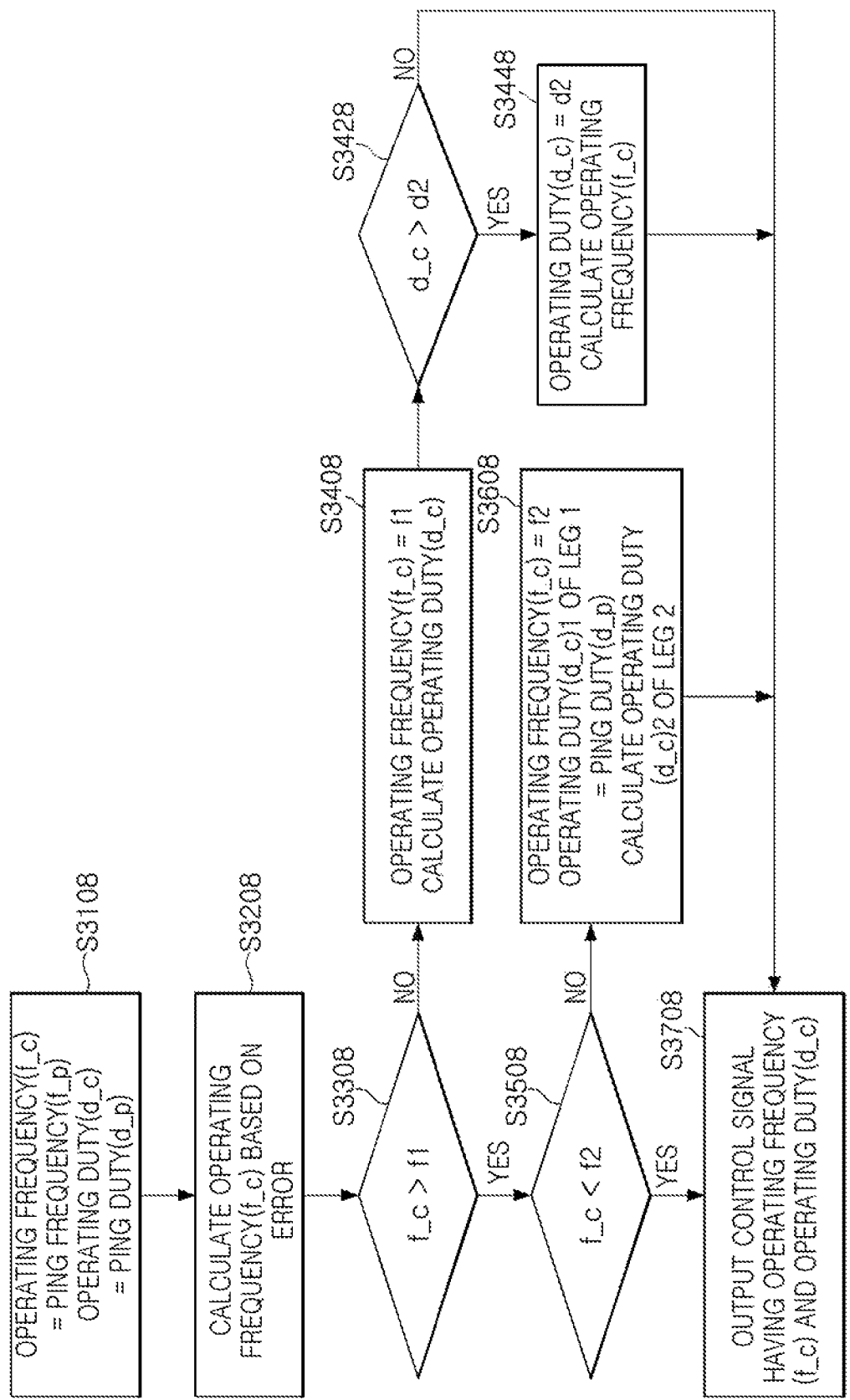

FIG. 41 is a flowchart illustrating an operation of the wireless power transmitter 1, 1-2, 1-3, 1-4, 1-5, 1-6, 1-7, or 1-8 and the wireless power transmission method in a power transmission mode, according to an embodiment.

In FIG. 41, operations S3108, S3208, S3308, S3408, S3428, S3448, S3508, and S3708 are the same as operations S3104, S3204, S3304, S3404, S3424, S3434, S3504, and S3704 described in FIG. 33, respectively.

In response to determining in operation S3508 that the operating frequency f_c calculated in operation S3208 is greater than the second reference frequency f2, in operation S3608, the controller 200, 201, 202, 203, 204, 205, 206, 207, or 208 sets the operating frequency f_c to the second reference frequency f2, fixes an operating duty cycle d_c1 of a first leg (i.e., an on-duty cycle of the second control signal con24, con25, and con28 (FIGS. 11, 12, and 15)) to the ping duty cycle d_p, and calculates an operating duty cycle d_c2 of a second leg (i.e., an on-duty cycle of the fourth control signal con44, con45, and con48 (FIGS. 11, 12, and 15)).

After performing operation S3608, in operation S3708, the controller 200, 201, 202, 203, 204, 205, 206, 207, or 208 generates the control signals using the calculated operating frequency f_c and operating duty cycle d_c1 and d_c2, and outputs the generated control signals.

Figure 42:
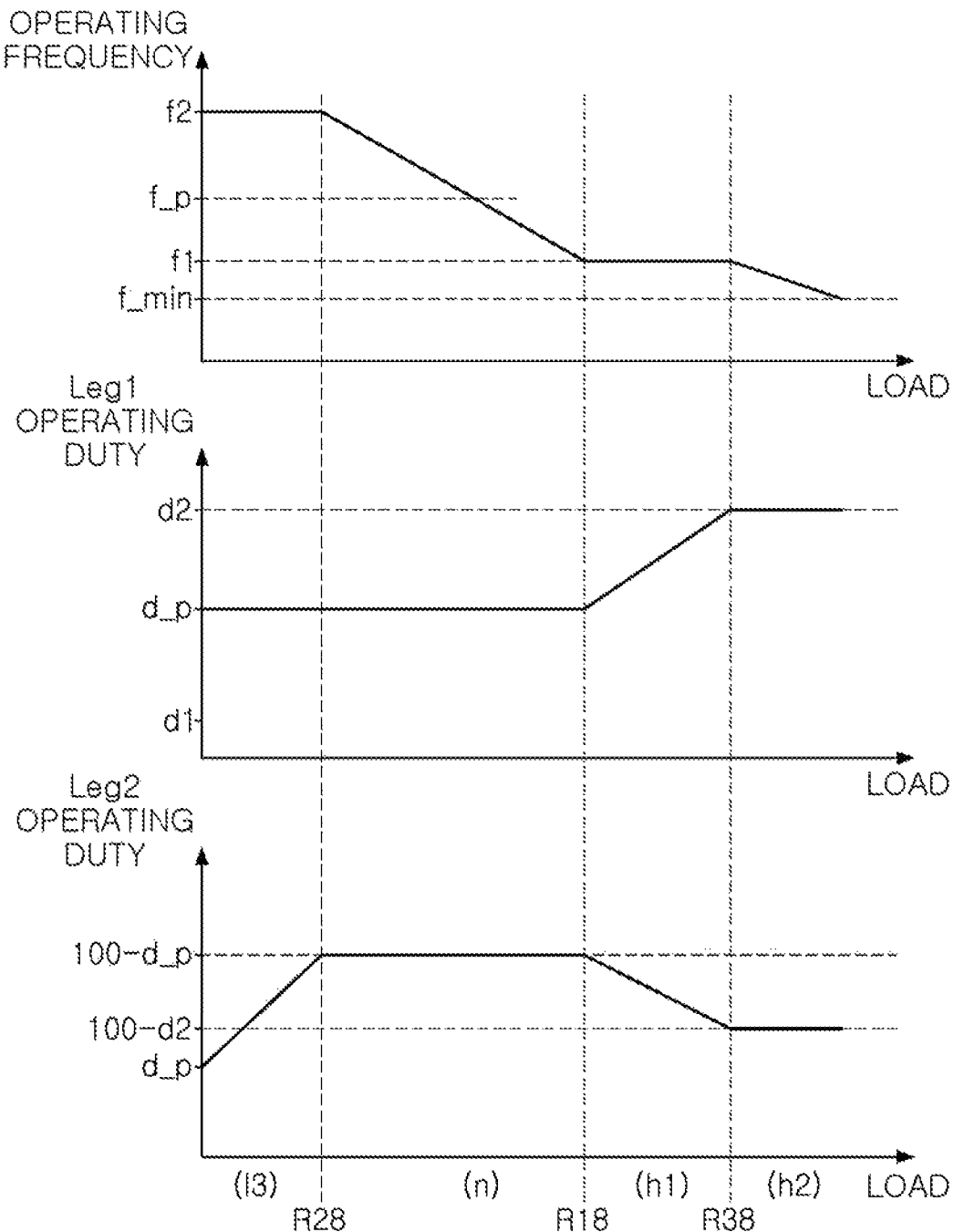

FIG. 42 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 42, the operations in the normal mode n, the first boost mode h1, and the second boost mode h2 are the same as those described in FIG. 31.

Referring to FIG. 42, in the normal mode n, when the amount of power received by the wireless power receiver 2 is greater than the amount of power required by the wireless power receiver 2, even in the example in which the operating frequency f_c is increased up to the second reference frequency f2, the operation mode of the controller 200, 201, 202, 203, 204, 205, 206, 207, or 208 is changed to a third reduction mode l3. In the third reduction mode l3, the controller 200, 201, 202, 203, 204, 205, 206, 207, or 208 fixes the operating frequency f_c to the second reference frequency f2, fixes the operating duty cycle d_c1 of the first leg (i.e., the on-duty cycle of the second control signals con24, con25, and con28 (FIGS. 11, 12, and 15)) to the ping duty cycle d_p, and adjusts the operating duty cycle d_c2 of the second leg (i.e., the on-duty cycle of the fourth control signal con44, con45, and con48 (FIGS. 11, 12, and 15)). In the third reduction mode l3, the operating duty cycle d_c2 of the second leg is varied within the range of the ping duty cycle d_p to (100−ping duty cycle d_p).

That is, in response to the load amount being less than a second reference load amount R28, the controller 200, 201, 202, 203, 204, 205, 206, 207, or 208 is operated in the third reduction mode l3.

Figure 43:
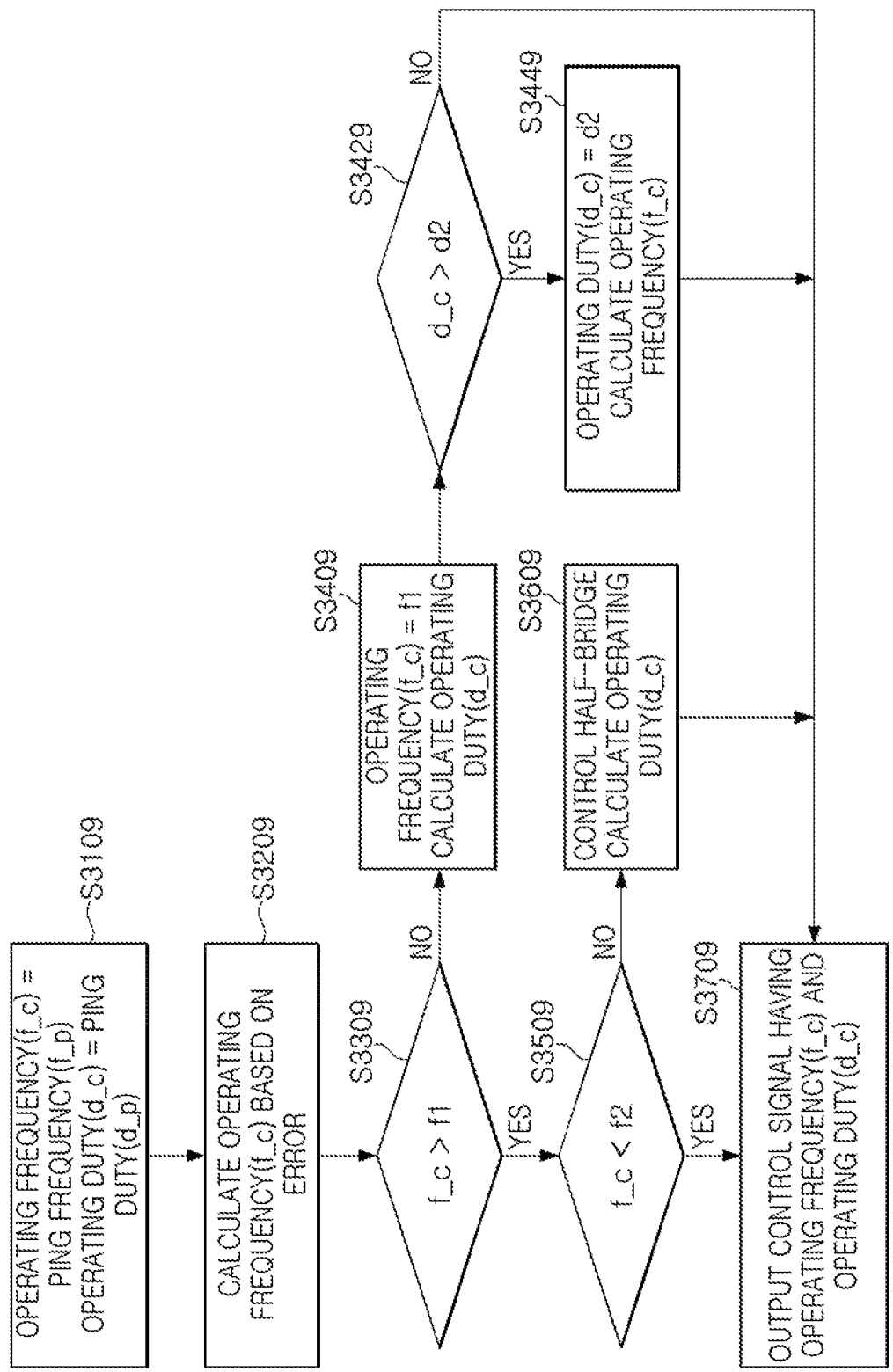

FIG. 43 is a flowchart illustrating an operation of the wireless power transmitter 1, 1-2, 1-3, 1-4, 1-5, 1-6, 1-7, or 1-8 and the wireless power transmission in a power transmission mode, according to an embodiment.

In FIG. 43, operations S3109, S3209, S3309, S3409, S3429, S3449, S3509, and S3709 are the same as operations S3104, S3204, S3304, S3404, S3424, S3434, S3504, and S3704 described in FIG. 33, respectively.

Referring to FIG. 43, in response to determining in operation S3509 that the operating frequency f_c calculated in operation S3209 is greater than the second reference frequency f2, in operation S3609, the controller 200, 201, 202, 203, 204, 205, 206, 207, or 208 sets the operating duty cycle d_c to an operating duty cycle at which the converter 111, 112, 113, 114, 115, 116, or 117 is operated as the half-bridge, and calculates the operating frequency f_c (operation S3449) based on the error information.

After performing operation S3609, in operation S3709, the controller 200, 201, 202, 203, 204, 205, 206, 207, or 208 generates the control signals using the calculated operating frequency f_c and operating duty cycle d_c, and outputs the generated control signals.

Figure 44:
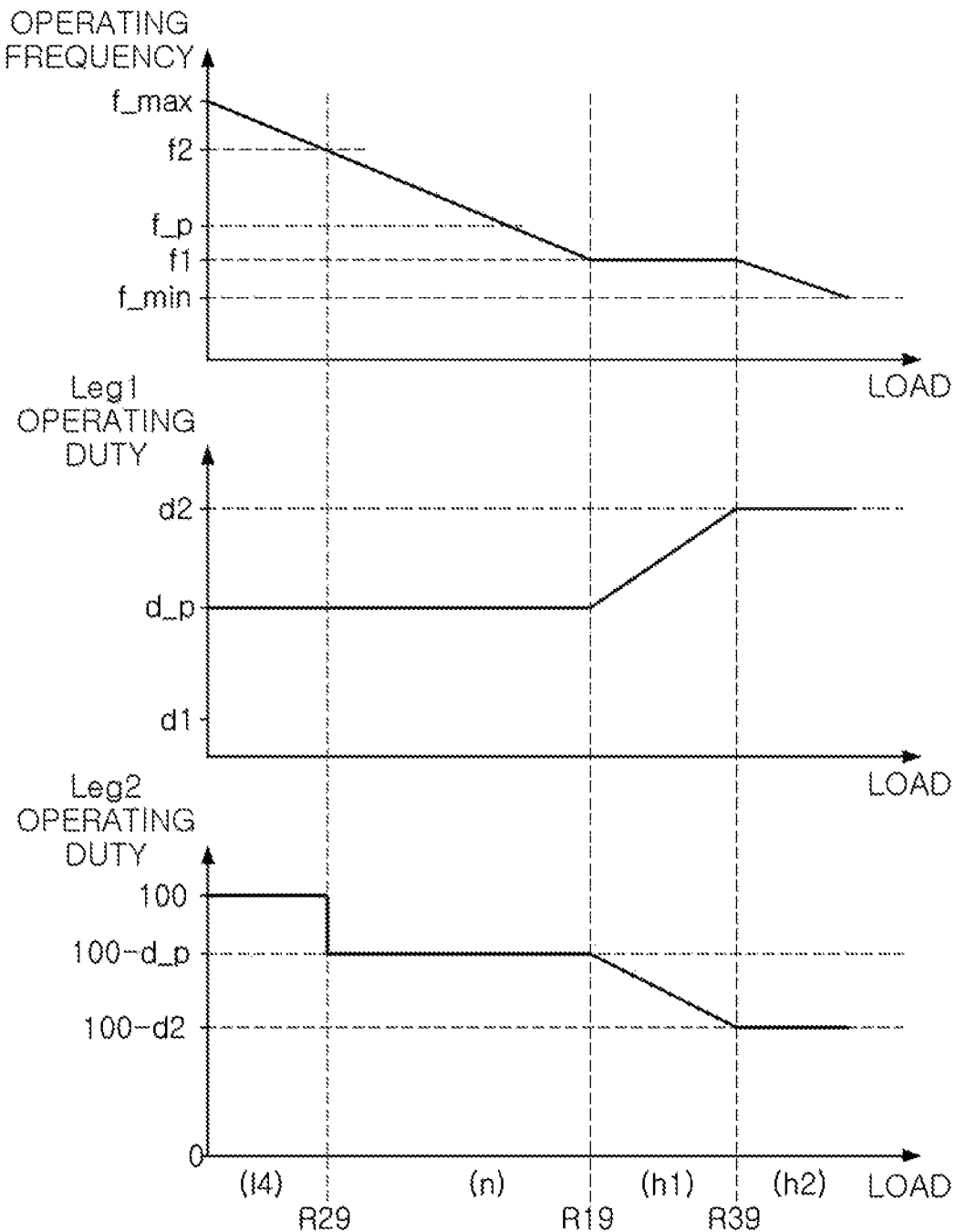

FIG. 44 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 44, the operations in the normal mode n, the first boost mode h1, and the second boost mode h2 are the same as those described in FIG. 34.

In the normal n, in response to the amount of power received by the wireless power receiver 2 being greater than the amount of power required by the wireless power receiver 2, even in the case in which the operating frequency f_c is increased up to the second reference frequency f2, the operation mode of the controller 200, 201, 202, 203, 204, 205, 206, 207, or 208 changes to a fourth reduction mode l4. In the fourth reduction mode l4, the controller 200, 201, 202, 203, 204, 205, 206, 207, or 208 fixes the operating duty cycle d_c1 of the first leg (i.e., the on-duty cycle of the second control signal con24, con25, and con28 (FIGS. 11, 12, and 15)) to the ping duty cycle d_p, fixes the operating duty cycle d_c2 of the second leg (i.e., the duty cycle of the fourth control signal con44, con45, and con48 (FIGS. 11, 12, and 15)) to 100%, and adjusts the operating frequency f_c. In the fourth reduction mode l4, the operating frequency f_c is varied within the range of the second reference frequency f2 to the maximum frequency f_max.

That is, in response to the load amount being less than a second reference load amount R29, the controller 200, 201, 202, 203, 204, 205, 206, 207, or 208 is operated in the fourth reduction mode l4.

Figure 45:
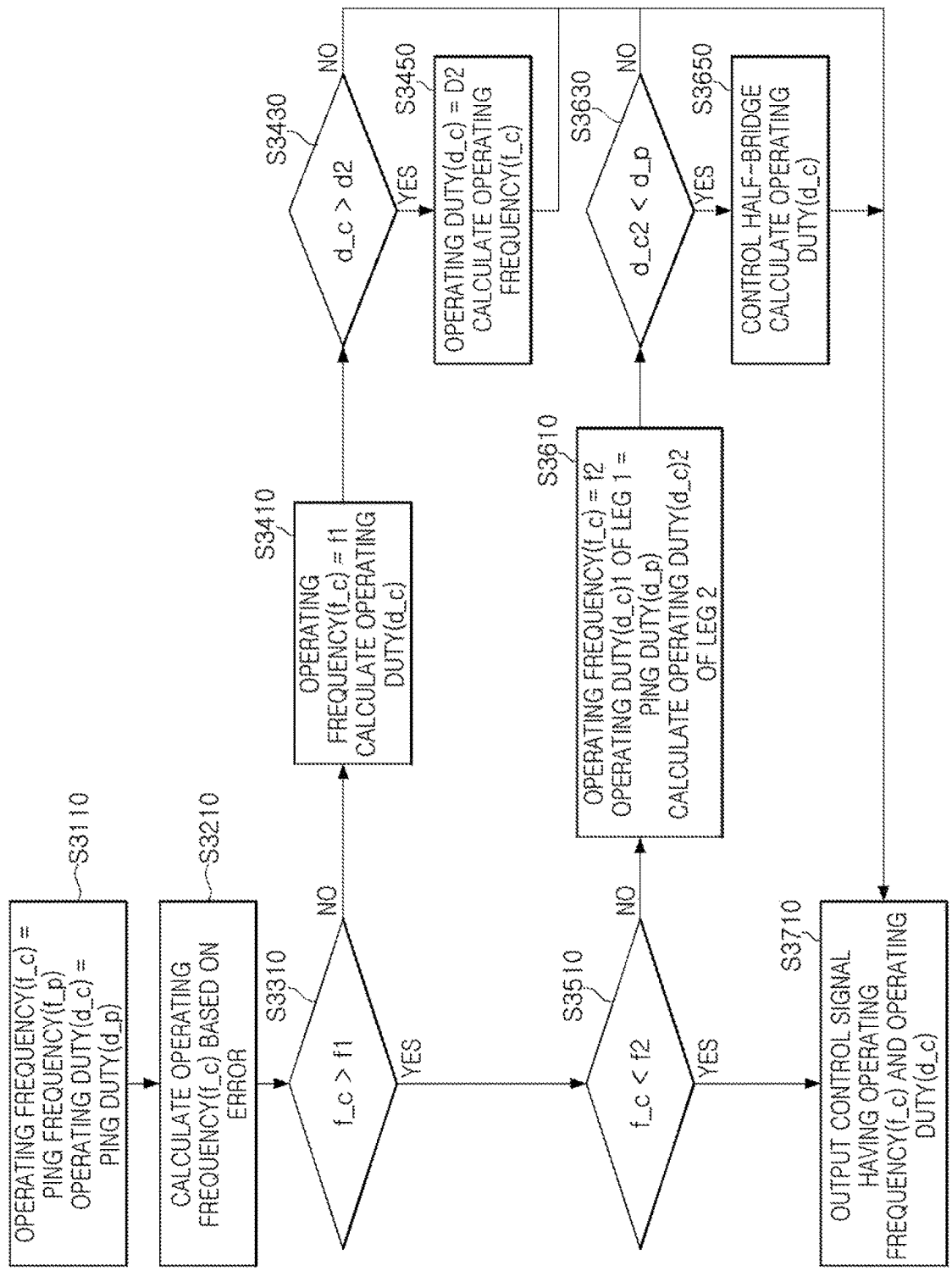

FIG. 45 is a flowchart illustrating an operation of the wireless power transmitter 1, 1-2, 1-3, 1-4, 1-5, 1-6, 1-7, or 1-8 and the wireless power transmission method, according to an embodiment.

In FIG. 45, operations S3110, S3210, S3310, S3410, S3430, S3450, S3510, and S3710 are the same as operations S3104, S3204, S3304, S3404, S3424, S3434, S3504, and S3704 described in FIG. 33, respectively.

Referring to FIG. 45, in response to determining in operation S3510 that the operating frequency f_c calculated in S3210 is greater than the second reference frequency f2, in operation S3610, the controller 200, 201, 202, 203, 204, 205, 206, 207, or 208 sets the operating frequency f_c to the second reference frequency f2, fixes the operating duty cycle d_c1 of the first leg (i.e., the duty cycle of the second control signal con24, con25, and con28 (FIGS. 11, 12, and 15)) to the ping duty cycle d_p, and calculates the operating duty cycle d_c2 of the second leg (i.e., the duty cycle of the fourth control signal con44, con45, and con48 (FIGS. 11, 12, and 15)).

After performing operation S3610, in operation S3630, the controller 200, 201, 202, 203, 204, 205, 206, 207, or 208 determines whether the calculated operating duty cycle d_c2 of the second leg is less than the ping duty cycle d_p.

If it is determined in operation S3630 that the operating duty cycle d_c2 of the second leg calculated in S3610 is greater than or equal to the ping duty cycle d_p, in operation S3710, the controller 200, 201, 202, 203, 204, 205, 206, 207, or 208 generates the control signals using the operating frequency f_c and the operating duty cycle d_c, which are calculated in operation S3610, and outputs the generated control signals.

Alternatively, in response to determining in operation S3630 that the operating duty cycle d_c2 of the second leg calculated in operation S3610 is less than the ping duty cycle d_p, in operation S3650, the controller 200, 201, 202, 203, 204, 205, 206, 207, or 208 sets the operating duty cycle d_c to an operating duty cycle at which the converter 111, 112, 113, 114, 115, 116, or 117 is operated as the half-bridge, and calculates the operating frequency f_c based on the error information. In operation S3650, the operating duty cycle d_c1 of the first leg is fixed to the ping duty cycle d_p, and the operating duty cycle d_c2 of the second leg is fixed to 100%.

After performing operation S3650, in operation S3710, the controller 200, 201, 202, 203, 204, 205, 206, 207, or 208 generates the control signals using the calculated operating frequency f_c and operating duty cycle d_c, and outputs the generated control signals.

Figure 46:
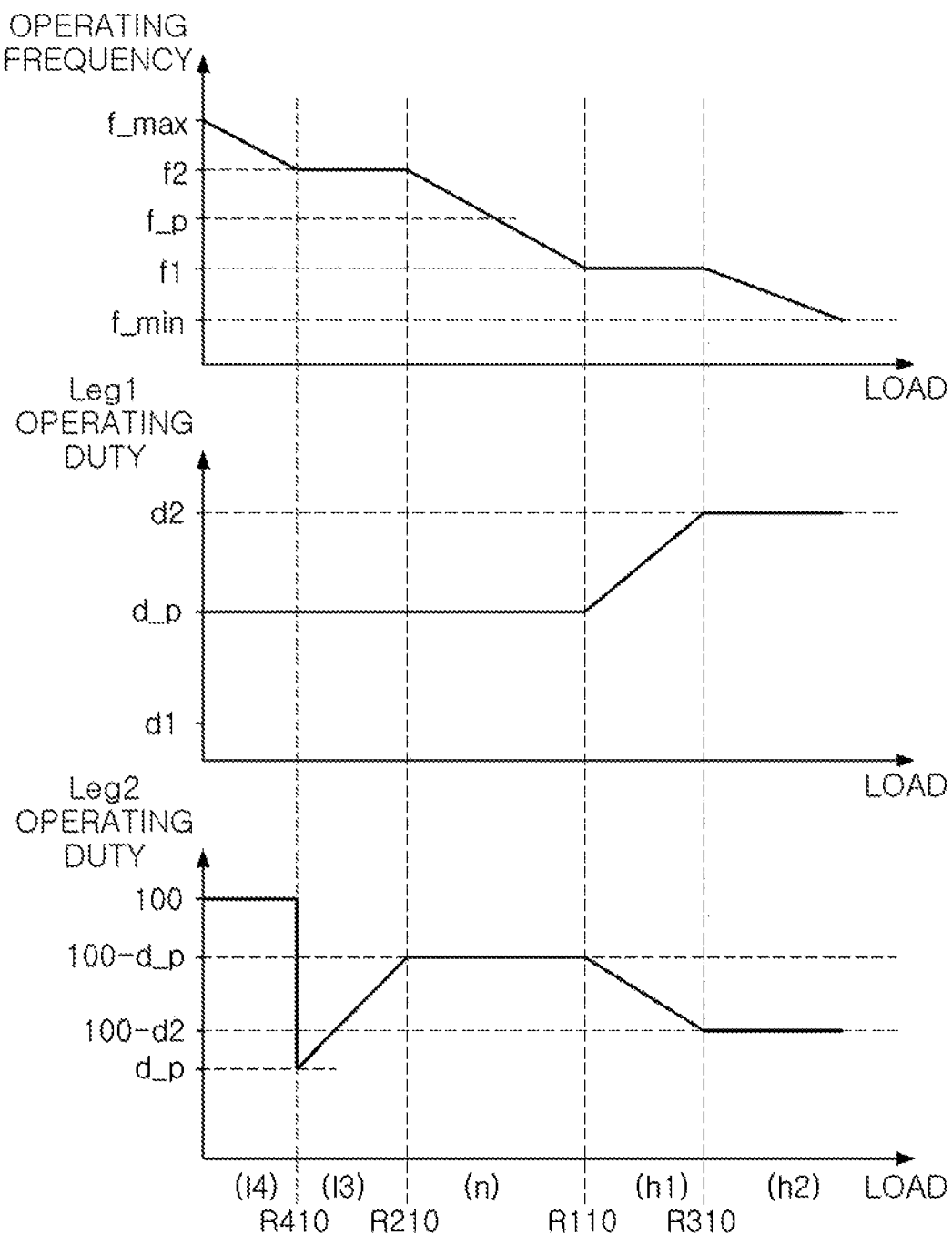

FIG. 46 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 46, the operations in the normal mode n, the first boost mode h1, and the second boost mode h2 are the same as those described in FIG. 34.

In the normal mode n, when the amount of power received by the wireless power receiver 2 is greater than the amount of power required by the wireless power receiver 2, even in an example in which the operating frequency f_c is increased up to the second reference frequency f2, the operation mode of the controller 200, 201, 202, 203, 204, 205, 206, 207, or 208 is changed to a third reduction mode l3. In the third reduction mode l3, the controller 200, 201, 202, 203, 204, 205, 206, 207, or 208 fixes the operating frequency f_c to the second reference frequency f2, fixes the operating duty cycle d_c1 of the first leg (i.e., the on-duty cycle of the second control signal con24, con25, and con28 (FIGS. 11, 12, and 15)) to the ping duty cycle d_p, and adjusts the operating duty cycle d_c2 of the second leg (i.e., the on-duty cycle of the fourth control signal con44, con45, and con48 (FIGS. 11, 12, and 15)). In the third reduction mode l3, the operating duty cycle d_c2 of the second leg is varied within the range of the ping duty cycle d_p to (100−ping duty cycle d_p).

In the third reduction mode l3, in response to the amount of power received by the wireless power receiver 2 being greater than the amount of power required by the wireless power receiver 2, even in an example in which the operating duty cycle d_c2 of the second leg is decreased up to the ping duty cycle d_p, the operation mode of the controller 200, 201, 202, 203, 204, 205, 206, 207, or 208 changes to the fourth reduction mode l4. In the fourth reduction mode l4, the controller 200, 201, 202, 203, 204, 205, 206, 207, or 208 fixes the operating duty cycle d_c1 of the first leg (i.e., the duty cycle of the second control signal con24, con25, and con28 (FIGS. 11, 12, and 15)) to the ping duty cycle d_p, fixes the operating duty cycle d_c2 of the second leg (i.e., the duty cycle of the fourth control signal con44, con45, and con48 (FIGS. 11, 12, and 15)) to 100%, and adjusts the operating frequency f_c. In the fourth reduction mode l4, the operating frequency f_c is varied within the range of the second reference frequency f2 to the maximum frequency f_max.

That is, in response to the load amount being less than a second reference load amount R210 and being greater than a fourth reference load amount R410, the controller 200, 201, 202, 203, 204, 205, 206, 207, or 208 operates in the third reduction mode l3. In response to the load amount being less than the fourth reference load amount R410, the controller 200, 201, 202, 203, 204, 205, 206, 207, or 208 operates in the fourth reduction mode l4.

The control methods illustrated in each of FIGS. 27 through 46 may be reconfigured or modified in various forms. For example, operations S3465 and S3485 of FIG. 35 or the operation of the third boost mode h3 of FIG. 36 may also be added to the control methods of each of FIGS. 27 through 46. Alternatively, the third reduction mode illustrated in FIGS. 42 and 46 and/or the fourth reduction mode illustrated in FIGS. 44 and 46 may also be performed instead of the first reduction mode and/or the second reduction mode, according to another embodiment. Alternatively, in each of FIGS. 27 through 46, the operations and the operation modes may be performed while some operations and some operation modes are omitted.

The control methods illustrated in FIGS. 27 through 46 may be variously performed according to the request signal input from the wireless power receiver 2.

For example, the ping frequency f_c is selected as the same frequency as the first reference frequency f1. Thereafter, in response to determining at the wireless power transmitter 1, 1-2, 1-3, 1-4, 1-5, 1-6, 1-7, or 1-8, based on the signal received from the wireless power receiver 2, that the amount of power received by the wireless power receiver 2 is less than the amount of power required by the wireless power receiver 2, the operation in the first boost mode h1, according to the embodiments described above, may also be performed. Alternatively, in response to determining at the wireless power transmitter 1, 1-2, 1-3, 1-4, 1-5, 1-6, 1-7, or 1-8, based on the signal received from the wireless power receiver 2, that the amount of power received by the wireless power receiver 2 is greater than the amount of power required by the wireless power receiver 2, the operation in the normal mode n, according to the embodiments described above, may also be performed.

Thereafter, according to the signal received from the wireless power receiver 2, at least one of the operations of the first boost mode h1, the second boost mode h2, the third boost mode h3, the normal mode n, the first reduction mode l1, the second reduction mode l2, the third reduction mode l3, and the fourth reduction mode l4, according to the embodiments described above, may also be sequentially performed.

For example, in a case in which a battery of the wireless power receiver 2 is in a state close to a discharge state, the wireless power receiver 2 may first require a large amount of power, and then gradually require a smaller amount of power as the battery is gradually charged. In this example, after the operation in the boost mode h1, h2, or h3 is performed, the operations in the normal mode n and the reduction mode l1, l2, l3, or l4 may be sequentially performed.

Alternatively, in an example in which the battery of the wireless power receiver 2 is charged to some extent, the wireless power receiver 2 may require a small amount of power from the beginning of the charging. Therefore, in this case, the operation in the reduction mode l1, l2, l3, or l4 may be performed first.

Alternatively, when an alignment state between the wireless power receiver 2 and the wireless power transmitter 1, 1-2, 1-3, 1-4, 1-5, 1-6, 1-7, or 1-8 is distorted, the control changes to a direction in which the load amount is increased in FIGS. 27 through 46. For example, when the alignment between the wireless power receiver 2 and the wireless power transmitter 1, 1-2, 1-3, 1-4, 1-5, 1-6, 1-7, or 1-8 is distorted while the operation in the normal mode n or the operation in the reduction mode l1, l2, l3, or l4 is performed, the operation in the normal mode n or the operation in the boost mode h1, h2, or h3 may also be performed. Alternatively, when the alignment between the wireless power receiver 2 and the wireless power transmitter 1, 1-2, 1-3, 1-4, 1-5, 1-6, 1-7, or 1-8 is distorted while the operation in the first boost mode h1 is performed, the operation in the second boost mode h2 may also be performed.

Alternatively, when the wireless power receiver 2 and the wireless power transmitter 1, 1-2, 1-3, 1-4, 1-5, 1-6, 1-7, or 1-8 are sufficiently aligned, the control changes to a direction in which the load amount is decreased in FIGS. 27 through 46. For example, the operation in the reduction mode l1, l2, l3, or l4 is performed while the operation in the normal mode n is performed.

The control methods illustrated in FIGS. 27 through 46 may also be performed so that the frequency wirelessly transmitted belongs to a reference range. For example, the controller 200, 201, 202, 203, 204, 205, 206, 207, or 208 adjusts the duty cycle and the frequency of the control signal while preferentially satisfying the conditions that the frequency wirelessly transmitted is a reference value or less, is a reference value or more, and belongs to a predetermined range.

Figure 47A:
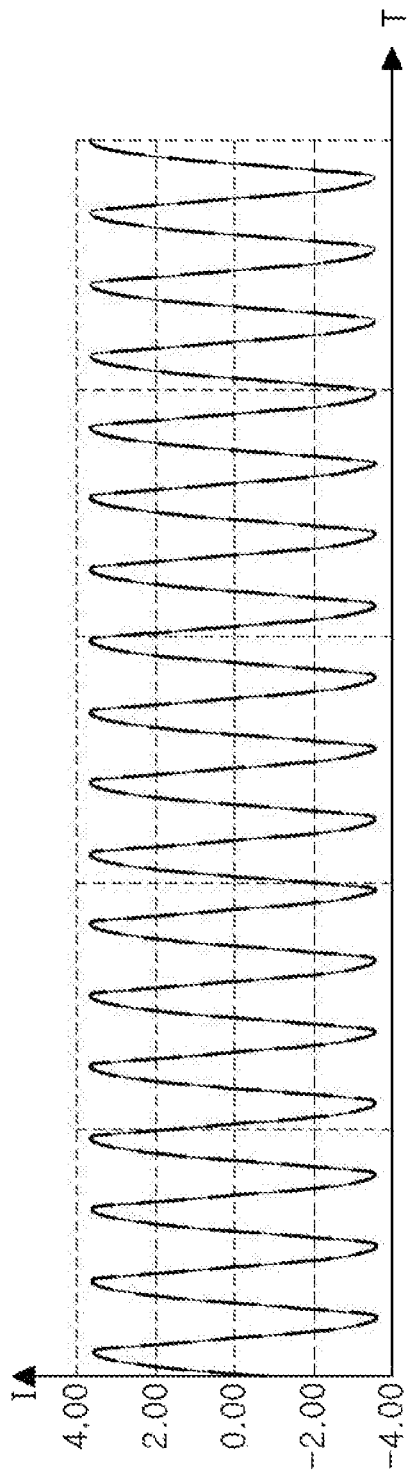
FIGS. 47A and 47B are diagrams illustrating a coil current and an output voltage of the wireless power transmitter, according to an embodiment.
Figure 47B:
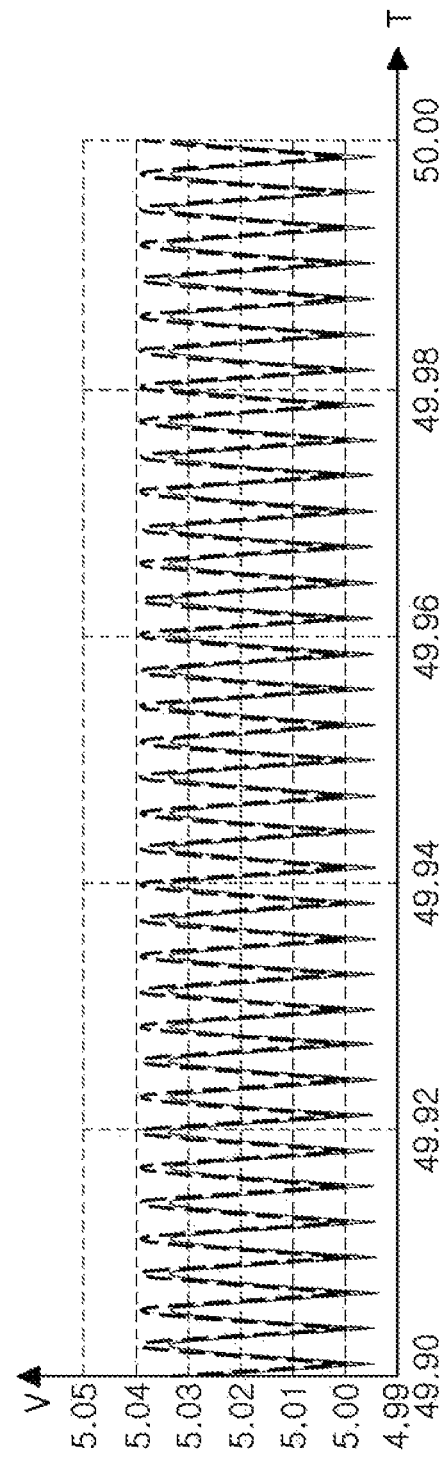

FIGS. 47A and 47B are diagrams illustrating a coil current and an output voltage of the wireless power transmitter 1, 1-2, 1-3, 1-4, 1-5, 1-6, 1-7, or 1-8, according to an embodiment.

The thick dotted line of FIG. 47A illustrates a coil current of the resonator 120, 121, 122, 123, 124, 125, 126, 127, or 128, according to an embodiment illustrated in each of FIGS. 7 through 15, while a thin solid line of FIG. 47A illustrates a coil current, according to an example.

A thick dotted line of FIG. 47B illustrates an output voltage, a voltage across the resonator 120, 121, 122, 123, 124, 125, 126, 127, or 128, according to an embodiment illustrated in each of FIGS. 7 through 15, and a thin solid line of FIG. 47B illustrates an output voltage according to a comparative example.

The comparative example may be the wireless power transmitter including the full-bridge inverter, operated by receiving the input power. In one example, the input power is power provided by the boost converter implemented separately from the inverter.

As illustrated, the wireless power transmitter 1, 1-2, 1-3, 1-4, 1-5, 1-6, 1-7, or 1-8, according to an embodiment, effectively provides the coil current and the output voltage corresponding to the full-bridge inverter according to an example, while using the half-bridge inverter.

Figure 48A:
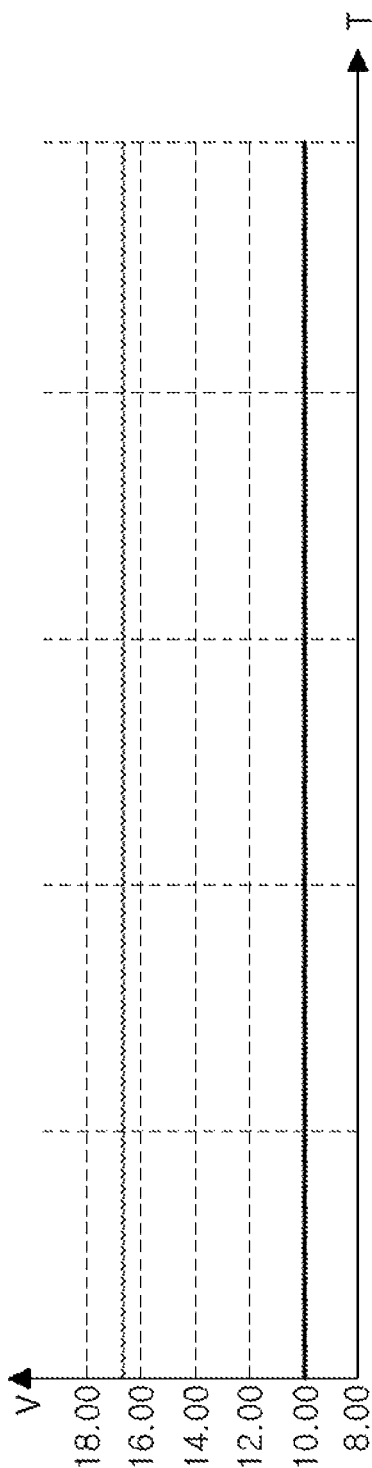
FIGS. 48A and 48B are diagrams illustrating a boost voltage and an output voltage according to a change of a duty cycle in the wireless power transmitter, according to an embodiment.
Figure 48B:
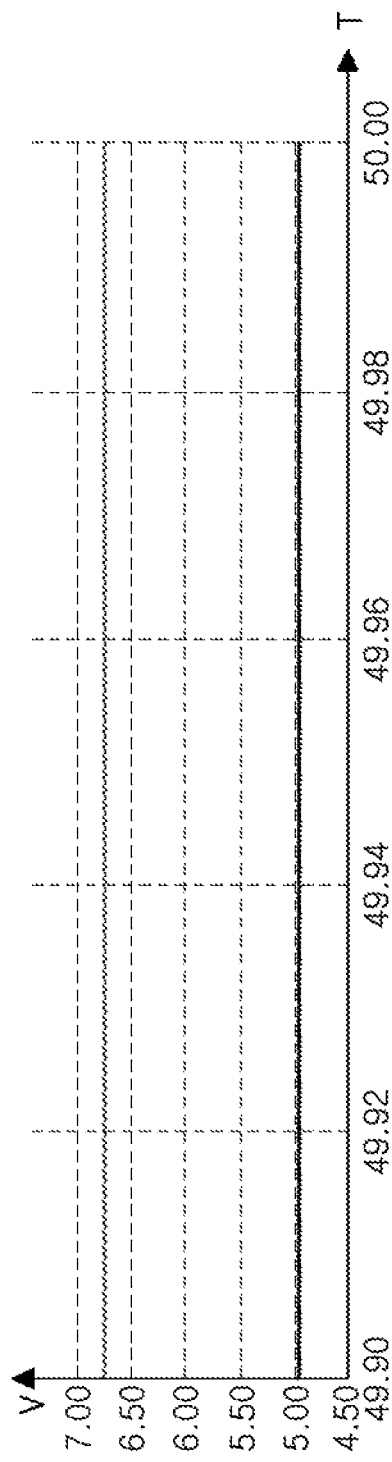

FIGS. 48A and 48B are diagrams illustrating a boost voltage and an output voltage according to a change of a duty cycle in the wireless power transmitter 1, 1-2, 1-3, 1-4, 1-5, 1-6, 1-7, or 1-8, according to an embodiment.

FIG. 48A illustrates a boost voltage (a voltage of the node N2 of FIGS. 8 through 15), and FIG. 48B illustrates an output voltage of the wireless power transmitter 1, 1-2, 1-3, 1-4, 1-5, 1-6, 1-7, or 1-8.

In FIG. 48A, a thick line illustrates the boost voltage according to a duty cycle of 50%, and a thin line illustrates the boost voltage according to a duty cycle of 70%.

As illustrated, the boost voltage according to the duty cycle of 50% is about 10V, but the output voltage of the boosting unit according to the duty cycle of 70% is slightly higher than 16V, which effectively provides higher boosting efficiency.

In addition, accordingly, as illustrated in FIG. 48B, the output voltage of the wireless power transmitter 1, 1-2, 1-3, 1-4, 1-5, 1-6, 1-7, or 1-8 according to the duty cycle of 50% is about 5V, but the output voltage of the boosting unit according to the duty cycle of 70% is adjacent to 7V, which effectively provides a higher output.

As set forth above, according to the embodiments, the wireless power transmitter 1, 1-2, 1-3, 1-4, 1-5, 1-6, 1-7, or 1-8 and the wireless power transmission method effectively and efficiently reduces the number of components required to manufacture the wireless power transmitter, thus, a small-sized wireless power transmitter may be implemented and material costs thereof may be saved. Further, the wireless power transmitter 1, 1-2, 1-3, 1-4, 1-5, 1-6, 1-7, or 1-8 and the wireless power transmission method, according to the embodiments, are more conveniently used by the user by enabling an increase in the range across which the power is wirelessly transmitted while satisfying various limitations to be satisfied in wirelessly transmitting the power, and improves wireless power transmission efficiency. Further, the wireless power transmitter 1, 1-2, 1-3, 1-4, 1-5, 1-6, 1-7, or 1-8 and the wireless power transmission method, according to the embodiments, precisely controls the power trans-mission, thus, preventing unnecessary power consumption, overheating of the wireless power receiver 2, or damage to an element of the wireless power receiver 2. Also, the wireless power transmitter 1, 1-2, 1-3, 1-4, 1-5, 1-6, 1-7, or 1-8 and the wireless power transmission method, according to the embodiments, reduces the inrush current and the peak current that may occur at the time of generating the signal to determine whether the wireless power receiver is present. Thus, the operation in the detection mode thus, whether the wireless power receiver is present may be stabilized.

The controllers 200, 201, 202, 203, 204, 205, 206, 207 and 208 in FIGS. 7 through 15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3 and 16 through 48B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
   a converter comprising switching elements forming a bridge circuit, and configured to output an alternating current (AC) voltage in response to control signals;
   a resonator comprising a resonant capacitor and a resonant coil, and configured to receive the AC voltage to wirelessly transmit power; and
   a controller configured to perform,
      a first mode operation in which a duty of the control signals is fixed, a frequency of one of the control signals is varied in a range from a first reference frequency to a second reference frequency, and the control signals are output, and
      a second mode operation in which a frequency of the control signals is fixed, a duty of one of the control signals is reduced in a range from a first reference duty to a detecting duty, and the control signals are output.

2. The wireless power transmitter of claim 1, wherein the controller further performs a third mode operation in which a frequency of the control signals is fixed, a duty of one of the control signals is increased and the control signals are output.

3. The wireless power transmitter of claim 1, wherein the controller is further configured to turn on and off each of the switching elements in response to a corresponding signal among the control signals, determine an amplitude of the AC voltage according to an operating duty of one of the switching elements, and determine a frequency of the AC voltage according to an operating frequency of one of the switching elements.

4. The wireless power transmitter of claim 3, wherein the controller is further configured to set the detecting duty while determining whether or not a wireless power receiver is present, and
    select and perform one of the first mode operation and the second mode operation based on a difference between a magnitude of power that the wireless power receiver receives in response to the operating frequency being a detecting frequency, a frequency of a signal used to determine whether the wireless power receiver is present and the operating duty is the detecting duty, and a magnitude of power required by the wireless power receiver.

5. The wireless power transmitter of claim 3, wherein the controller sets the detecting duty while determining whether or not a wireless power receiver is present,
    during the first mode operation, the controller outputs the control signals so that the operating duty is fixed as the detecting duty, and
    during the second mode operation, the controller outputs the control signals so that the operating frequency is fixed as the second reference frequency.

6. The wireless power transmitter of claim 5, wherein the controller further performs a third mode operation in which the operating duty is fixed as the first reference duty, the operating frequency is varied in a range from the second reference frequency to a maximum frequency, and the control signals are output.

7. The wireless power transmitter of claim 5, wherein the bridge circuit is a full bridge circuit comprising a first leg and a second leg, and
    the controller further performs a third mode operation in which the operating frequency is fixed as the second reference frequency, a duty of the first leg is fixed as the detecting duty, and a duty of the second leg is varied.

8. The wireless power transmitter of claim 5, wherein the bridge circuit is a full bridge circuit comprising a first leg and a second leg, and
    the controller further performs a third mode operation in which a duty of the first leg is fixed as the detecting duty, a duty of the second leg is fixed as 100, and the operating frequency is varied in a range from the second reference frequency to a maximum frequency.

9. A wireless power transmitter, comprising:
    a converter comprising switching elements forming a bridge circuit, and configured to output an AC voltage in response to control signals;
    a resonator comprising a resonant capacitor and a resonant coil, and configured to receive the AC voltage to wirelessly transmit power; and
    a controller configured to perform
    a first mode operation in which a duty of the control signals is fixed, a frequency of one of the control signals is varied in a range from a first reference frequency to a second reference frequency and the control signals are output,
    a second mode operation in which a frequency of the control signals is fixed, a duty of one of the control signals is varied in a range from a first reference duty to a second reference duty and the control signals are output, and
    a third mode operation in which a duty of the control signals is fixed, a frequency of one of the control signals is varied in a range below the first reference frequency and the control signals are output.

10. The wireless power transmitter of claim 9, wherein each of the switching elements is turned on and off in response to a corresponding signal among the control signals, an amplitude of the AC voltage is determined according to an operating duty of one of the switching elements, and a frequency of the AC voltage is determined according to an operating frequency of one of the switching elements.

11. The wireless power transmitter of claim 10, wherein, during the first mode operation, the controller outputs the control signals having a frequency in a range from the first reference frequency to the second reference frequency while having a first reference duty,
    during the second mode operation, the controller outputs the control signals having the first reference frequency, and varying a duty of one of the control signals in a range from a first duty to a second duty, and
    during the third mode operation, the controller outputs the control signals having
    a frequency in a range below the first reference frequency while having the second duty.

12. The wireless power transmitter of claim 9, wherein the controller further performs a fourth mode operation in which a frequency of the control signals is fixed, a duty of one of the control signals is varied in a range above the second reference duty and the control signals are output.

13. A wireless power transmitter, comprising:
    a converter comprising switching elements forming a bridge circuit, and configured to output an AC voltage in response to control signals;
    a resonator comprising a resonant capacitor and a resonant coil, and configured to receive the AC voltage to wirelessly transmit power; and
    a controller configured to perform,
    a first mode operation in which a duty of the control signals is fixed, a frequency of one of the control signals is determined based on error information received from a wireless power receiver, and the control signals are output, and
    a second mode operation in which a frequency of the control signals is fixed, a duty of one of the control signals is determined based on the error information, and the control signals are output in response to the determined frequency being outside of a reference range in the first mode operation,
    wherein the controller is further configured to set a detecting duty while determining whether or not the wireless power receiver is present, perform the first mode operation by setting the duty of one of the control signals as the detecting duty, determine the frequency of one of the control signals based on the error information, and output the control signals according to the detecting duty and the determined frequency, and
    in response to the determined frequency having been determined in the first mode operation being below a first reference frequency, the controller is further configured to perform the second mode operation by setting the frequency of one of the control signals as the first reference frequency, determine the duty of one of the control signals based on the error information, and output the control signals according to the first reference frequency and the determined duty.

14. The wireless power transmitter of claim 13, wherein, in response to the determined frequency of the first mode operation being above a second reference frequency, the controller is further configured to perform the second mode operation by setting a frequency of one of the control signals as the second reference frequency, determine the duty of one of the control signals based on the error information, and output the control signals according to the second reference frequency and the determined duty.

15. The wireless power transmitter of claim 13, wherein, in response to the duty in the second mode operation being below a first reference duty that is lower than the detecting duty, the controller is further configured to perform a third mode operation by setting the duty of one of the control signals as the first reference duty, determine the frequency of one of the control signals based on the error information, and output the control signals according to the first reference duty and the determined frequency.

16. The wireless power transmitter of claim 14, wherein the bridge circuit is a full bridge circuit comprising a first leg and a second leg, and
in response to the determined duty in the second mode operation being below a first reference duty that is lower than the detecting duty, the controller is further configured to perform a third mode operation by setting the duty of one of the control signals, control the switching elements of the first leg, as the first reference duty, determine the duty of the one of the control signals, control the switching elements of the second leg, based on the error information, and output the control signals according to the second reference frequency, the first reference duty, and the determined duty.

17. The wireless power transmitter of claim 16, wherein in response to the determined duty in the second mode operation being above a second reference duty that is higher than the detecting duty, the controller is further configured to perform a third mode operation by setting a duty of one of the control signals as the second reference duty, determine the frequency of one of the control signals based on the error information, and output the control signals according to the second reference duty and the determined frequency.

18. The wireless power transmitter of claim 13, wherein each of the switching elements is turned on and off in response to a corresponding signal among the control signals, an amplitude of the AC voltage is determined according to an operating duty of one of the switching elements, and a frequency of the AC voltage is determined according to an operating frequency of one of the switching elements.

19. A method of a wireless power transmitter, comprising:
forming a bridge circuit using switching elements to output an alternating current (AC) voltage, in response to control signals, to wirelessly transmit power;
performing a first mode operation comprising
fixing a duty of the control signals,
varying a frequency of one of the control signals in a range from a first reference frequency to a second reference frequency, and
outputting the control signals; and
performing a second mode operation comprising
fixing a frequency of the control signals,
reducing a duty of one of the control signals in a range from a first reference duty to a detecting duty, and outputting the control signals.

20. The method of claim 19, further comprising:
performing a third mode operation comprising
fixing the frequency of one of the control signals,
increasing the duty of one of the control signals in a range below the first reference frequency, and outputting the control signals.

21. The method of claim 19, further comprising:
turning on and off each of the switching elements in response to a corresponding signal among the control signals;
determining an amplitude of the AC voltage according to an operating duty of one of the switching elements; and
determining a frequency of the AC voltage according to an operating frequency of one of the switching elements.

22. The method of claim 21, further comprising:
setting the detecting duty while determining whether or not a wireless power receiver is present; and
selecting and performing one of the first mode operation and the second mode operation based on a difference between a magnitude of power received in response to the operating frequency being a detecting frequency, a frequency of a signal used to determine whether the wireless power receiver is present and the operating duty is the detecting duty, and a magnitude of power required by the wireless power receiver.

* * * * *